(12) United States Patent
Tietzen et al.

(10) Patent No.: US 9,105,050 B2
(45) Date of Patent: Aug. 11, 2015

(54) PROGRAM, SYSTEM AND METHOD FOR LINKING COMMUNITY PROGRAMS AND MERCHANTS IN A MARKETING PROGRAM

(75) Inventors: Terry Tietzen, Edmonton (CA); Matthew Bates, Edmonton (CA); William Gordon Robertson, Edmonton (CA)

(73) Assignee: EDATANETWORKS INC., Calgary, Alberta (CA)

( * ) Notice: Subject to any disclaimer, the term of this patent is extended or adjusted under 35 U.S.C. 154(b) by 29 days.

(21) Appl. No.: 13/168,488

(22) Filed: Jun. 24, 2011

(65) Prior Publication Data

US 2011/0320246 A1 Dec. 29, 2011

Related U.S. Application Data

(63) Continuation of application No. PCT/CA2009/001605, filed on Nov. 6, 2009.

(51) Int. Cl.
*G06Q 30/00* (2012.01)
*G06Q 30/02* (2012.01)

(52) U.S. Cl.
CPC ............ *G06Q 30/0256* (2013.01); *G06Q 30/02* (2013.01); *G06Q 30/0222* (2013.01); *G06Q 30/0224* (2013.01); *G06Q 30/0226* (2013.01); *G06Q 30/0233* (2013.01);
(Continued)

(58) Field of Classification Search
USPC ........................................................ 705/14.4
See application file for complete search history.

(56) References Cited

U.S. PATENT DOCUMENTS

| 6,101,483 | A | 8/2000 | Petrovich et al. | |
|---|---|---|---|---|
| 6,285,986 | B1 * | 9/2001 | Andrews | 705/80 |
| 7,107,268 | B1 * | 9/2006 | Zawadzki et al. | 1/1 |

(Continued)

FOREIGN PATENT DOCUMENTS

| CA | 2780059 A1 | 5/2001 |
|---|---|---|
| CA | 2518481 | 9/2004 |

(Continued)

OTHER PUBLICATIONS

International Search Report of the Authorized Searching Authority (Corresponding Application: PCT/CA2009/001605); Canadian Intellectual Property Office; Authorized Officer Riaz, Zarrar; Issued Jul. 8, 2010; (3 pages).
Guardia, Cause Marketing Partnerships . . . The Fifth "P"; Aug. 27, 2009; retrieved from the Internet at URL http://www.slideshare.net/KooDooZ/ad-2-san-diego-cause-marketing-night-1939688; pp. 14-16.

(Continued)

*Primary Examiner* — John G Weiss
*Assistant Examiner* — Scott C Anderson
(74) *Attorney, Agent, or Firm* — Norton Rose Fulbright Canada LLP; Maya Medeiros

(57) ABSTRACT

The present invention is a system, data access management utility and a method of generating links between local merchants and a marketing system. The present invention may be operable to register members, merchants, community programs, intermediaries and other entities with the marketing system. Embodiments of the present invention may be operable to quickly and efficiently register multiple members and/or multiple merchant store types virtually simultaneously to the marketing system. An automated registration and/or boarding process may be operated by the present invention to undertake such registration and/or boarding of members, merchants, community programs, intermediaries and other entities with the marketing system, including automated boarding of merchants.

20 Claims, 18 Drawing Sheets

(52) U.S. Cl.
CPC ....... *G06Q 30/0241* (2013.01); *G06Q 30/0242* (2013.01); *G06Q 30/0214* (2013.01)

(56) References Cited

U.S. PATENT DOCUMENTS

| | | | |
|---|---|---|---|
| 7,424,617 | B2 | 9/2008 | Boyd et al. |
| 2002/0091703 | A1* | 7/2002 | Bayles .......................... 707/101 |
| 2006/0253320 | A1 | 11/2006 | Heywood |
| 2007/0022008 | A1 | 1/2007 | Kingsborough et al. |
| 2007/0219871 | A1* | 9/2007 | Rolf et al. ....................... 705/26 |
| 2008/0162279 | A1* | 7/2008 | Hershkovitz et al. ........... 705/14 |
| 2008/0228632 | A1* | 9/2008 | Gotthelf et al. ................. 705/37 |
| 2009/0281871 | A1 | 11/2009 | Tietzen et al. |
| 2009/0287592 | A1 | 11/2009 | Brooks et al. |
| 2010/0145784 | A1 | 6/2010 | Sriver et al. |
| 2012/0221400 | A1 | 8/2012 | Tietzen |

FOREIGN PATENT DOCUMENTS

| | | | |
|---|---|---|---|
| CA | 2518481 | A1 | 9/2004 |
| CA | 2546151 | | 11/2007 |
| CA | 2546151 | A1 | 11/2007 |
| WO | 2011054071 | | 5/2011 |

OTHER PUBLICATIONS

Patermaster, "CFC Memorandum 2006-19", Combined Federal Campaign Reference Materials, Jul. 11, 2006, on-line at opm.gov.
United States Patent and Trademark Office, Office Action Summary dated Apr. 8, 2013, issued on U.S. Appl. No. 13/508,084.
Norton Rose Fulbright Canada LLP, Office Action Response dated Aug. 1, 2013, filed on U.S. Appl. No. 13/508,084.
United States Patent and Trademark Office, Office Action Summary dated Sep. 30, 2013, issued on U.S. Appl. No. 13/508,084.
Australian Government IP Australia, Examiner's First Report dated Apr. 19, 2012, issued on Australian Patent Application No. 2008258248.
Federal Court of Australia, Grant v Commissioner of Patents [2006] FCAFC 120.
Wrays, Response to Examiner's First Report dated Oct. 21, 2013, filed on Australian Patent Application No. 2008258248.
Australian Government IP Australia, Patent Examination Report No. 2 dated Nov. 13, 2013, issued on Australian Patent Application No. 2008258248.
Australian Government IP Australia, Patent Examination Report No. 1 dated Nov. 24, 2014, issued on Australian Patent Application No. 2009354947.

* cited by examiner

PROGRAM, SYSTEM AND METHOD FOR LINKING COMMUNITY PROGRAMS AND MERCHANTS IN A MARKETING PROGRAM

CROSS REFERENCE TO RELATED APPLICATIONS

This application is a continuation of International Application PCT/CA2009/001605 filed Nov. 6, 2009, the contents of which are incorporated herein by reference.

FIELD OF THE INVENTION

The present invention relates to registration of multiple entities or persons to a marketing system.

BACKGROUND OF THE INVENTION

Several systems presently exist that provide reward points or discounts to member customers. Most of these are set-up as loyalty systems whereby a loyalty card or number is provided to a customer. A customer may gain reward points when a transaction occurs and the loyalty card or number is provided at the point of the transaction. Generally, the use of the loyalty card or number is recorded at the point of sale device. Accumulated reward points can be redeemed for products, discounts, or other rewards. Such loyalty systems are provided directly by a merchant or by an organization representing one or more merchants.

Additionally, systems have been created whereby reward points accumulated by a user may be donated to an organization, such as a charitable organization. For example, U.S. patent application Ser. No. 11/746,502 discloses an invention wherein a percentage of a transaction cost may be donated directly to a charitable organization. The choice to donate reward points, or a percentage (or other portion) of a transaction, to a charitable organization may be at the discretion of a customer. For example, the choice may be made at the time of registering with a loyalty program, so that specified future transactions will automatically generate a donation. Alternatively, the choice may be made at the point of redeeming reward points, whereby the customer can direct particular points to a charitable organization. Yet another option is for the choice to be made at the time of the transaction.

Generally the prior art systems function so that a member or a merchant will register with a marketing system individually, so that registration takes place for each member or merchant on a one-at-a-time basis. In particular, for merchants, this means that each merchant location is registered individually.

SUMMARY OF INVENTION

In one aspect, the present disclosure relates to a marketing system operable to promote one or more merchants and the products and services of the one or more merchants in a inter-connected environment, comprising: a data collection server operable by one or more computer processors to receive or access data including data pertaining to one or more members and the one or more merchants that are participants of the marketing program; a transaction details processor operable to collect and transfer details of one or more transactions to the data collection server, said one or more transactions occurring between the one or more merchants and the one or more members; a transaction linking utility operable to process and analyze search history details, the transaction details, and the data of the data collection server to determine the likelihood that one of the one or more transactions is the result of the search results provided to a user or one of the one or more members; and a data mining tool operable to analyze by operation of the one or more computer processors of the of the data collection server, the transaction details and the data regarding the one or members and the one or more merchants, said data mining tool further being operable to generate one or more incentives to increase the transactions occurring between the one or more merchants and the one or more members.

In another aspect, the present disclosure relates to a marketing program method comprising the following steps: one or more members providing information to the marketing program during a sign-up process and based upon subsequent activities; one or merchants providing information to the marketing program during a sign-up process and based upon subsequent activities; one or more intermediaries providing information to the marketing program during a sign-up process and based upon subsequent activities; generating one or more incentives to be offered by one or more of the one or more merchants to the one or more members by way of one of the following: off-line media; an online search or browsing session undertaken by one of the one or more members; or direct communication to the communication device of one of the one or more members; applying the one or more incentives to provide one or more benefits to at least an intermediary; providing details of the transaction to the marketing program; utilizing a transaction linking utility to determine the likelihood that a match exists between the transaction details and activity by one of the one or more members; and utilizing a data mining tool to generate future incentive suggestions.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
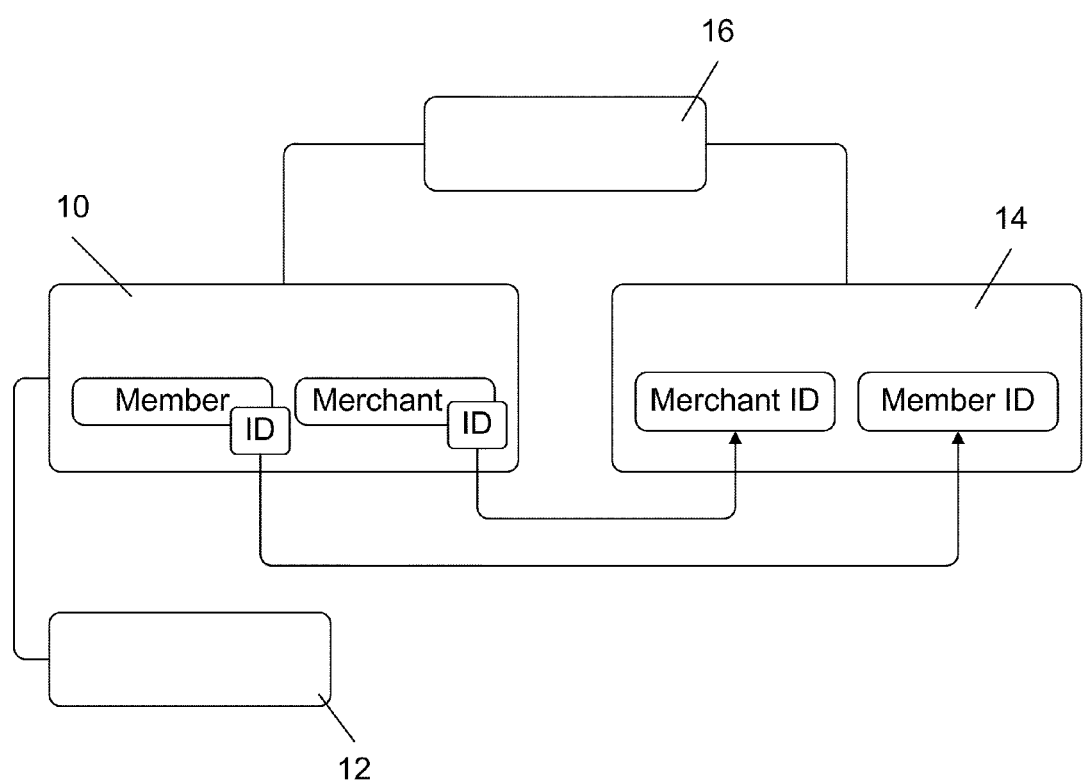
FIG. 1 is a systems view of the marketing program.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a system, data access management utility and a method of generating links between local merchants and a marketing system. For example, the marketing system may be that disclosed in PCT Patent Application No. PCT/CA2009/001605. The present invention may be operable to register members, merchants, community programs, intermediaries and other entities with the marketing system. Embodiments of the present invention may be operable to quickly and efficiently register multiple members and/or multiple merchant store types virtually simultaneously to the marketing system. An automated registration and/or boarding process may be operated by the present invention to undertake such registration and/or boarding of members, merchants, community programs, intermediaries and other entities with the marketing system.

For the purpose of this patent application, the term "community programs" may be understood to define an ongoing community program (such as a shelter in a community), a term community program (such as a charity funding drive), or a community event (such as a festival). The term "community programs" may further be understood to define a community program serving a specific area (such as a festival held in a local park), a community program serving a neighbourhood (such as a neighbourhood clothing drive), a community program serving a larger area (such as a city-wide hosting of a sporting event), or a community program serving a still wider area (such as a national literacy program, or an international development program).

The term "merchant" may refer to businesses, while customers are referred to as "members". An entity granted limited participation in a marketing program, such as for a specific term, or only granted the ability to participate in specific activities, such as an advertising associate, may be referred to as an "intermediary". The term "participants" may reference any entity participating in a marketing program, including merchants, members, intermediaries, system administrator(s) and any other participant in the marketing system.

The present invention may involve an Internet, intranet or other networked environment. Therefore, any reference to any of Internet, intranet or other networked environment should be understood broadly to encompass not only the referenced term, but all of Internet, intranet or other networked environment. In the same manner terms indicating aspects of the Internet, an intranet or another networked environment, such as a webpage in an Internet environment, should be understood broadly to include the equivalent available in the Internet, intranet or other networked environment.

The present invention may offer several benefits over the known prior art. For example, the known prior art may require that a merchant having several store types, such as a chain of stores, either register each store location individually, or register the entire chain of stores without the ability to pick and choose the desired stores to be boarded. This can be a time consuming process. Alternatively, the prior art may allow for a first store location of a merchant to be registered and for some information pertaining to the initial merchant entry to be repeated for other store types of the same merchant that are subsequently registered with the marketing system. However, the repeated information is required to be selected and verified for each store location registration. This creates a time-consuming and laborious registration process. The present invention may provide a more efficient and less time-consuming option, in that the present invention may register multiple store types virtually simultaneously by retrieving registration information pertaining to the merchant and each of its store types.

The present invention may include several elements in the process of registering one or more merchants/merchant types or members. The present invention may therefore have several embodiments. The description provided herein represents some of the possible embodiments of the present invention. A skilled reader will recognize that other embodiments of the present invention may be possible.

The data in the storage area may be mined by a data mining tool. The data mining tool may be utilized by any participant of the marketing system. For example, the data mining tool may be used to match a community program to a participant merchant in the area where the community program is to occur, or is occurring. The result may be that a local participant merchant may be made aware of an upcoming local festival. The participant merchant may devise a merchant incentive in relation to the community program, such as a discount, a donation to the community program, a give away, a sweepstakes entry, rewards (such as reward points) or any other incentive.

The data mining tool may also be utilized to identify members of the marketing system who are identified as existing near the participant merchant store location. For example, the data mining tool may identify participant members living and/or working in the area of the merchant store location and/or one or more community programs, in accordance with member profile information and other data stored in the data storage area and any linked data sources. The data mining tool may also be utilized to identify participant members who may be likely to visit the merchant store and/or make use of the incentive, in accordance with demographic information or preferences derived from data stored in the data storage area and any linked data sources. A skilled reader will recognize that other information regarding a member, for example, such as transactional behaviour, may also be utilized to identify participant members who may be likely to visit the merchant store and make use of the incentive.

As an example, the merchant boarding interface, data mining tool and analytic mode of the present invention may undertake a process to identify members that are likely to engage in transactions with a merchant. The present invention may even identify one or more members as likely to engage in a transaction at a specific store, branch or subsidiary location of the merchant. For example, Bob's Bikes may utilize the merchant boarding interface of the present invention to become an activated merchant. John may be a member of the marketing system and his member profile may include information that indicates his history of engaging in transaction at cycling stores. The member profile of John may include information that his home address is in close proximity to a store of the Bob's Bikes. The data mining tool may be utilized to collect information from the Bob's Bikes merchant profile and John's member profile. Information may also be collected from sites linked to the merchant profile and/or the member profile, for example, such as one or more social networks linked to the member profile wherein content and interactions with others within the network may be reviewed, or any Internet search tool histories linked to the member profile that include search data for searches for particular types of bicycles undertaken by the member. Other data sources may also be accessed by the data mining tool as described herein, including intermediaries.

The analytic mode may determine based on the collected information that that John may be likely to be engage in a transaction at a bicycle store near his home. The analytic mode may further determine, based on the collected information, that John may be likely to engage in a transaction with a bicycle store that he has not transacted with previously, and that a particular form of incentive may encourage John to engage in a transaction with Bob's Bikes.

The merchant, or another market system participant working with the merchant, may advertise the merchant's one or more incentives and/or the community program to at least the members identified by the data mining tool. Such advertisements may be communicated to an identified member and/or other potential customers by a variety of online and offline means, including a webpage, an email, a communication sent to a mobile device, a print advertisement, a radio advertisement, etc.

In an embodiment of the present invention that involves cross-selling or cross-loyalty, as described in more detail below, the invention may facilitate consecutive, or simultaneous, communication of related incentives. For example, incentives of two merchants involved in a cross-selling program may be communicated either immediately one after the other, or together. The communication may further indicate a link or other connection between the incentives based upon the cross-selling program. A skilled reader will recognize that a variety of ways to indicate cross-selling or cross-loyalty incentives may be provided.

In one embodiment of the present invention, a member may view a display of incentives on a webpage when the member logs onto the marketing system website. The display may be immediately presented after login, or may be presented upon a selection by the member, such as the selection of a particular webpage, a link, or an incentive display option.

In another embodiment of the present invention, a merchant may have an option regarding setting the prominence of the communication of an incentive to a member or other participant. For example, a merchant may make a request, and may pay a fee, for a particular prominence of an incentive in a communication to a member, other participant or any third parties. A merchant may also be given the opportunity to bid for a more prominent communication or display of an incentive to a member, participant of the marketing system, or third party. A skilled reader will recognize that prominent communication or displays of an incentive may involve a variety of criteria, such as, for example: the time of day when a communication occurs via radio; the positioning of an incentive on a webpage, printed page, or list showing one or more incentives; the typeface or graphics (e.g., bold, coloured, etc.) of an incentive on a webpage or printed page; etc.

A participant and/or third party may redeem an incentive, through an online of offline transaction. Transaction details of transactions occurring between a merchant and a participant or third party, may be stored in the data storage area. At the time of the transaction a member, or other participant, may provide a marketing system participant identifier to a merchant.

Transaction details may be transferred to the marketing system for storage and mining by a variety of means and at a variety of times. For example, transaction details may be transferred to the marketing system in real-time (e.g., as a transaction occurs and concludes), near real-time (e.g., almost immediately after a transaction concludes), and/or after a time lapse (e.g., at the end of a time period, such as a set time(s) during a day, at the end of the day, at the end of a week, at month-end, or at any other time after a transaction is finished, information regarding one or more transactions may be provided to the marketing system). The data mining tool may be utilized collect data from the storage area, and possibly other data sources, to generate specific information, for example, such as information regarding consumer behaviour data that may provide: one or more reports pertaining to a particular incentive (e.g., success of an incentive); information to be utilized to create a new incentive; suggestions of new incentives; or other information.

In particular, the data mining tool may be utilized to determine if a transaction occurred as a result of an incentive. For example, the data mining tool may be engaged (and optionally the analytic mode may also be engaged) to recognize particular pre-transaction behaviour by a participant, for example, such as the search for a merchant or a product by a participant, communication of an incentive to a participant, or other information. The pre-transaction behaviour if followed by a transaction with a particular period of time may be assumed by the marketing system to indicate that the transaction occurred based upon the incentive (or that the transaction occurred based upon the search). It is also possible for a post-transaction survey to be provided to the participant who engaged in the transaction, and data collected from the survey may establish that the transaction occurred due to the search and/or the incentive. Such data may be utilized by the marketing system, merchant, and/or other participants to make determinations about future incentives, success of past incentives, marketing strategies, and other decisions.

Embodiments of the present invention may include a transaction linking utility to access the data in the data storage area or data extracted or analyzed by the data mining tool and the analytic mode, and to utilize this data to identify links between a transaction and a member. For example, the transaction linking utility may analyze the data to recognize the existence of links or matches between transactions and other behaviour or activities of members or users. As such, the transaction linking utility may be operable to identify a match between a search by a member and a later transaction when the member purchase a product or service at a merchant's store that the member had earlier searched. The transaction linking utility may further determine a likelihood or level of certainty that a transaction resulted from an earlier search by a member. This operability of the transaction linking utility is described in more detail below. A skilled reader will recognize that the transaction linking utility may utilize a wide variety of data to undertake its function and may link a transaction to a wide variety of behaviours or activities by a member, and may determine the link to be of varying degrees of likelihood or certainty. The transaction linking facility may also involve data such as member profile data, including a member's financial card information, or a member's identification, to determine a link between a member and a transaction.

Participants of the marketing system, other than the administrator, may not be provided with direct access to the data stored in the data storage area. Thus, any personal information regarding a participant stored in the data storage area will not be accessible by participants. Additional security measures may be included in the marketing system to ensure that personal information regarding a participant stored in the data storage area will not be disseminated to participants. Such security measure may further include means whereby the data mining tool, transaction linking utility and analytic mode may generate information in a manner so that such information is devoid of personal information regarding specific participants. In this manner, privacy of information, including personal information, may be maintained by the marketing system. Privacy of information of the marketing system may meet or exceed any regulations regarding private information in a specific location or wider area.

Benefits of the Present Invention Over the Prior Art

The present invention may offer many benefits over the known prior art. For example, many local merchants lack the ability to access information sources that offer both: information regarding community programs local to a merchant store location; and customer participant information. The data and other information either stored in the data storage area of the marketing system of the present invention, or in other data sources that are accessible by the marketing system, may be queried to identify members likely to make use of a merchant incentive. The present invention permits local merchants to become participants of the marketing system and to access this information. The present invention also offers a greater level of control to the merchant to create specific incentives related to community programs and to track the use participant members make of the incentives. Merchant store locations can be easily linked into community programs in the same locality.

The present invention provides an additional benefit, in that the tracking of participant customer transactions that make use of an incentive does not require a point of sale system. The prior art generally utilizes a point of sale device to track transactions made by a customer having a rewards number or card at a store. Point of sales systems are expensive and may lack compatibilities with other point of sale systems utilized by other merchants. In the present invention, as tracking of transactions between merchants and members does not occur by way of the point of sales system, it is not necessary for a merchant to install an expensive point of sale system having tracking capabilities required by the prior art. Thus, the present invention may provide a cost-effective means of tracking transactions as compared to expensive prior art systems. Additionally, the present invention allows for transaction tracking to occur whether the transaction occurs online or offline. For example, a participant customer making a transaction in a bricks and mortar location of a participant merchant may be trackable in accordance with the present invention. Moreover, any participant merchant incentive may be applied to a participant customer transaction that occurs either online or offline.

Still other benefits of the present invention include the wide range of information that is collected in a common data storage area for use by the data mining tool, the transaction linking utility and the analytic mode, and the operability of the data mining tool, the transaction linking utility and the analytic mode to prevent dissemination of private and/or personal information. Prior art inventions do not involve the collection of the breadth of information into a single location that is accessible by a data mining tool, a transaction linking facility and an analytic mode, that the present invention achieves. Nor do prior art inventions limit the accessibility of private and/or personal information as effectively as the present invention.

Yet another benefit of the present invention over the prior art is that the present invention links seamlessly to social media and mobile devices. Consequently, an individual is not required to visit the marketing system's website necessarily to participate in activities of the marketing system. For example, advertisements of incentives may be provided via social media and/or mobile devices, as may surveys, information entry, and other facilities.

Another benefit of the present invention over the prior art, is that, should the incentive involve a donation to a community program, the donation is reportable by the data mining tool in a clear manner. The result may be that the present invention offers accountability in its reporting of donations. This accountability may also be the standard for donations to community programs made by participants of the marketing system by other means than incentives. The donator can see that the donation amount has been passed by a payment source to the community program.

Still another benefit of the present invention over the prior art is that the present invention may have several results for participants not achieved by prior art inventions.

The present invention may increase revenues of merchants by increasing transactions of the merchants that are participants of the marketing system due to customer (including participants) interest in, or loyalty to, community programs.

The present invention may increase customer (including participant) awareness of a local participant merchant store by permitting searching for the merchant, communicating incentives from the merchant to members, mapping features showing merchant locations, and other features of the present invention.

The present invention may also increase merchant goodwill by promoting the merchant's support of one or more community programs. The present invention may increase support of community programs by making it easier for merchants to become cognizant of community programs occurring near merchant stores in the same locality as the community programs. The support of community programs by merchants may be financial, or may be by increasing participant consumer awareness of community programs occurring in a particular location.

The present invention may provide a benefit or advantage over the prior art due to the fact that embodiments of the present invention that involve automated merchant registration and/or automated merchant boarding may reduce the information required to be received from the merchant in order to perform an automated registration and/or boarding process. Prior art systems may require that a merchant provide all details that will be populated in a registration or boarding process relating to the merchant. Embodiments of the present invention that apply automated merchant registration and/or boarding processes may require the merchant to supply only a portion of the information that will be populated in the automated registration and/or boarding process. The system of the present invention may be operable to perform specific activities to locate information that is to be populated in the merchant registration and/or boarding process. As the system of the present invention obtains the information the merchant is not required to provide such information. This lowers the amount of information that merchant needs to have on hand in order to complete a registration and/or boarding process, the number of key strokes that a merchant must apply to complete a registration and/or boarding process, and also the amount of time that a registration and/or boarding process may take to complete.

The marketing system of the present invention may further populate the merchant registration and/or boarding record with particular content, for example, such as incentives to be available to the merchant. Prior art systems require such content to be entered manually, which requires a person to undertake the data entry of the content, which is labour and time-intensive. The present invention therefore provides a faster and less-labour intensive option and is consequently represents a benefit and advantage over the prior art.

System

The present invention may include a marketing system involving a web server accessible by an administrator, one or more merchants, and one or more members registered with the marketing system. The web server may also be accessible, by way of specified and possibly limited access, by one or more intermediaries registered with the marketing system and third parties. The web server may be linked to a data storage area. Data pertaining to the administrator, merchants, members and/or intermediaries may be stored in the data storage area. Some data pertaining to third parties may also be stored to the data storage area in some embodiments of the present invention. At least one participant identifier may be stored in the data storage area for each registered participant of the marketing system.

The web server may be operable so that a merchant may provide information to the web server regarding one or more transactions between a merchant and a customer. The customer may be a member of the marketing system. A skilled reader will recognize that data pertaining to a transaction between a merchant and a member, or other customer, may be transferred to the web server by a variety of means, for example, such as via manual entry, via another communication means, etc.

In one embodiment of the present invention, a point of sale facility may also be utilized by the marketing system in some embodiments of the present invention. The point of sale facility may be in communication with the web server, and may pass information regarding a transaction occurring between a merchant and a customer to the web server. The customer may be a member of the marketing system.

In another embodiment of the present invention, data, or other information, may be transferred regarding a member or other participant from a separate data source, such as a database, to the marketing system. For example, a member may be a financial card holder, and all financial card holders may be given the option to become members of the marketing program. The financial card company may also become an intermediary of the marketing system. Once a financial card holder agrees to become a member of the marketing system, information and other data regarding the financial card holder, as gathered by the financial card company, may be either transferred to the marketing system, or may be made accessible by the marketing system.

A skilled reader will recognize that other groups may become members, such as, for example store card holders, members of a community group, such as a co-op, bank card holders, or any other group, and that the persons involved in the group may become members of the marketing system. The group may gather information independently from the marketing system and this information regarding persons who become members of the marketing system may be made available to the marketing system via a transfer, or via access to the data source of the group.

The persons involved in the group may be granted an identification, such as a numeric identification. This identification may be acknowledged by the marketing system, so that when a person involved in the group becomes a member of the marketing system, the marketing system stores the identification provided by the group. The identification may be stored in the marketing system as the participant identifier. In some embodiments of the present invention more than one participant identifier may be stored in the marketing system for a member, or a participant identifier may be stored and other identifications may also be stored. Any transaction that occurs and utilizes the identification may be recognized by the marketing system as a transaction involving the member whom the identification represents.

For example, a financial card holder may be granted a financial card number. The financial card holder may become a member of the marketing system. Upon becoming a member of the marketing system the financial card number of the member may be transferred, or otherwise provided, to the marketing system. The marketing system may utilize the financial card number as an identification for the member.

The one or more identifications, or one or more participant identifiers, identified as pertaining to a member of the marketing system may be utilized by the member during a transaction. For example, a member may utilize a financial card during the transaction and the financial card number may be an identification, or participant identifier, identified as pertaining to the member by the marketing system. The marketing system may therefore recognize that the transaction involves the member due to the use of the financial card number. A skilled reader will recognize that other identifications, or participant identifiers, may be utilized by a member, that such identifications may be stored by the marketing system, and that use of an identification, or participant identifier, during a transaction may provide a means of identifying a transaction as involving a particular member. As described above, the identification may be stored as a participant identifier by the marketing system.

As shown in FIG. 1, the marketing system may be operable in accordance with a web-based computer program product that provides a loyalty engine 10, linked to the web server. The loyalty engine may provide a marketing system interface to enable specific features, for example, such as surveys, incentive communications, data mining and other features.

Transactions occurring between members and merchants, including transactions utilizing a point of sale facility 12, may be recorded or otherwise linked to data storage means. For example, a data storage means may be a database that may be included in one or more servers. As another example, a server farm may be included in the system of the present invention and one or more linked databases may be included as a data storage area. A skilled reader will recognize that the present invention may utilize a combination of stored data and real-time data (the real-time data may or may not be stored), and that both of these types of data may be utilized by the data mining tool. The data mining tool 14 may be operable by the loyalty engine, and may be utilized by members, merchants, the administrator, an intermediary, or any third party that is provided specific access to the data mining tool.

In one embodiment of the present invention, transaction linking utility 16 may be utilized to compare transaction details regarding a merchant and/or member with stored data, for example, such as a member or merchant profile. In this manner a transaction may be confirmed to be between a specific merchant and a specific member. Details of the transaction may be stored in the data storage area as corresponding to the merchant and/or member involved in the transaction. For example, details of the transaction may be stored in the member profile, merchant profile, as historical transaction and/or as preferences.

The transaction linking utility may also be utilized to identify a specific member that may be eligible for one or more merchant incentives based upon a transaction. For example, the transaction linking utility may utilize search information, member information including other recent transactions between the merchant and the member (e.g., assume member is likely to engage in future transactions with the merchant), frequency of transactions between the merchant and the member (e.g., member may be eligible for an incentive, which may be an increased discount or other augmented incentive, based on either frequent transactions with a merchant, or a particular number of past transactions with the merchant), and the amount of money spent in any transaction between the member and the merchant (e.g., member may be eligible for an incentive, which may be an increased discount or other augmented incentive, based on an amount of money spent in a transaction with the merchant), as well as any other post-transaction comments. Such parameters may be incorporated into a rule and the transaction linking utility may function in partnership with an analytics mode to identify member eligibility for an incentive.

An incentive may be communicated to a member through a variety of means, including a communication to a mobile device (e.g., a text, twitter, etc.), an email, a mailing, a telephone call, or any other means. The incentive may also be in many different forms, a sweepstake entry, a discount, a donation to a charity, rewards points, a coupon, or any other incentive form or combination of incentive forms (e.g., a donation to a charity and a discount, etc.).

The analytic mode of the present invention may be operable to suggest a contribution rate at which a merchant may donate a portion of its revenue from transactions involving members to a community program. This suggestion may be generated and provided prior to merchant boarding being completed. The donation rate may be a percentage of the total transaction amount. A specific community program or programs may be suggested to receive the donations. The donations may relate to one or more specific stores/branches/subsidiary locations of the merchant, and different rates may be suggested for different stores/branches/subsidiary locations of the merchant. Merchants may modify, accept or decline the suggested contribution rate or suggested community program(s) through the boarding interface. In some embodiments of the present invention, particular aspects of the donations may be set by the present invention that may not be modified or declined, for example, such as a minimum overall donation rate. The accepted donation rate and community program recipients may be stored in the merchant database as associated with the merchant profile.

The present invention may further offer suggestions regarding involvement between intermediaries and merchants in the marketing system prior to the completion of the merchant boarding process. The suggestions for involvement with intermediaries may include specific parameters. For example, a suggestion may be that a merchant be included in an advertising program offered by an intermediary. The suggestion may include text for the advertisement as well as the keywords to be used in the advertising program. Such suggestions may be generated based upon information accessible by the data mining tool, for example, such as data regarding similar merchants, the merchant's transaction history acquired as part of the store details, data from third parties such as search partners, social networks, financial card provider, community program, etc., or any other data accessible by the analytic mode. The merchant may amend, modify or decline the suggestions. In some embodiments of the present invention, particular aspects of the involvement with an intermediary may be set by the present invention that may not be modified or declined. The accepted involvement with an intermediary may be stored in the merchant database as associated with the merchant profile.

In one embodiment of the present invention, search details regarding searches by a participant for a merchant, a product, a community group, communication of an incentive, or other information, may also be tracked and stored by the marketing system. These search details may be utilized by the transaction linking utility to link a transaction to a search and/or an incentive. Search details may also be utilized to generate other information and/or reports, such as member preferences.

For example, a member may utilize the loyalty program engine of the present invention, accessed by the member through a web page, to initiate a search for a particular merchant and/or product. The transaction linking utility may track certain aspects of the online activity of the member, for example, such as the clicks by the member, the time the member spends on the merchant's web page, and any repeat clicks.

The present invention may involve a web-environment, or other inter-connected networked environment, wherein an operator of the marketing system can capture browsing and searching activities of a user. The browsing and searching may be web-browsing and web-searching activities. Data collected relating to browsing and searching by a user may include click activity, such as the webpages, specific information, or links clicked on by a user.

Data collected relating to browsing and searching may further include any copying, tagging, pasting, marking, and/or highlighting of information on a webpage or other page in the environment where the browsing and searching occurs, including any activity whereby information is stored to a library, a wish list, or any other information extraction activity. In one embodiment of the present invention the activities to copy, tag, paste, mark, highlight, store to a library, add to a wish list, or otherwise extract information may indicate heightened interest in particular information. The marketing system may identify such activities as indicating search or browsing activity that is more meaningful and therefore has as increased significance over searching and browsing without any copying, tagging, pasting, marking, highlighting, storing to a library, adding to a wish list, or otherwise extracting information. The increased level of significance may be recognized by the present invention and applied to activities of the marketing system, such as the analysis processes of the present invention.

In one embodiment of the present invention a means may be provided whereby a user may store any copied, tagged, pasted, marked, highlighted, or otherwise extracted information for easy access by the user in the marketing system environment. A skilled reader will recognize that a number of means may be applied, such as the provision of a wish list, a memo area, a library area, or any other means of storing specific information, preferably in an organized and easily accessible manner.

All browsing and searching related activities may be captured by the marketing system. In embodiments of the present invention the browsing and searching may occur through the use of a variety of communication devices, for example, such as a smart phone, a cell phone, a PDA, a tablet, a laptop, or other types of communication means. The browsing and searching data may be analyzed by the marketing system. Analysis of the data relating to may reflect in particular browsing and searching behaviours of the user and/or member undertaking the browsing and searching.

Embodiments of the present invention may include elements operable to support semantic searching. For example, a web search that is directed to a coat may be recognized by the marketing program to represent a search for a coat, as well as a search for related relevant terms, such as outerwear. In this manner the marketing system may recognize the relevance of particular searches and browsing broadly and may utilize this recognition in other operabilities of the marketing system, such as the determination of the likelihood or certainty of a match between a search and a transaction, as described herein.

The browsing and searching behaviours of members and/or users may further be identified as being related to other demographic or other attributes of the members and/or users. For example, the browsing by a member may be recognized as having relevance to the behaviours of the member, so that certain merchants, products or services are indicated as being of interest to the member, and those interests may further be related to a specific demographic or attributes of the member, such as the age of the member, the location where the member lives or works, or any other demographic or attributes of the member. The browsing and searching of a user who is not a member of the marketing program may also be analyzed, but the information to apply to this analysis may be less rich than the information applicable to the analysis of the browsing and searching by a member, due to the information available in the member profile, which is not available for a user who is otherwise unknown to the marketing system.

Information related to the searching and browsing and activities pertaining to the searching and browsing may be captured for the purposes of the marketing program for searching and browsing that occurs within the marketing program environment, as well as some searching that occurs in the environment of a third party, for example, such as a search provider or search engine operator. In embodiments of the present invention, searching and browsing facilities will be offered to members and other users within the marketing environment. A skilled reader will recognize the number of ways that searching and browsing facilities may be offered in the marketing program environment and how the browsing and searching information and related activity information may be captured by the marketing program.

For example, a third party search provider may form an agreement with the operator of the marketing program to allow the third party search facilities provided by the search provider to be integrated with the marketing program, so that the browsing and searching activities utilizing the third party search facilities may be accessed and utilized within the marketing program. As another example, an agreement may be formed between a third party search provider and the operator of the marketing program to create and support a link between the marketing program and the search facilities of the search provider, whereby the access to and use of the search facilities appears seamless to the user and/or member undertaking searching or browsing. As yet another example, a marketing program may include searching and browsing facilities that are part of the marketing program itself and are not provided by any third party. In all of these examples, the searching and browsing information, including any behavioural or other activity related information, will be gathered by, or transferred to, the marketing program.

Alternatively, or in conjunction with any of the search facilities examples provided herein, an agreement may be formed between one or more third party search providers and the operator of the marketing program, whereby a user may undertake searching and browsing outside of the marketing program environment. The one or more third party search providers may transfer data relating to searching and browsing, and any related activities, to the marketing program. The transferred data may be analyzed to determine if the data relates to any of the members or merchants of the marketing program. Data identified as relating to members or merchants of the marketing program may be stored in the data storage area or otherwise utilized by the data mining tool, the transaction linking utility and/or the analytics mode to undertake the functions of these elements of the present invention as described herein.

In some embodiments of the present invention particular benefits may be offered to merchants and members if the searching and browsing occurs within the marketing program environment. Searching and browsing conducted from within the marketing program may not be limited to merely the content available in the marketing program, or webpages of merchants that are participants of the marketing program. In embodiments of the present invention searching and browsing occurring within the marketing program may include linking to and otherwise accessing content and pages available from the Internet generally.

A skilled reader will recognize that the benefits and advantages offered by searching and browsing in the marketing program environment may offer motivation, or other encouragement to members to conduct searching and browsing in the marketing program environment. One such benefit is access to incentives provided in the course of searching and browsing, as described herein.

As another benefit, in one embodiment of the present invention a merchant may sponsor browsing and searching undertaken by a member, or by members having particular attributes or being within a particular demographic. For example, a merchant may pay to have an advertisement displayed on a webpage that is accessed during searching and browsing. The advertisement may be for the merchant, for a product or service, or for an incentive such as a donation to a community project based on a purchase or click activity during the searching and browsing. As an example, a merchant located downtown in a city looking to increase purchases by suburban members, may pay to have an incentive or advertisement appear on a webpage while suburban members are searching or browsing, and may by the activity of paying for the advertisement effectively sponsor the browsing and searching of the member. A skilled reader will recognize the wide range of means by which a merchant may sponsor browsing, and how the sponsorship of browsing may be directed towards an individual member, or to a group, category, or class of members, such as members having like attributes or demographics.

Another benefit may be that searching and browsing occurring within the marketing program environment may cause the collection and generation of a richer data collection regarding the searching and browsing and all activities related thereto. This may occur because more data is collected with the searching and browsing occurs within the marketing program environment than is collected when searching and browsing occurs outside of the marketing program environment. In particular, the marketing program may have the ability to control the level of data collected relating to searching and browsing when the searching and browsing occurs within the marketing program environment. This may assist in maximizing the collection of data achieved by the marketing program. The increase in the richness of data collected when searching and browsing occurs in the marketing program environment may be an advantage as it will enhance functions of elements of the marketing program, such as the data mining tool, transaction linking facility, analytics mode, and any analysis undertaken by any of these elements, for example, such as member behaviour analysis.

Browsing and searching within the marketing program may also have the benefit of facilitating the ability of the marketing program to collect data regarding the conclusion of browsing and searching sessions. For example, the analytics mode of the present invention may be operable to determine the reason for the conclusion of browsing and searching sessions. The analytics mode may be able to determine if a member logged out of a browsing and searching session, if a member walked away from a browsing and searching session, if a member navigated outside of the marketing program environment, or if a member ended the browsing and searching session for some other reason. A skilled reader will recognize the variety of determinations the analytics mode may make regarding the cause for the end of a browsing and searching session and how such determinations may add to the behavioural data that the analytics mode can generate relating to members.

The benefits and advantages that may be created by searching and browsing being conducted within the marketing program environment may have other effects. For example, members may undertake to conduct the majority of their pre-transaction searching and browsing, and other searching and browsing, in the marketing program environment. This may have an effect upon the amount of searching and browsing occurring in third party search provider environments and thereby have a marketplace effect as members are motivated to search and browse in the marketing program environment due to the benefits achieved by doing so. Additionally, the significance of searches and browsing occurring in the marketing program may be recognized to indicate a greater interest on the part of the user and/or member to undertake searches towards a future purchase, instead of merely searching and browsing without any intent to purchase. The intent to purchase may be affected by incentives that are either communicated to the user or member based upon the click activity and links accessed, or through advertisements appearing in areas accessed by the browsing and searching. Other factors may also cause the intent to purchase level to be increased generally for members undertaking searching and browsing in the marketing program environment. This increased intent to purchase could be applied as a factor in the determination of the likelihood or certainty that a search is linked to a later transaction.

In embodiments of the present invention, a qualified web environment may be created. In such an embodiment the whole of the marketing program environment may be incentivized in one or more ways.

One or more incentives may be provided to, communicated to, or otherwise made accessible by a user or member during browsing and searching. The provision of, communication of, or other access to, one or more incentives may occur at a variety of points during the browsing and searching. For example: one or more incentives may be displayed on a webpage as an advertisement; one or more incentives may be made accessible to a user or member upon a click upon the incentive; one or more incentives may be communicated to a communication device of a user or member, such as a smart phone, a cell phone, a PDA, a tablet, a laptop, or other types of communication means; or other communications or incentives or access to incentives may be possible. The incentives provided to, communicated to, or made accessible by the user or member may be of benefit to either the user or a community program, or an intermediary. For example: an incentive may be a coupon for redemption at a merchants providing a benefit to a user or member; or an incentive may be a donation to a community program that is made upon a transaction, or possibly even made based upon click activity or other browsing or searching behaviours or activities. A skilled reader will recognize that a variety of incentives may be provided, communicated or made accessible to a user or member in a manner related to the browsing and searching activities or other behaviours.

In another embodiment incentives displayed to, provided to, communicated to, made accessible to, or otherwise offered to the users or members during browsing or searching may be specific to the member or user. For example, an incentive may be one of several incentives that a merchant is offering to users or merchants. The determination to offer any incentive to a member or user may be based upon any details relating to the user or member recognized by the marketing program, such as: searching and browsing activities or other behaviours; attributes; demographic details; prior transaction history; prior searching history; semantic searching; or any other details which may be derived from user or member behaviours, activities or any stored information of the marketing program relevant to the user or member, or relevant to the browsing or searching activities or behaviours. The incentive may therefore be chosen to be offered to the user or member so that the incentive is specific to the user or member or to the browsing and searching. Providing an incentive to a user or member in a directed manner may increase the likelihood that the incentive will be accepted or otherwise redeemed by the user or member. For example, a user or member may: accept that an incentive that is a donation be made to a community member; download an incentive that is a coupon and redeem this either at a merchant's online or bricks and mortar store; or may otherwise utilize an incentive.

In embodiments of the present invention, incentives may be offered to a user or member during browsing and searching, as a result of browsing and searching, through other off-line media (e.g., newspapers, radio, television, etc.), at a merchant store location (including a bricks and mortar store or an online store, and based upon a transaction, as the result of multiple transactions, or for any other reason); or at any other location, including a community program location or event. A skilled reader will recognize the wide variety of incentives that may be offered to users and members.

A skilled reader will recognize that while some of the examples in this application discuss searching or browsing for a merchant, it is also possible to search or browse for a product or service. Therefore, searching and browsing activity may not only access a website of a merchant, but may instead access an online store, a catalogue, or another web environment where information or a link regarding a product or service is made available. All of the functions of the marketing program related to searching and browsing may be instigated if a user or merchant accesses a website environment other than a merchant website, or accesses merchant websites as well as other website environments during searching and browsing.

In one embodiment of the present invention an incentive may not be offered to a user or member during searching or browsing. However, as discussed herein, other benefits, and advantages offered by searching and browsing from within the marketing program environment may motivate users and members to conduct searching and browsing from within the marketing program environment.

Figure 8:
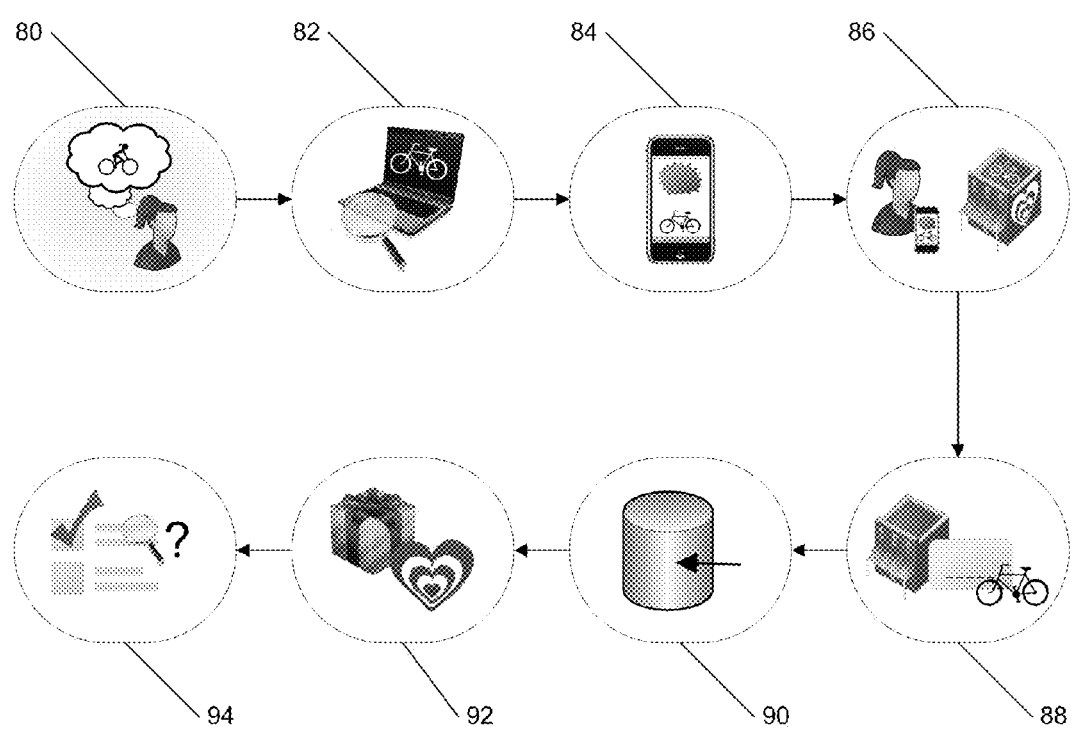
FIG. 8 is a flowchart showing the steps in one embodiment of the invention for a user to query a merchant and redeem an incentive at a merchant's bricks and mortar store location.

As shown in FIG. 8, in one embodiment of the present invention a user 80, such as a member, may utilize a communication means, such as a laptop, operable to access a search engine 82, such as a search engine accessed via an online means (e.g., the Internet, an intranet, or other online means), to generate a query. For example, the member may query to find a bike store located in a specific geographic region. The search engine may be provided by the marketing program or may be otherwise linked to the marketing program, so that the query results include at least one bike store that is a store of a merchant of the marketing program. The user may choose the merchant's bike store, by clicking on a link to the merchant's bike store appearing in the query results, or by any other means of choosing the merchant's bike store provided by the communication device. As an alternative, the user may search for bikes, and link through a set of click activities to a particular bike that is a product of a merchant of the marketing program. For example, the bike may appear in an online catalogue, or other webpage or form of information communication.

As mentioned above, the user may further highlight information about the merchant's bike store, or a particular bike, or otherwise extract related data. This may cause the system to recognize a heightened interest in the bike on the part of the user than is indicated by clicking on links whereby the bike may be viewed, or other activities relating to the bike. The indication of heightened interest in the bike may be utilized by the marketing system in its determination of the likelihood or level of certainty of a link between a search and a later transaction, as described herein.

The marketing system may undertake steps to recognize that the user is accessing the merchant's bike store online information, for example, such as accessing the merchant's bike store website. An incentive may be provided by the merchant to the user, for example the incentive may be communicated to a communication means specified by the user. The communication means may be the same communication means the user utilizes to perform the query, or may be another communication means indicated by the user. The communication means where the incentive should be sent may be set in the user's profile, or may be indicated by the user while the user is accessing the marketing program, or the merchant's bike store information. For example, the incentive may be a discount on the price of a bike communicated to a blackberry 84 as indicated by the user while the user is browsing the merchant's bike store website.

Once the incentive is communicated to the user the user may take the incentive to the merchant's bike store 86. The user may utilize the incentive and redeem it for a discount on a bike 88 during a transaction at the merchant's bike store. Details regarding the transaction may be transferred to the marketing program 90. A further incentive may be triggered when the details regarding the transaction are received and processed by the marketing program. For example, the further incentive may be an incentive such as a prize entry, or a donation 92 to a community program. The marketing program may match the transaction details to the search behaviour of the user if the user is a member of the marketing program. For example, based upon the transaction details that indicate that the member acquired an incentive that is communicated to users that access the member's bike store website, it can be assumed that the transaction resulted from the user query.

A post-transaction survey 94 may be generated and communicated to the user if the user is a member of the marketing program. For example, the survey may be communicated to the member the next time the member logs into the marketing program, such that the survey appears as a pop-up on the sign-in page after log-in, or the survey is accessible by a link shown on the sign-in page, or so that the survey is available to a member that is signed into the marketing program via some other means. Alternatively, communicated to a communication means belonging to the member or a user that is not a member, and be available to the user on that communication means, for example, such as a communication means indicated by the member in the member's profile or a communication means indicated by the user at another point, such as during the transaction, that is capable of accessing a communication, such as a blackberry message, an email, a text, or some other communication.

The post-transaction survey may be completed by the member and the information included in the survey may be processed by the marketing program. For example, the post-transaction survey information may be processed to indicate a link between the transaction and any earlier activity, such as the query by the user, or any other activity. The information in the post-transaction survey may be utilized to confirm the transaction behaviour of a user. This information may be stored by the marketing program and may be provided to the merchant, or other participants of the marketing program, in a variety of forms upon a variety of events, for example, such as the generation of a report by the merchant. The merchant may use this information to develop effective incentive programs, to evaluate the success of incentive programs, or for other purposes.

In one embodiment of the present invention the time elapsed between member online activity on a merchant web page, such as the query or search for the merchant's web page, and a transaction between the member and the merchant may be evaluated by the transaction linking utility. A maximum time lapse between a user's online search of a merchant and a subsequent transaction by the user at the merchant's store may be recognized by the marketing program. The maximum time lapse may be input by the merchant, or may be generated by the marketing program, or may be otherwise set in the marketing program. For example, the maximum time lapse may be generated by the marketing program in accordance with the merchant type, the item that is searched, the merchant preferences, or any combination of these. Other rules for matching a query or search to a transaction may be set, stored and utilized by the marketing program. Such rules may be modified at any time. In particular, the rules may be modified in accordance with the experience of a merchant. A merchant may also override the rules in specific circumstances.

The amount of time allowed for a maximum time lapse may further be member specific. For example, the marketing program may recognize that a longer period of time elapses between a member undertaking searching and browsing activity and a transaction for the merchant or item searched than the maximum time lapse allows. This extended period of time may indicate that a member has a reason which prohibits him or her from travelling to a store in a timely manner after searching and browsing an item or merchant. For example, the member may be a professional who has a work-schedule that prohibits frequent shopping. If the marketing program determines that transaction occurs following searching and browsing activity outside of the maximum time lapse for such a member, the marketing program may determine that there is still a likelihood of a match between the searching and the transaction in the case of this specific member based on past member behaviour. Therefore, the marketing program may adjust the maximum time lapse to a longer period relative to the historical data relating to the particular member.

The location of a member in relation to the location of the merchant store may also be a factor that is considered when determining a reasonable time lapse between the search and the transaction. For example, if the store is identified by the marketing program as being a significant distance away form the location of the member, the maximum time lapse may be extended to recognize searching and transactions occurring at periods in time more distant than the maximum time lapse as having a likelihood of matching.

The time and date of a search in relation to a transaction may also be a factor that is considered when determining a reasonable time lapse between the search and the transaction, in accordance with historical data relating to searches and transactions by a member. For example, a search undertaken by a member on a Sunday night and a transaction occurring on the following Saturday, or at another day that is beyond the maximum time lapse, may be recognized as having a likelihood of being a match if the member transaction history shows the member only shops on alternate weekends, or in another such pattern of time.

The type of communication devices utilized for searching and browsing prior to a transaction may also be a factor that is considered when determining whether there is a link between a search and a transaction. For example, if the search occurs on a communication device that is portable, such as a smart phone, a cell phone, a PDA, a tablet, or other types of portable communication means, this may indicate that the search is made on the fly. This may further indicate that the search is related to a need that is recognized while a user or member is travelling. Therefore, the use of the device may indicate an increased intent to purchase a product or service, or to shop at a particular merchant's store. For example, the search may be conducted while a user or member is already out shopping and has realized that they need another product or service. Therefore, the use of certain portable communication devices to conduct a search may indicate a different level of purchase intent and may also indicate a different reasonable time lapse for a user or member to make a transaction based upon a search. Such an application of the marketing program may further recognize the distance between the user and/or member and the location of the merchant store that was searched, or is where a searched product or service is available. If the distance is determined to be significant than a longer period of time lapse between the search and a transaction may be deemed acceptable to indicate that the transaction is a result of the search.

As skilled reader will recognize that a variety of factors may be utilized to determine if a transaction is likely to have been the result of a search. These factors may differ for specific members, based upon prior data collected by the marketing program and analysis of this data to indicate member behaviours. A skilled reader will also recognize the richness of rules and tools that the marketing program may utilize to undertake the analytics involved in matching transactions and searches and indicating likelihoods or certainties of relationships therebetween.

In embodiments of the present invention a transaction may occur online (e.g., via a website) or offline (e.g., at a brick and mortar store location, or at another physical location where the merchant is selling products or services such as, for example a kiosk, booth or other location). The tracked information may be utilized by the transaction linking utility to determine if the transaction represents a sale that occurred as a result of the search request by the member that resulted in the member arriving at the merchant's web page. A post-transaction survey may also be provided to verify that the transaction occurred as a result of the search. A skilled reader will recognize that a variety of variables may be utilized by the transaction linking utility to determine if a transaction occurs as result of a member's search on the marketing system, and that these variables may be governed by rules, or other means implemented by the marketing system.

In one embodiment of the present invention, the marketing program may utilize the transaction linking utility to estimate matches between a member's, or other user's, searches, search engine click stream and the member's or user's transactions at the merchant. Such estimate of matches may be undertaken to produce variable degrees of certainty for the match, or likelihood of a match between a search and a transaction. Examples of the certainty that may be indicated by varieties of searches, search engine click stream and transactions, include the following:

a single search by member or a user of a merchant's website or other information pertaining to that merchant that is followed by a transaction at the merchant's store (either an online or offline store) and a post-transaction survey is not provided corresponding to the transaction may be considered to indicate a low level of certainty that the transaction occurred as the result of the search by the member or user of the merchant's website or other information pertaining to that merchant or the merchant's products and/or services;

a single search session by a member or a user of a merchant's website or other information pertaining to that merchant that includes multiple clicks on marketing system information (for example, such as a member or user clicking to select a merchant then clicking to accept an incentive offered by the merchant) that is followed by a transaction and a post-transaction survey is not provided corresponding to the transaction may be considered to indicate a moderate level of certainty that the transaction occurred as the result of the search by the member or user of the merchant's website or other information pertaining to that merchant or the merchant's products and/or services;

multiple related searches (for example, such as searches of the website or other information relating to the same merchant undertaken by the same member or user across multiple search sessions) occurring prior to a transaction between the member (or user) and the merchant that was searched and a post-transaction survey is not provided corresponding to the transaction may be considered to indicate a moderate level of certainty that the transaction occurred as the result of the search by the member or user of the merchant's website or other information pertaining to that merchant or the merchant's products and/or services;

any search by a member or a user of a merchant's website or other information pertaining to that merchant, the search being followed by a transaction that a post-transaction survey is provided for that confirms that the transaction occurred as a result of the search may be considered to indicate a high level of certainty that the transaction occurred as the result of the search by the member or user of the merchant's website or other information pertaining to that merchant or the merchant's products and/or services;

a transaction between a member or user and a merchant that is not preceded by any search by the member or user of the merchant's website or other information pertaining to that merchant may be considered to indicate that the transaction did not occur as the result of any search by the member or user of the merchant's website or other information pertaining to that merchant or the merchant's products and/or services; and a transaction between a member or user and a merchant that is preceded by a search which included the member or user highlighting or otherwise extracting information regarding a product or service that is part of the transaction may be considered to indicate a moderate level of certainty that the transaction occurred as the result of the search by a member or user pertaining to that merchant or the merchant's products and/or services.

In one embodiment of the present invention, it may be possible for the marketing system to recognize that items purchased with a searched item may also be linked to the original search. For example, a user or member may search for a coat sold by the merchant. Later the user or member may purchase the coat through a transaction at the merchant's store. Other items may be purchased in the same transaction by the member or user. The other items purchased with the coat may be recognized by the marketing program to have occurred as a result of the search for the coat. Tracking the purchase of the extra items besides the coat may provide a means of capturing information related to the purchasing behaviours of the user or member purchasing the coat and the other items. This information may be utilized for the purpose of other analyses conducted by the present invention.

As another example, the search may involve the communication of an incentive to a member. In this embodiment of the present invention, a member, or other participant, may login to the marketing system website. The member may be considering purchasing a particular item, such as a bicycle, and consequently may utilize a search option to look for merchants who are members of the marketing system and are bicycle sellers. The member may also search bicycles, and the search may involve merchants of the marketing system. The present invention may recognize that the search occurred (as described in this application the search may occur online through a search provider that is linked to the marketing system, or a search provider that is not linked to the marketing system, or by other search means). The results of the search may either present an incentive to the member on the webpage, or may cause an incentive to be communicated to the member by some other means, such as to a member's mobile device, to the member's email address, etc. If the member later purchases the bicycle, either online or at the physical location of the merchant's store, and redeems the incentive, this information will also be stored in the present invention data storage area. The transaction linking utility may be utilized to provide results that indicate that the search for the bicycle and the purchase of the bicycle occurred within a period of time that would suggest a link between the search/incentive and the purchase.

Identification of the link between the search/incentive and the purchase may indicate that the incentive may have influenced the transaction. Data reflecting that the incentive influenced the transaction may identify the incentive as successful to cause the transaction. Such data may be utilized evaluate the overall success of a particular incentive. An evaluation regarding the success of a particular incentive may be useful when either the merchant or the marketing system considers suggestions for possible new incentives.

In one embodiment of the present invention, the search for a particular product may occur outside of the marketing system. For example, the search provider operating the system where the search occurred outside of the marketing system may make use of an Application Program Interface, or another electronic data transfer means to send information to the marketing system. The marketing program may process the information received from the search provider. It may also be possible that multiple search providers may operate within the marketing system, and that multiple search engines may be used by users or members outside of the marketing system and that the search information relating to these search providers and search engines may be transferred to the marketing system for processing.

In another embodiment of the present invention, the incentive offered to a member may be dependent upon the existence of any link between the marketing system and the search provider. This means that more than one incentive may be developed to be offered to members. A member will be required to provide one or more identifications, or participant identifiers, to the search, whereby the search will recognize the user as a member of the marketing system. In one embodiment of the present invention the provision of one or more identifications pertaining to a member may be facilitated by the marketing system in a manner whereby the provision of the one or more identifications appears as seamless to the member utilizing the marketing system.

Should a member utilize a search provider that is not connected, or otherwise linked, to the marketing system to search a product, the marketing system may cause a particular incentive to be communicated to the member pertaining to the purchase of the searched product and/or other products. However, should a member utilize a search provider that is connected, or otherwise linked to the marketing system, such as, for example, a search provider accessible from one or more of the marketing system webpages, a search provider that is affiliated with the marketing system, or a search provider that is otherwise connected or linked to the marketing system, a different incentive may be offered to the member pertaining to the purchase of the searched product and/or other products.

As an example, use of a search provider that is not linked to the marketing system may result in the provision of an incentive that is a price reduction of 10%, whereas use of a search provider that is linked and/or connected to the marketing program may result in the provision of an incentive that is a price reduction of 30% and/or a donation equivalent to 15% of the price of the product to a community program. In some embodiments of the present invention the incentive provided as a result of a member utilizing a search provider that is connected or otherwise linked to the marketing system may offer greater rewards to the member than the incentive provided as a result of a member utilizing a search provider that is not connected or otherwise linked to the marketing system. A skilled reader will recognize that a variety of incentives may be offered both to members that utilize a search provider linked or connected to the marketing program as well as to member that utilize a search provider that is not linked or connected to the marketing program.

An incentive may also be communicated to a member, or other participant, without a search being undertaken. Incentives may be displayed on a webpage or communicated to a member by another means, such as via a mobile device, email, through the mail, announcement at an event the member attends, or any other means. The marketing system may store information indicating the date and/or time of the communication of the incentive to the member. The marketing system may further be able to identify the redemption of the incentive. Should the redemption of the incentive meet particular criteria in relation to the communication of the incentive, such as, for example the redemption of the incentive, which may be in conjunction with a transaction, occurs within a specified period of time after the communication of the incentive to the member, then the marketing system may identify the transaction as being influenced by the incentive.

A skilled reader will recognize the variety of searches that may be facilitated by the marketing system and the variety of results, and uses thereof, that may be facilitated by the transaction linking utility, the data mining tool and may involve the analytic mode. A skilled reader will further recognize the variety of data rules that may be set to indicate a link between a transaction and other member behaviours or activities, such as searching for an item online.

In one embodiment of the present invention an analytic mode may be engaged to function in connection with the transaction linking utility to produce reports, reviews or other feedback for participants interested in identifying instances where a transaction occurred as a result of a search by a member undertaken by the marketing program.

Figure 2:
FIG. 2 is a view of a merchant incentive communicated to a smart phone.

As shown in FIG. 2, the system may be linked to a variety of communication means 20, for example, such as a smart phone, a cell phone, a PDA, a tablet, a laptop, or other type of communication means, whereby details may be uploaded and downloaded from the loyalty engine. For example, the system may be linked to a smart phone belonging to a member, whereby incentives may be disseminated to the member via the smart phone. In this manner a coupon 22 may be disseminated to a member and communicated by the loyalty engine to the member's smart phone. The coupon may further include a bar code, a unique reward identifier, or other intelligent information.

Additionally, information entered into a communication means, such as a smart phone, may be transferred to the loyalty engine and ultimately stored in the data storage area. For example, a survey may be disseminated to a member whereby the survey is available to the member on the member's smart phone. Responses to the survey made by the member via the smart phone may be transferred to the loyalty engine and thereby stored in the data storage area. A skilled reader will recognize that data may be transferred to and from the loyalty engine, to merchants, members, intermediaries or any other third party.

Administrator Registration, Interface and Functionalities

In one embodiment of the present invention, the marketing program may be hosted by an administrator. Said administrator may be an individual or an organization. Access to the marketing program, including access to some and/or all data may be provided to an administrator. Generally the administrator access to the marketing system may differ from access provided to others: access to the marketing system, including access to anonymized data may be provided to merchants and members; and limited access to the marketing program may be provided to third parties and/or intermediaries. The marketing system may be operable to allow an administrator to input particular data, including data pertaining to community programs.

The administrator may undertake a search for community programs. This search may utilize information available via the Internet, other databases, telephone services (such as those provided by some municipalities, media outlets, etc.), and other data sources. The administrator may also be provided information regarding community programs by third parties.

All details relating to the community programs may be stored in the data storage area of the marketing program. The data mining tool may be utilized to provide reports or lists providing information related to the community programs, for example, such as a list of community programs in a specific location (e.g., a town, a city or a borough, etc.).

In one embodiment of the present invention, the administrator may utilize the administrator access facilities of the marketing system to provide information to a merchant regarding community programs occurring, or about to occur, in a location nearby to one or more of the merchant's stores, or information regarding members. A merchant may utilize this information to develop incentives relating to one or more of the merchant's stores. The incentive may be a coupon, sales discount, give away, sweepstakes entry, donation to a community program, or any other incentive. The incentive or information regarding the incentive may be disseminated to a member.

The marketing system may also be operable to allow the administrator to generate lists, reviews, reports or other information to be provided to prospective merchants, members and/or intermediaries to cause them to consider registering with the marketing program.

In some embodiments of the present invention, a fee may be charged for any request for information, lists, reviews, reports generated by an administrator. A skilled reader will recognize the variety of types of fees that could be charged, such as, for example a fee for each request, a fee per lines on a report, and other types of fees.

Merchant Registration, Interface and Functionalities

A merchant may join the marketing program by registering. A merchant may be an online merchant, a merchant having one or more brick and mortar locations, or any other merchant. A merchant may identify the location of any bricks and mortar locations to the marketing system along with other merchant profile information. Merchant profile information may be provided to the marketing system at the time of registration as well as at points in time after the initial registration occurs.

A registration interface may be provided to the merchant via a web page, via a mobile device, or via any other means. The merchant information may include a variety of information, for example, such as a merchant participant identifier, the location of the merchant's store(s), the merchant's target clientele, etc. The merchant information may allow the marketing program to link a financial card or other billing system to the merchant.

Figure 3:
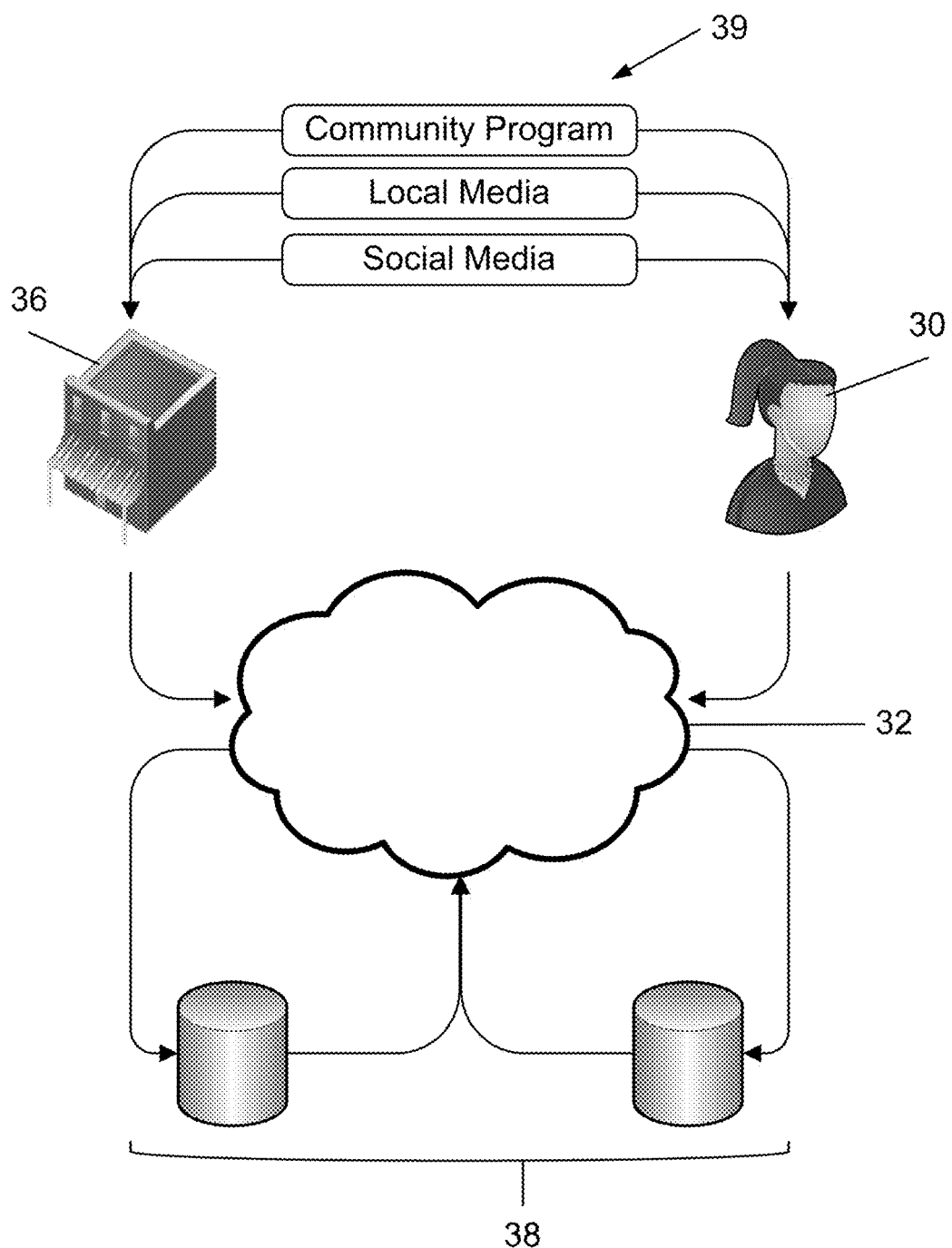
FIG. 3 is a systems view of a data transfer between a merchant, a member, the marketing system and a data storage area.

As shown in FIG. 3, a merchant 36 may register with the marketing program of the present invention to become a participant. Registration may be facilitated by one or more registration means as described in more detail below. Registration may further occur through an interface 32, for example, such as a web page, etc. Information regarding the merchant, for example, such as the merchant's name, its store locations, its website and web page information, and other details may be provided by the merchant at registration, or at any later point, and stored in the data storage area 38. A merchant may develop merchant incentives, and may communicate these to members through a variety of means 39, including the marketing system web-pages, any merchant and/or intermediary web pages, social media (e.g., web pages, Facebook™, Twitter™, etc.), local media (e.g., radio advertisements, print media, television broadcasts, etc.) and through relationships with community programs (e.g., the community program promotes the merchant, for example, such as through a link from the community program website to the merchant's website, use of the merchant's logo or brand on community program materials, announcements of merchant incentives at a community program event, etc.). A skilled reader will recognize the variety of options that may be used to communicate an incentive to participants and/or third parties.

In embodiments of the present invention, the marketing program may provide an automated online boarding means, a manual boarding means or a hybrid of an automated and manual boarding means. For example, a merchant having an existing registered merchant identification with another pre-registered financial program may be provided with a registration interface by the present marketing program, for example, such as a web page. The interface may include a means whereby merchant transactional information and preferences may be imported from the pre-registered financial program to the marketing program. The imported information may be stored in the data storage area as part of the merchant profile.

The automated online boarding means, or a hybrid of an automated and manual boarding means, may include one or more of the following options: merchant and/or merchant store information may be populated through a combination of merchant representative input and data stored in electronic sources, including third party sources; or merchant and/or merchant store information may be populated through a combination of merchant representative input and data collected through transactions with the merchant and/or merchant stores. These options that may be included in embodiments of the present invention are described in more detail herein.

As an example, the information utilized to populate the merchant registration, and/or merchant store registration, may include the merchant identification (such as an identification number), credit card information, or automated clearing house billing information already linked to a database. Additionally, the one or more forms of payment used with the pre-registered financial program may also be linked to the marketing program as tokens. Said tokens may be used to track transactions made with the associated forms of payment.

A skilled reader will recognize that the options for auto boarding merchants may be utilized individually or collectively for the purpose of performing automated boarding for merchant registration.

Auto Boarding Utilizing Merchant Input and Available Data Sources

Figure 12:
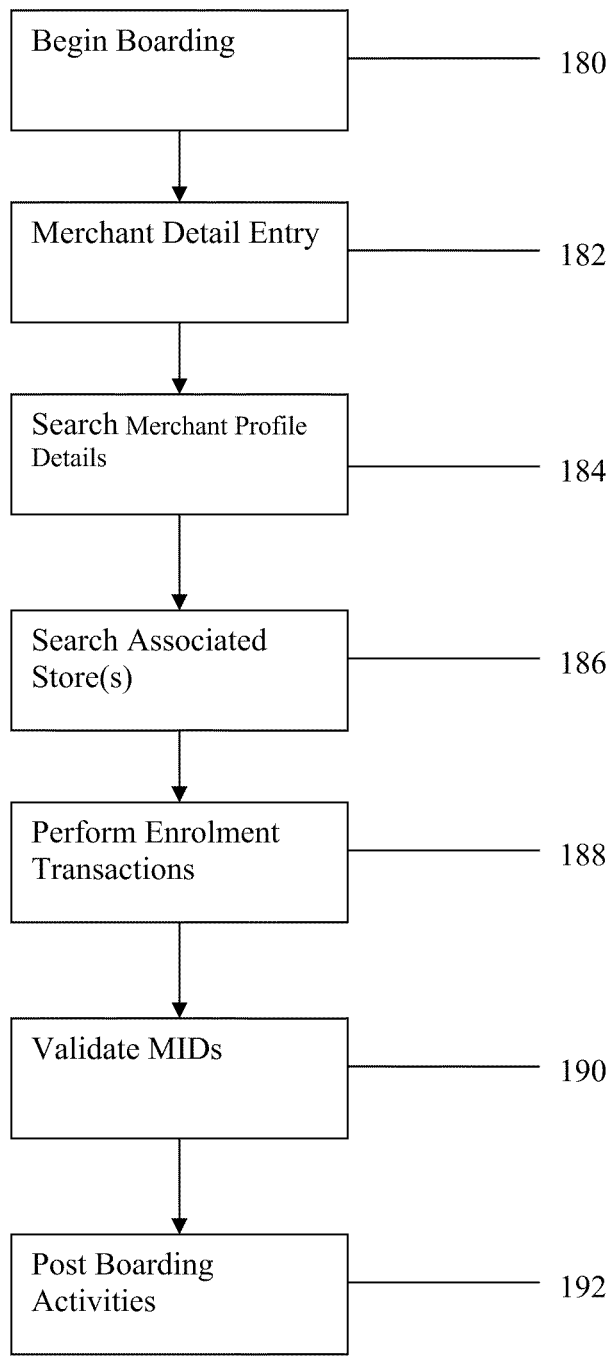
FIG. 12 illustrates a method of automated merchant boarding to automatically populate merchant and store details in accordance with the present invention.

In another embodiment of the present invention automated merchant boarding may be provided. The automated merchant boarding may involve different processes. As shown in FIG. 12, the automated merchant boarding may begin 180 as a merchant, or merchant representative begins registration. For example, a registration screen may be provided to a merchant. The entry of merchant details 182 may be the next step. For example, the screen may include data areas where information pertaining to a merchant may be entered by a merchant representative. Such information may include such information as is necessary to uniquely identify the merchant. For example the merchant representative may be required to provide any of the following information: merchant name, head office address, head office phone and/or fax numbers; legal business name of merchant; business type (e.g., sole, corporation, partnership, etc.); store type (e.g., retail store front, internet site, business office, residence, bank, etc.); franchise/chain name and/or location number; business DBA; business federal tax ID; IRS employer identification number; merchant contact information; and merchant administrator contact information. The information provided to the marketing system may be stored in one or more storage areas, for example, such as a data storage area of the marketing system.

The system may conduct a search for merchant profile details 184, and thereby reduce the amount of data entry that a merchant representative is required to undertake to register a merchant. Should the merchant have stores, or other locations related to it, then these stores or other locations may also be registered with the system. The system may undertake searches for details of the associated stores 186 in a similar manner to how it searches for merchant profile data. Another means of registering stores may be to perform enrolment transactions 188 at the stores and to collect store registration details for the enrolment transaction information. This process may require a validation of merchant payment processing identifiers (MIDs) 190. Once boarding is complete then post boarding activities 192 may be engaged in.

In some embodiments of the present invention, if the merchant representative is unable to provide one or more pieces of information pertaining to the merchant, the marketing system may provide resources and/or suggestions to assist the merchant representative in locating the information. Suggestions to assist the merchant representative may be stored in the data storage area, or another storage area accessible by the system. The suggestions may reference specific data input, for example, such as financial information, or other types of data required to be populated during a merchant and/or merchant store registration. Resources, such as online databanks, or other resources accessible by the system, may also be provided to the user. For example, a user requiring financial information assistance may be directed to a website displaying contact information of the bank that has been entered by the user as the bank of the merchant. A skilled reader will recognize the variety of suggestions and resources that may be provided to a user by the system As an example, a user may enter information into the system as part of a registration process, or may leave a field blank where he does not have the information that is required to be entered. If the entered information validation fails, or if fields are left blank, the system may determine that the user requires assistance. The system may search the suggestion and resource storage areas to determine if there is assistance appropriate to the fields left blank or that were not validated. The suggestion may be a text, for example, such as "Review prior tax forms" for a tax data field. A resource may be provided as either a link that may be activated by a user, or the presentation of the resource to a user. The resource may be a website, a databank, or some other resource of information.

The suggestion and resource may be selected in accordance with a specific field, and may also involve other information inputted into the system. For example, the name of an accounting firm that the merchant works with may be inputted by the merchant representative, and the name of the accounting firm may be utilized by the system if other financial and/or accounting information is not provided. The system may utilize the name of the accounting firm to provide a resource that is a website displaying the accounting firm contact information. Or the system may utilize the name of the accounting firm to provide a suggestion that says "Contact your accounting firm" and includes the name of the firm in the suggestion. A resource and a suggestion may be presented simultaneously to a user. For example, at the same time as a resource that is the accounting firm contact information is displayed to a user, or a link to this webpage is provided to the user, a suggestion may be displayed to the user about the portion of accounting records that may include the required financial and/or accounting information. The suggestion may state "Review prior tax returns".

The suggestion and/or resource may be displayed to the user in a variety of means. For example, the suggestion and/or resource may be displayed to the user so that the field remains accessible by the user for input. The display of the suggestion and/or resource may be beside the field, or immediately above or below the field. It may also be possible that suggestions and/or resources relating to a field are displayed only when a cursor is positioned over a field, or when a field is touched on a touch screen, or when the field is otherwise indicated or activated in accordance with the options provided by the elements of the system.

As described herein, in some embodiments of the present invention particular types of information, or a particular amount of information that must be entered by the merchant representative for the information to be accepted by the marketing system. Should such information requirements not be met then the information may be rejected by the marketing system and not be stored. A rejection message may be communicated to the merchant representative. For example, a text warning stating that the registration attempt has been rejected may be displayed on the screen of the computer or other electronic device that is used by the merchant representative to access the marketing system.

In one embodiment of the present invention, the administrator of the marketing system may set a variety of parameters or rules to govern the merchant registration process. A skilled reader will recognize that a variety of rules and/or parameters may be set by the administrator of the marketing system pertaining to many aspects of the registration process. The following examples are merely some of the possible rules and/or parameters that may set to govern the registration process. The merchant representative may be required to provide a predetermined minimum set of unique merchant information before the merchant profile, or any portion thereof, may be saved by the marketing system. The marketing system may initially save the information provided by the merchant representative in a pending state.

In an embodiment of the present invention having predetermined rules and/or parameters set regarding a predetermined minimum set of unique merchant information that must be entered, and the predetermined minimum set of unique merchant information is not entered, and an attempt is made to save the merchant information that is provided as a merchant profile, the present invention may react in a variety of ways. For example, the present invention may provide a warning message to the merchant representative stating that more information is required to save the merchant profile. The present invention may also highlight the required predetermined unique merchant information that needs to be entered before a merchant profile may be saved, so that the exact required information is apparent, in particular to the merchant representative.

Alternatively, the present invention may provide suggestions regarding where the required predetermined unique merchant information may be located. Depending on the type of information that is required to be entered, the means applied by the present invention to provide suggestions as to where the required information may be located may differ. For example, for required information that is commonly accessible from a particular source, as categorized and recognized by the present invention, the present invention may include a standard suggestion that it provides. In this example, the required information may be identified as being of a particular category, such as accounting related information. The present invention may be operable to determine the category of the required information and may provide suggestions in accordance with the category of required information. In the case of required information that is accounting related information, the present invention may provide a standard suggestion that the required information may be provided by a company accountant. Other suggestions may be provided by the present invention for other categories of required information.

A variety of mechanisms may be provided by the present invention to assist a merchant representative with providing all required merchant identifiers and/or completing a merchant profile. For example, the mechanisms may include suggestions, references to third party information sources (e.g., websites, advertisements, etc.), third party on-line request forms, or predefined email request forms.

The present invention may as another option cancel the registration process and fail to save any of the information that is entered by the merchant representative if required information is not entered and the merchant representative does not enter such information.

In some embodiments of the present invention a time limit may be set for provision of the required information. The time limit may be set by the administrator of the system or another authorized user. Should the information not be provided within the time limit the present invention may cancel the registration, or provide any warnings, upon the time limit being reached. In the circumstance that the boarding process is not completed, or otherwise resumed, within the time limit the merchant profile may be terminated. Any inputted or otherwise populated information may be deleted.

Before the time limit is reached the system may generate and transmit a notification regarding the time limit, for example, such as its starting point, end point, duration so far, etc. The notification may be transferred to the merchant representative as well as other users, such as a contact included in the merchant profile created to the present point. A notification may also be sent if the time limit is reached and the merchant boarding process is not completed to alert the merchant representative and possibly other contacts that were included in the merchant profile create prior to termination that the boarding process has been terminated and all details deleted.

Figure 14:
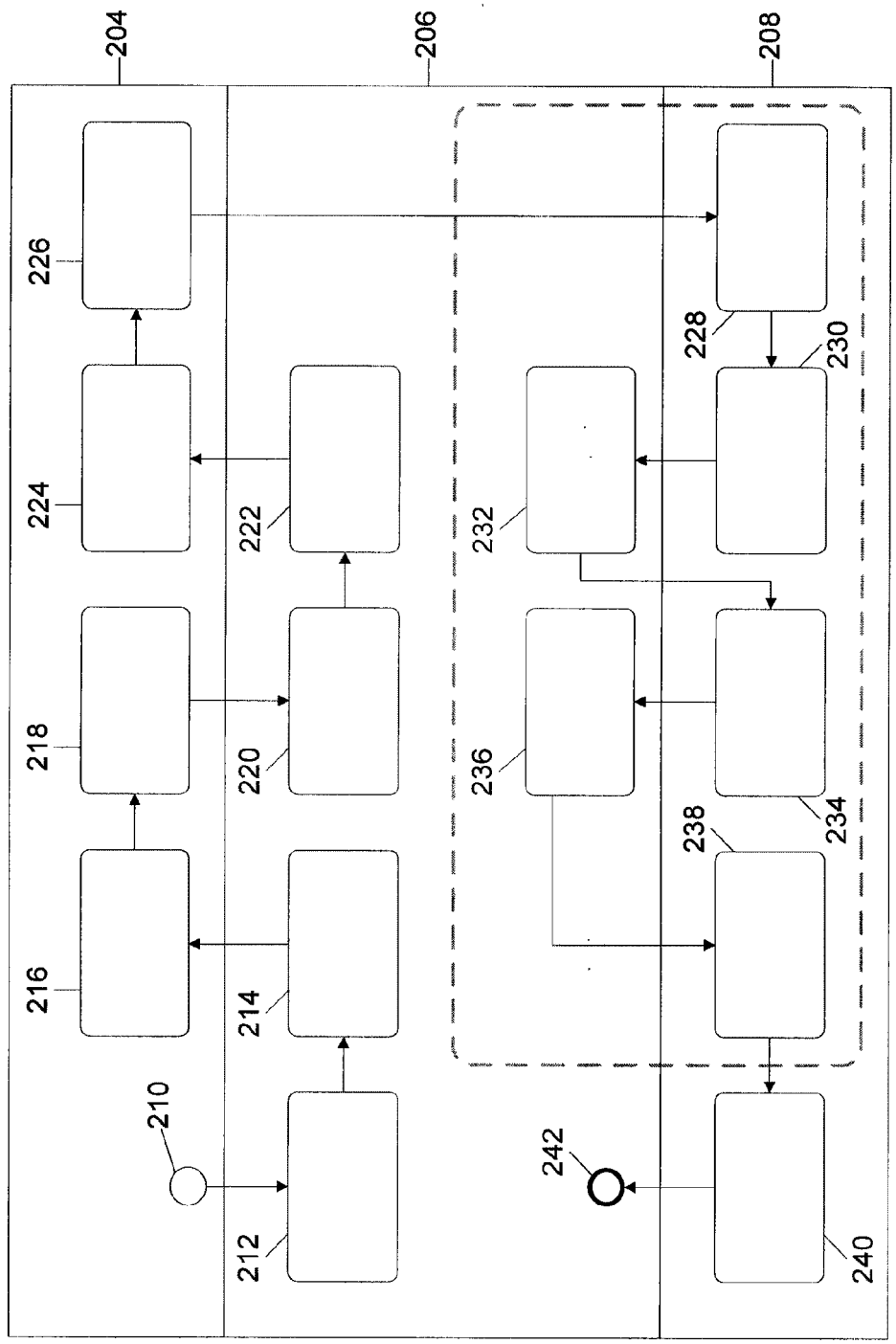
FIG. 14 illustrates a method of automated merchant boarding operating on an automated merchant boarding module, a merchant system, and the marketing system that may be incorporated in one embodiment of the present invention.

In one embodiment of the present invention, as shown in FIG. 14, a merchant representative may connect to the system 210 and may initiate a merchant registration process 212 by entering information related to a merchant, such as unique merchant information 214. The automated boarding process may engage a variety of layers of the present system, including an automated merchant boarding module 204, a merchant level 206 and the core system 208 that is the marketing system. A merchant may interact with the merchant level to input information, or confirm information, at the merchant level.

If the merchant representative does not enter all of the required merchant information, then the marketing system may undertake a search 216 of the merchant data stored in the data storage area, and/or data stored in another data source, and search for information that may pertain to and may aid the merchant registration process. The initially entered merchant information, including any entered merchant identifiers, may be transferred directly to the owner of the data storage to be searched in the course of the search.

The present invention may retrieve certain details pertaining to a merchant as a result of the search. The system may request confirmation of the details 218, for example, such as by displaying the one or more possible details retrieved by the search to the merchant representative in a manner whereby the merchant representative may select the details. For example, the search may retrieve one or more possible details for one or more data fields that are part of a merchant profile and/or store or other location details. All of the options may be presented to a merchant representative, possible options may be presented individually, or a specific number of options may be presented at one time. A skilled reader will recognize that variety of methods of providing possible details to a merchant representative. The merchant representative may confirm correct details by selecting the details.

Once all details are provided or selected by the merchant representative that are necessary to validate a merchant profile (which may be less than all of the possible details that may be completed for a merchant profile) the merchant profile may be confirmed 220 by the merchant representative. In order to confirm a merchant profile at least the data fields that are marked as required fields must be populated.

Once general merchant details are stored in a merchant profile, the system may also accept or search for details relating to specific merchant stores, or other locations relating to the merchant. For example, the system may search for locations relating to a merchant where merchant transactions may occur. A skilled reader will recognize that several methods and elements may be applied by the present invention to search for locations related to a merchant.

The marketing system may undertake a search of the merchant data stored in the data storage area and/or data stored in another data source. The marketing system may search for merchant identifiers 224 related to the merchant profile or specific merchant stores. The merchant may be boarded into the core system 226 by the automated merchant boarding module. At the core system level the merchant boarding information may be received 228. Training materials 230 may be provided to the merchant representative from the core level so that the merchant may view the training material 232. Pre-loaded rewards or incentives may be generated by the core level 234, and the merchant representative may approve, edit or otherwise respond to the pre-loaded rewards or incentives 236. Any pre-loaded rewards or incentives approved by the merchant representative may be recorded 238. The merchant profile may be activated 240 and may become fully engaged by the merchant representative on the system 242.

Once the merchant boarding information is received, the core system may engage in post boarding activities.

In another embodiment of the present invention, a merchant representative may be provided with only a select number of fields for input. The other fields will be expected to be populated as a result of a search of the data storage areas utilizing the inputted fields as the basis for the search.

Figure 15:
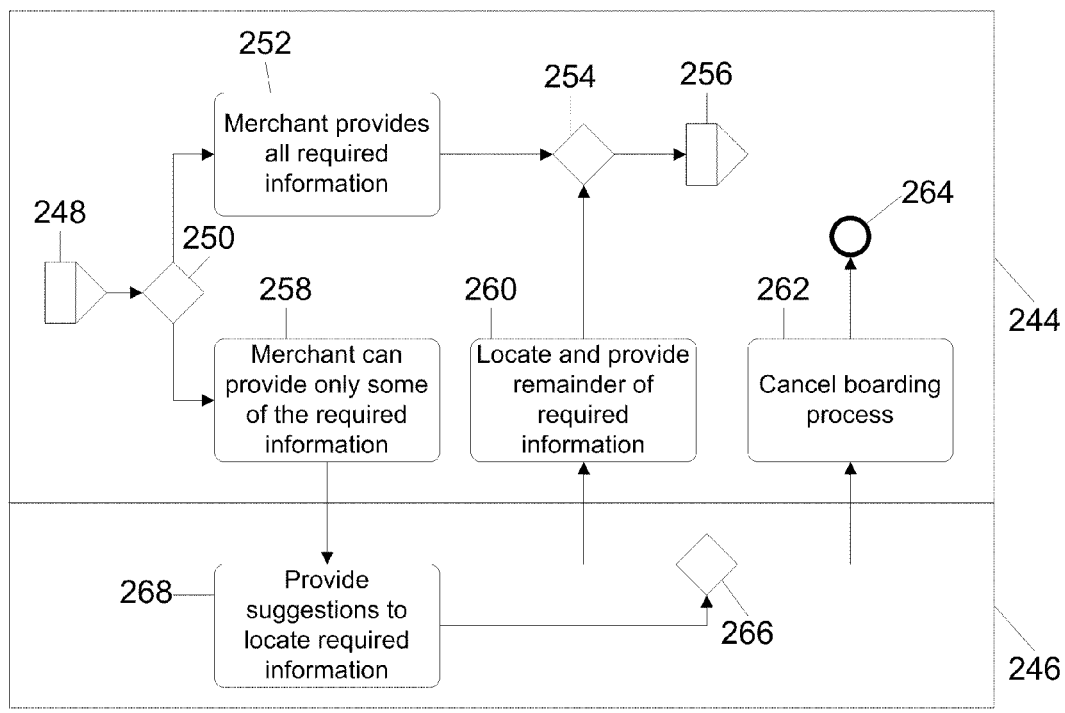
FIG. 15 illustrates a method of collecting merchant information and other data in the course of automated merchant boarding that may be incorporated in one embodiment of the present invention.

Generally the entry of merchant information involves the merchant level 244 and the automated merchant boarding module 246, as shown in FIG. 15. The merchant representative may provide merchant information 252, this information may be reviewed by the system 254, and a search may be preformed based on this information 256. The system may alternatively 250 require a merchant representative to provide only some information 258. Based on the information that is not provided (so that certain data fields are not populated) suggestions may be provided 268 as to where the information that is not provided may be found 268. The system may provide the option 266 to cancel the boarding process or to accept more details from the merchant representative. The system may offer these options to a merchant representative, or may determine which option will be chosen based on criteria, such as a parameter that causes the boarding process to time out after a certain period of time lapses. If the system acts on the option to cancel the boarding process then the process is cancelled 262, and the system session may end 264. If the system acts on the option to allow the merchant representative to enter more details, then such details may be provided 260 and the system may move on to review 254 and search 256 steps.

The system may undertake a search based upon details entered by a merchant representative regarding a merchant. This search may locate information for one or more potential matching merchant profiles. For example, the merchant identifier information entered, such as federal business tax identification, by the merchant representative may be transferred directly to the owner of the data storage to be searched. The merchant identifier information may be compared to the information in the data storage to find one or more matching merchant profiles. The searching method may engage several levels of the system and may involve third party systems.

Figure 16:
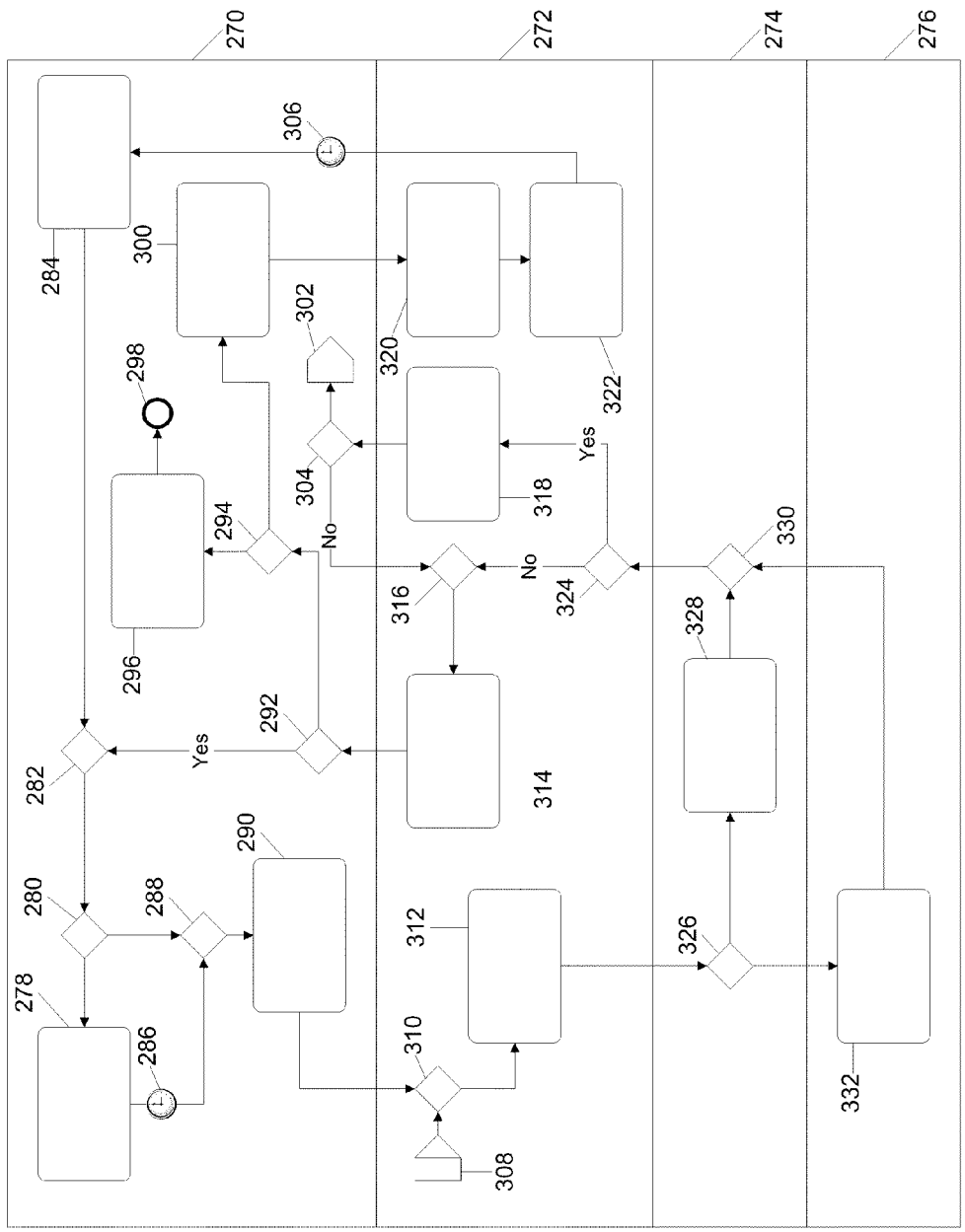
FIG. 16 illustrates a method of collecting merchant information and other data that is not provided by the merchant in the course of automated merchant boarding that may be incorporated in one embodiment of the present invention.

As shown in FIG. 16, the system may engage a merchant level 270, an automated merchant boarding module 272, matching sources 274 (that may be third party systems), and a third party database 276 (such as a financial card system, or other third party system). The system may recognize merchant details entered by a merchant representative 308 and may review the details provided 310. The automated merchant boarding module may identify any merchant identifiers included in the information provided and may generate a search based upon these identifiers 312. Depending on the type of identifiers the module may determine which system to utilize in any attempt to match the identifiers 326. For example, the system may undertake matching in one or more of the matching sources 328, and/or may access a specific third party database to undertake matching 332 (such as matching an identifier that is an identifier stored by a financial card system in a financial card system database). The system may collect the results of the matching attempts 330 and send these to the module. The module may review the matches 324 to determine if any matches were located.

The one or more potential matching merchant profiles that are located by way of the search of the one or more data sources may be provided to the merchant representative 318. The merchant representative may choose any of the potential matching merchant profiles 304. For example, a merchant representative may be presented with a list of potential matching merchant profiles and may click upon one of the listed potential matching merchant profiles to select that specific potential matching merchant profile. Upon selecting a potential matching merchant profile, the information from that matching merchant profile may be transferred into the merchant registration process as merchant information 302, including merchant information that may be utilized to identify the merchant.

The transfer of merchant profile information may cause all of the information required to be entered during the merchant registration process to be present for the merchant registration purposes. Once all of the required information is present for the merchant registration the new merchant profile may be saved. The merchant representative may have the option to enter additional information, being information that is not strictly required by the marketing system to be entered, to the merchant profile. Such additional information may be entered either during the merchant registration process or at a later point in time.

If no matches are returned by the search the module may determine 316 that no more merchant information is to be provided. Alternatively, the module may request 314 that additional information be entered by the merchant representative. The system may review the result of the request 292, and if no more information is added or if a time lapse occurs that is beyond a set parameter 294 the system may determine to cancel boarding 296 and end the session 298. The system may alternatively determine to save the merchant profile as pending 300, whereby it would create a pending merchant profile and administration accounts or merchant representative accounts for the merchant 320, the pending profile and related credentials may be transferred to the administrator or merchant representative 322. After a lapse of time 306, the merchant representative may log into the boarding module 284, and the system may review 282 the status of the merchant information in the merchant profile. As the merchant profile is not complete the system may consider the type of information that is missing from the profile 280. The system may identify specific information missing from the profile 288 and request that the merchant representative provide this information 290. The system may alternatively choose to engage a support administrator 278 to assist the merchant representative. The support may be provided after a time lapse 286. The merchant representative may utilize the support to enter further information into the merchant profile. This method may continue until the merchant profile is completed or is cancelled.

Upon a new merchant profile being saved, in some embodiments of the present invention, one or more specific employees of the merchant, such as, for example, the merchant business contact and the merchant or administrator, may be notified and provided with details and/or credentials necessary to access the merchant profile in the marketing system. The one or more specific employees to be granted access to the new merchant profile in the marketing system may be identified during the merchant registration process. Contact details for the one or more specific employees may be provided to the marketing system, and the contact details may be used to contact the specific employees. For example, the employees may be contacted by way of an email and the email contents may provide the specific employees with a username and password, or other credential information, to be used to access the new merchant profile at one or more points in time. Such users may access the profile and edit, update, delete or add merchant profile information, including adding any missing merchant identifiers. It may further be possible to save the merchant profile, in a pending state, before the merchant registration process is entirely completed. Users granted access to the merchant profile may be offered to option to complete the merchant registration process steps.

Notifications of the present invention may be of various types, and may be generated and/or provided by way of various means, for example, such as: email; mobile device (e.g., as a text message, SMS, multimedia media message, or other mobile device communication); dialog; alert; or other notification means. The content of a notification may be in a specific format, for example, such as a format that is hardcoded into the marketing system, or is specified by the administrator or other user of the present invention. The notification content may include information stored in any data storage means accessible by the present invention. A skilled reader will recognize the variety of notifications that the present invention may be operable to generate and transmit and/or display.

A support facility may be offered to assist the one or more specific employees with accessing the merchant profile and completing the merchant registration process if assistance is required. For example, the marketing system may provide automated trouble-shooting suggestions, and if these suggestions do not resolve the problem then the administrator of the marketing system or another authorized person may offer direct support, such as, for example telephone support. The trouble-shooting suggestions may be stored in a data storage area, and may be retrieved and displayed to a user in accordance with the applicability of such trouble-shooting suggestions to a particular circumstance or activity.

Alternatively, if the merchant representative selects a potential matching merchant profile and once the information is transferred from the selected profile to the merchant registration process not all of the required merchant registration information is provided, or if the search does not produce any matching merchant profile, the marketing system may present a request to the merchant representative asking for the input of additional information. If the merchant representative does not have any additional information to provide the merchant representative can choose to save the portion of the new merchant profile that has been entered as having a pending status. Otherwise the merchant representative can choose to cancel the merchant registration process.

Should the merchant representative provide additional information then the marketing system may undertake a second search following the same procedure as the first search, in an attempt to locate one or more potential matching merchant profiles. Any located potential matching merchant profiles may be provided to the merchant representative and selected by the merchant representative, in the same manner as the results of the first search. If the merchant representative selects a potential matching merchant profile and thereby completes the merchant identifier information requirements then the new merchant profile may be saved. Should the merchant representative not select a potential matching merchant profile, no potential matching merchant profile is located by the search, or the merchant representative does not have any additional information to enter, the new merchant profile may be saved as pending status, or the merchant registration process may be closed without saving the new merchant profile.

After a new merchant profile is saved and a specific employee accesses the new merchant profile the marketing system may continue the merchant registration process. At this point the marketing system may take steps to verify the merchant profile, and to complete the registration and/or activate the merchant, as described herein. Such activation may occur for a merchant that does not include any stores, branches, subsidiaries or locations that require inclusion in the merchant profile or records linked to the merchant profile. For a merchant that does have stores, branches, subsidiaries or locations that require inclusion in the merchant profile, or records to be linked to the merchant profile, activation may not occur until such stores, branches, subsidiaries or locations are inputted and all relevant fields are populated, as described herein.

Figure 17:
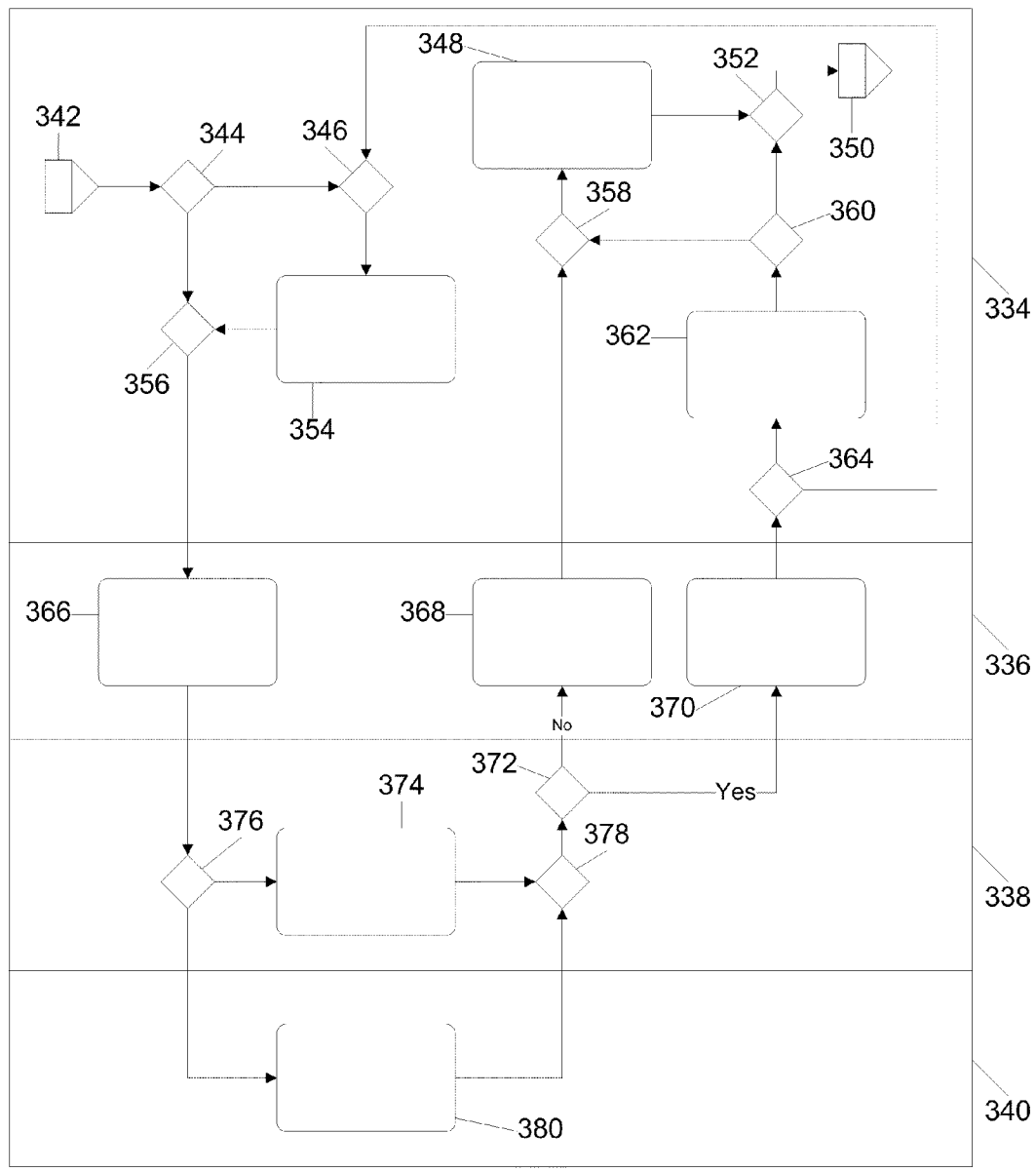
FIG. 17 illustrates a method of adding merchant store locations in the course of automated merchant boarding that may be incorporated in one embodiment of the present invention.

As shown in FIG. 17, once a merchant profile is completed 342, and possibly activated, as described herein, the marketing system may generate a search request for associated store details 344. Entering store details may involve several layers of the system and may involve some third party systems. For example, a merchant layer 334, an automated merchant boarding module 336, multiple store sources (that may be third party systems) 338, and specific third party systems (for example, such as a financial card system), may be involved in a process to add store details. The system may review store details already provided 346 and based on these may collect search boundaries and criteria be provided 354. The search boundaries and criteria may be provided by the system or may be requested from the merchant representative. The criteria may be collected. The automated boarding module may request further store details from the merchant representative 366, as may be required to undertake a search. The system may review the store details and search criteria 376 and determine to access one or more of the multiple store sources to identify and collect potential stores associated with a merchant 374, or may access a specific third party system to collect associated store details 380.

For example, if the request is sent to a third party data storage source, the source may be a credit card company that is associated with the marketing system. The third party storage may receive a request that its data storage source be searched to locate information pertaining to stores associated with the merchant profile information. In one circumstance, if the merchant profile is for Sears Canada headquarters, then the generated search request may be to locate store locations of Sears Canada. Specific criteria or parameters may be indicated in the request, such as a territory, or store name, etc. The specific employee may be offered a chance to provide the criteria or parameters for the search before the search is generated. For example, options for parameters or fillable parameters may be presented to the specific employee on a screen and the employee may choose or enter applicable parameters or criteria for the search. The specific employee may opt not to set any criteria or parameters. The search request may be generated in accordance with any parameters or criteria set by the specific employee.

The system may collect the search results. The system may review the results 372 to determine if any associated stores were located in the search. If results were located these may be displayed by the module 370.

For example, a list of stores associated with the merchant, and the details related to the stores, that are the results of the search may be presented to the merchant representative who may be a specific employee. In some embodiments of the present invention the specific employee may be required to drill-down to access some details relating to an associated store. The specific employee may be offered the option to select or deselect associated stores appearing in the list. Information pertaining to selected stores may be utilized by the system to populate data fields in the merchant profile as information regarding a store associated with the merchant. The specific employee may further have the option to input information regarding to one or more associated stores and related store details, and thereby add the one or more associated stores to the merchant profile as stores associated with the merchant.

Details relating to associated stores that may either be collected as results of a search, or manually entered by a user, may include a variety of information relating to one or more stores associated with a merchant. For example, such details may include historical transactions undertaken at an associated store. The transaction history may include a summary of transactions, or specific information pertaining to transactions, for transaction occurring during a specific period of time, for example, such as during a week, a month, a year or some other period of time. The time period for the transactions may be specified by user input transferred to the system, by an administrator, by the data source where the transaction history is collected from (such as a third party data source), or by the system. Transaction summaries or specific transaction information may include a variety of transaction related information, for example, such as transaction amounts, credit card business identification number range, debit card business identification number range, customer demographics, transaction date, transaction time, or other details relating to a transaction. The transaction history may be stored by the system in one or more data storage areas as part of the merchant profile, as described herein. The whole of or portions of the transaction history may also be stored in data storage means in other data collections. The transaction history information may be accessed and retrieved by the system in the process of generating incentives or other system content, as the transaction history may be analyzed to determine customer behaviours, transaction peak times, product popularity, average transaction amounts, and other information relevant to generating incentives and producing other system content. A skilled reader will recognize the variety of ways and purposes for which the system may analyze the transaction history.

Generally, information relating to associated stores that is entered by the specific employee, that is not deselected, and/or that is selected (either specifically by the specific employee, or else are selected by an embodiment of the present invention that selects all options in the list that are not deselected) may be transferred to the merchant profile in the marketing system and the information for such associated stores may be utilized by the system to populate data fields for stores associated with the merchant in the merchant profile.

An option for the merchant representative to input information manually may be provided at this point. The system may review the store information 364 and may determine that based on manual input by the user a further search may be generated for stores associated with the merchant.

The system may provide the stores located by a search to a merchant representative in a manner whereby the merchant may approve and select 362 any of the stores in the list as being associated with the merchant. The system may review any of the selected stores to determine if the information can be utilized to populate the merchant profile data fields 360. If the information can be utilized to populate the data fields the information may be added to the merchant profile 360. The system may continue to other steps of the boarding process 350 at this point.

If the system cannot utilize the information to populate data fields of the merchant profile it may review the store data available 358 and may provide the merchant representative with the option to enter store information manually 348.

Figure 18:
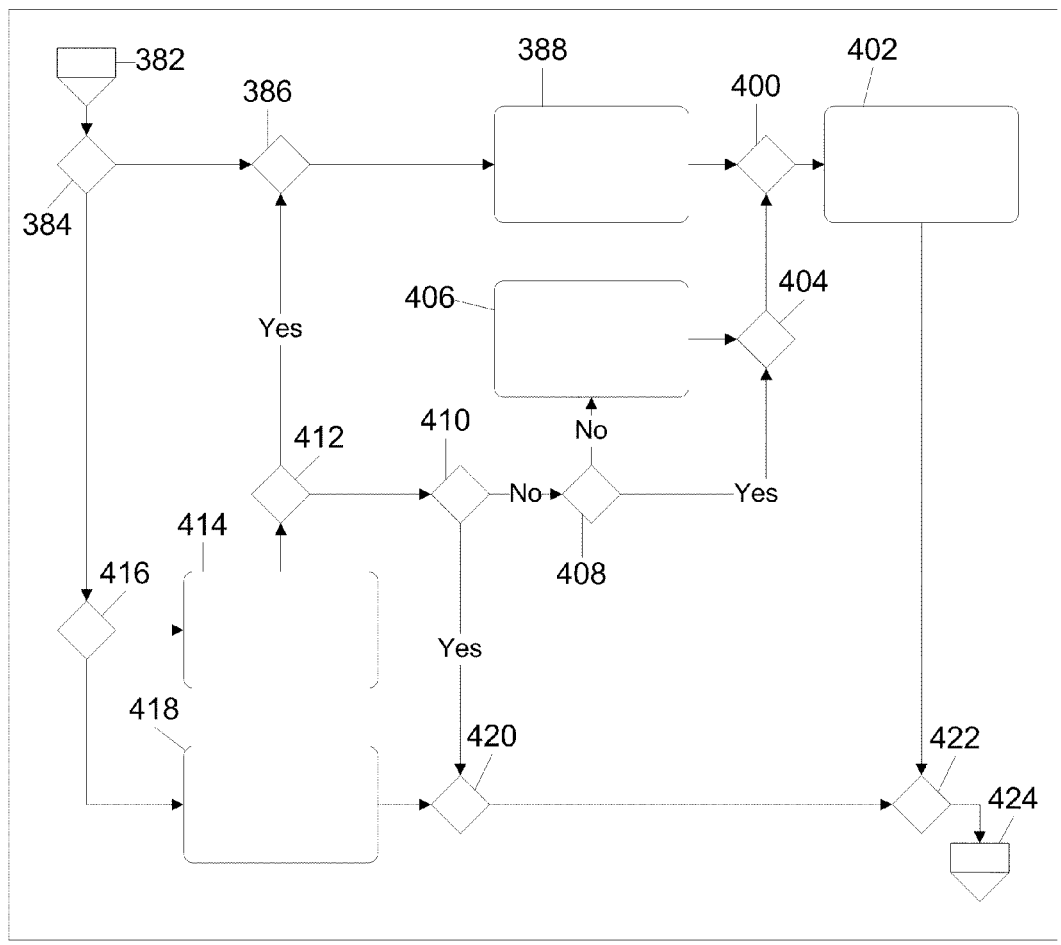
FIG. 18 illustrates a method of obtaining merchant information in the course of automated merchant boarding that may be incorporated in one embodiment of the present invention.

A method of obtaining a MID for transaction mapping may be undertaken by the automated merchant boarding module. As shown in FIG. 18, after a merchant profile is started to be populated 382, the system may review the merchant profile 384 to determine if a MID is included in the profile. The system may undertake a search for any missing MID 416. For example, the search may involve a third party database where MIDs are stored, such as a financial card database, a merchant acquirer, or any other third party database. The results of the search may be to collect MIDs related to stores selected during the store selection process. The MID search may involve other databases and data storage sources as well.

Based on the results of the search, the system may display any retrieved MIDs to a merchant representative 418. The merchant representative may be allowed to select or otherwise approve a MID, to indicate that the MID is to be added to the merchant profile data. The system may recognize this request 420, and the system may update the merchant profile data to include the selected MID 422 before continuing the automated merchant boarding process.

MIDs found from searches conducted in other data sources may also be displayed to a merchant representative 414. The user may review the displayed MIDs to determine if an MID to be added to a merchant profile record is included in the display 412. If the MID is in the list the system may add the MID to the merchant profile 386. If the required MID is determined not to be in the list 408, then the merchant representative may edit any MID 406 to cause it to be amended to represent a valid MID to be added to a merchant profile 404. The merchant representative may also be permitted to manually enter a MID 388 to cause it to be added to a merchant profile. The system may recognize the MID added to the merchant profile 400. The system may request test transactions 402 be performed to validate the identified MIDs.

Associated stores may include both bricks and mortar store locations as well as online store websites.

In some embodiments of the present invention after merchant profile information may be gathered by the system and prior to activation the system may provide the merchant representative with the opportunity to undertake test transactions. The test transactions may involve one or more point of sale terminals of the merchant. The point of sale terminals may be located at one or more merchant locations, for example, such as at merchant store locations.

The merchant representative may choose or decline the test transaction option. Should the merchant representative choose this option then the system may require the merchant representative to provide the number of test transactions that it will run. There may be a delay between the merchant representative selecting this option and the undertaking of the test transactions. In the period of delay the system may store the merchant profile data collected in a data storage area and deem the merchant profile to be pending. In this manner the system will delay activation of the merchant profile until the test transaction options is completed.

A merchant representative who chooses the test transaction option may be provided with an opportunity to enter specific parameters for the test transactions. For example, a merchant representative may enter a credit card number, a debit card number and/or a dollar amount that should exist in all of the data transferred to the system as a result of the test transactions. A skilled reader will recognize that other parameters may also be entered by the merchant representative. The parameters may be utilized data that may be compared and matched in a matching process, in a manner similar to the matching processes described below.

Based on the number of test transactions that the merchant representative indicated to the system, the system will expect to receive a particular number of test transaction data transfers. Each test transaction data transfer will be reviewed by the system, and the system will extract merchant data from the transfer. The system may also attempt to match some or all of the merchant data extracted from the transfer to either data in the stored merchant profile, or to information in another data storage, for example, such as a data storage of a third party. The procedure of matching data may have multiple possible purposes.

For example, the matching may be used as a means of verifying that the merchant data extracted from the transfer data is related the merchant in the stored merchant profile. If the extracted data did not match the merchant in the stored merchant profile then the system may provide a notification to the merchant representative stating that the test transaction data does not match the merchant of the stored merchant data. The notification may be provided through a variety of means, for example, such as by email, a message on a data entry screen attached to a computer, or any other notification means. Data that may be utilized to match the merchant of the stored merchant profile to the merchant of the extracted data may be the MID. An MID may be included in the stored merchant profile, as well as in the extracted data, it may be possible to compare the MID from each of these sources to ensure that the MIDs match. A skilled reader will recognize that other data from the test transaction and the stored merchant profile may be compared to verify a match between the merchant of the test transaction and the merchant of the stored merchant profile.

Once a match is verified the extracted test transaction data may be reviewed, and extracted data that represents data fields of merchant data, or merchant store/location data, that has not been populated in the merchant profile may be populated with the extracted test transaction data.

As another example of a purpose of the matching process, or an supplemental purpose that occurs along with the other purposes occurring simultaneously or subsequently, the test transaction data transferred to the system may be reviewed to retrieve additional details from a third party data source. For example, the MID extracted from the test transaction transferred data may be utilized to identify other transactions occurring utilizing the same MID stored in a third party data source. The third party data may be reviewed to identify data relating to the merchant that may be utilized to populate to data fields in the merchant profile that have not previously been populated. These data fields of the merchant profile may be populated utilizing the third party data.

As yet another example of a purpose of the matching process, the extracted test transaction data may be reviewed to identify additional MIDs relating to a merchant that were not provided by the merchant representative or located as the result of other searches. For example, multiple MIDs may be related to one merchant store or other merchant location. A merchant representative may provide one or more MIDs for a merchant store or other merchant location, but the test transaction transfer matching process may identify one or more additional MIDs related to a merchant store or other merchant location. Additionally, a comparison of other merchant information to data in a third party data source, in the course of a matching process, may identify one or more additional MIDs related to a merchant store or other merchant location. For example, a comparison of test transaction transfer data and a data source of a financial card company may indicate one or more additional MIDs relating to a merchant and/or a merchant store or other merchant location. A skilled reader will recognize the variety of data comparisons that may be involved in the one or more matching processes undertaken by the system of the present invention.

As still another example of a purpose of the matching process, the comparison of data between any of a stored merchant profile, transferred test transaction data, and/or data in a third party data source, may identify data that does not match between two or more data from a stored merchant profile, transferred test transaction data, and/or data in a third party data source. In the circumstance that data does not match between at least two of these, a notification regarding the lack of a match may be sent to a merchant representative through a variety of means, including any notification means described herein, or any other notification means.

The system may also send a notification to the merchant representative if more or fewer test transactions than the number indicated by the merchant representative to the system were received by the system. The receipt of fewer test transaction transfers may indicate an error in one or more point of sale terminals at one or more merchant stores or other merchant locations. The receipt of more test transaction transfers may indicate duplication in transfers by one or more point of sale terminals at a merchant store or other merchant location. The receipt of more test transaction transfers may also indicate errors in point of sale terminals of other merchants who are participants in the marketing system. A skilled reader will recognize that the system may be operable to provide a variety of notifications based on the test transaction transfers received, or not received, by the system. Some of these notifications may be provided in accordance with rules or other instructions provided to the system by a merchant representative or system administrator.

The matching processes to be undertaken by the system may be chosen by the merchant representative through interaction with the system, may be set by an administrator, or may be chosen by the system.

In some embodiments of the present invention test transactions and at least one matching process may be required and the merchant representative may not be given an option as to whether this process will occur. In such an embodiment, the merchant representative will be asked to input the number of test transactions that the system should expect to receive. The merchant profile will be stored and saved in a pending state until the test transactions and one or more matching processes are completed.

If all of the required data fields of the merchant profile are populated after the test transactions and one or more matching processes are completed then the system may progress to an authorization procedure, as described herein.

After details of the associated stores are transferred to the merchant profile these stores are now part of the merchant profile. The stores are there by recognized as related to each other and to the original new merchant profile by the marketing system. This relation can be reflected in functions of the marketing system and reports generated by the marketing system. For example, the marketing system may recognize the location of a participant of the marketing system, and may also recognize that the participant has been involved in a transaction at an associated store location in the past. The marketing system may provide the location of an associated store location that is in the proximity of participant if the participant generates a search request for an item that is sold at the store location. As an example, if a participant has participated in a transaction at the Toronto location of Sears Canada in the past, and that participant is now in Montreal and has entered a search request for mittens, the marketing system may provide the Montreal location of Sears Canada to the participant as a location where mittens may be purchased.

The marketing system may even have reviewed feedback from the participant regarding the transaction at the Toronto location of Sears Canada, such as feedback in a post-transaction survey, and identified that the participant's shopping experience in Toronto was favourable. Therefore, the favourable experience of the participant at Sears Canada in Toronto may indicate that the participant would be likely to shop at the Montreal location of Sears Canada now that the participant needs to purchase a pair of mittens.

Auto Boarding Utilizing Merchant Input and Transaction Data

To populate information relating to a merchant and/or merchant stores, the present invention may undertake a process that involves transferring data of a merchant store to the registration process. The transferred data may include a variety of details of the merchant and/or merchant store. For example, one or more merchant payment processing identifiers (MIDs) may be included for each associated store in the merchant profile. These MIDs may be part of the associated store details. In such a circumstance the marketing system may search for evidence of use of the MID in a transaction occurring within a set period of time, such as, for example the previous two weeks, or another period of time. If a transaction occurring within the set period of time utilizing the MID is located the marketing system may determine that the MID is validated and accurate. If a transaction occurring within the set period of time utilizing the MID is not located, but an older transaction is located the MID may be saved in the marketing system data storage area as part of the associated store details, but it may be marked as requiring validation. The MID may be tested, for example, such as by way of an enrolment activity request, as described herein.

In some embodiments of the present invention, the specific employee may enter a MID for one or more associated stores.

The MID may be utilized in particular for transaction mapping and tracking purposes. Details of each transaction occurring at an associated store location may include the MID of that associated store. As a consequence transaction details may provide information necessary to track the occurrence of transactions at particular store locations, as well as more generally as transactions relating to a particular merchant profile.

Figure 13:
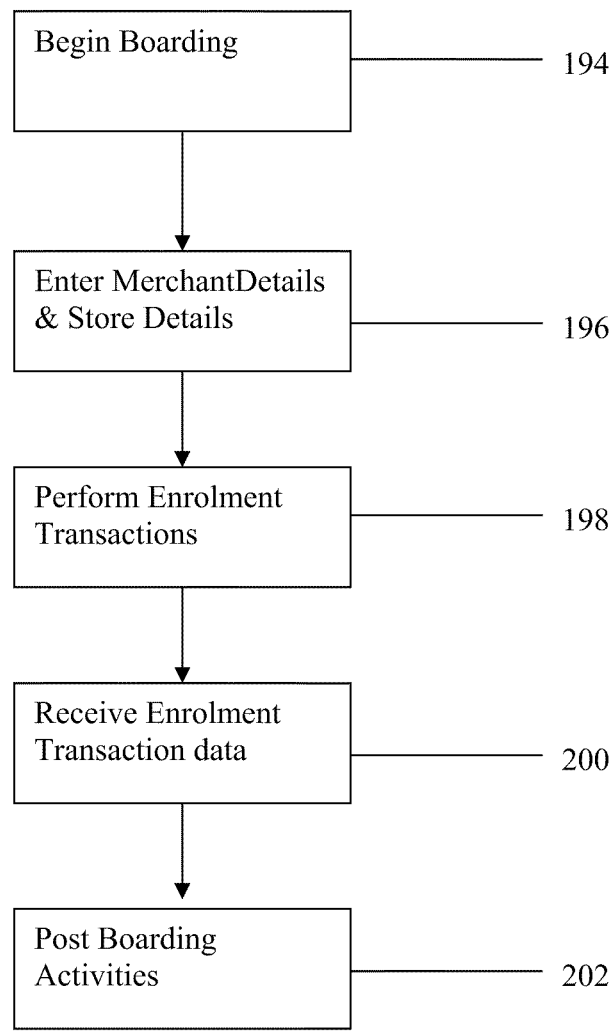
FIG. 13 illustrates a method of automated merchant boarding utilizing enrolment transaction data to populate merchant and store details in accordance with the present invention.

In another embodiment of the present invention, as shown in FIG. 13, automated merchant boarding may involve beginning the boarding process 194. A merchant representative may enter merchant details and store details (or details of other locations related to the merchant) 196. The system may perform enrolment transaction 198 at the store (or other) locations. The enrolment data may be received by the system 200 and utilized to populate the merchant profile and store (or other location) details that may be part of, or linked to, a merchant profile. Once boarding is complete, then post boarding activities 202 may be engaged in.

A merchant representative may utilize a point of sale terminal in a merchant store to perform an enrolment activity for that store, branch, subsidiary, location or terminal of the merchant. Or, it may be possible for an intermediary to perform the enrolment transaction(s) on the merchant representative's behalf. The enrolment transactions may be done by a representative of the intermediary, or automatically by way of specially configured computer software operating on a computer that is connected to the merchant store by way of a network. Specific criteria and/or data may be required for the enrolment activity. For example, an enrolment activity for a store may require that a specific payment card number be used for the transaction, transactions at a specific merchant store, use of a distinct merchant boarding interface specified payment card number, a specific dollar amount, and/or other specific criteria. Enrolment activity criteria may be defined by an administrator and may be stored in the storage area. Algorithms or other calculations may be utilized to generate the criteria.

For an enrolment activity it may not be necessary for specific business activity to occur. For example, a transaction performed for an enrolment transaction may be declined by the issuer of the card by a means that causes details of the transaction to be provided to the marketing system and so that funds need not be exchanged for the enrolment transactions. The important aspect of the enrolment activity is the exchange of required information to verify the tracking details are correct and to confirm that the marketing system is operable to receive details of transactions performed at the specific store/branch/subsidiary location or terminal. During and after the enrolment activity the present invention may undertake specific authorization and verification reviews of the exchanged information to ascertain that the required information was exchanged during the activity.

For example, for a store location, once an enrolment transaction has been completed, the ETIS may verify the MIDs. Details of the enrolment transactions may be received by the transaction linking utility of marketing system and provided to the ETIS and merchant boarding interface. From the transaction details, in combination with the criteria specified for enrolment transactions, the marketing system may identify correct MIDs from the relevant transactions received, and incorrect MIDs indicated by missing transactions from stores. For example if a merchant representative was requested to perform enrolment transactions of $1 at the West store, and $2 at the East store and only the $1 transactions are received by the ETIS, the sub-system can determine that transactions are missing for the East store, and most likely the MID(s) for the East store are incorrect.

It may be possible for the merchant boarding interface to detect erroneous MIDs and populate missing MIDs. The marketing system may have access to the all transaction details for the specific payment card numbers used by the merchant representative to perform enrolment transactions. When a merchant is requested to perform specific enrolment transactions for specific amounts at each point of sale terminal in every store in combination, and when details of each transaction are reported to the ETIS via the transaction linking utility, missing or erroneous MIDs may be corrected. For example if the merchant representative was instructed to perform an enrolment transactions of $1 on every POS terminal in the West store, and the merchant boarding interface was expecting to receive transaction details for the MID 11111 and 22222, but the details of transactions for one dollar that are received show MIDs of 22222 and 33333 were used, then the merchant boarding interface can conclude MID 11111 is incorrect and removed it from the store's details, 22222 is correct and remains part of the store's details, and 33333 is to be added to the details of the West store.

A skilled reader will recognize how other tracking details may be utilized in an enrolment activity, and how the activity may verify: (i) the tracking details provided for a store/branch/subsidiary location; and (ii) the marketing system is operable to receive details of transactions performed at a specific store/branch/subsidiary location or terminal.

After a successful enrolment activity store/branch/subsidiary location information may be stored as associated to a merchant profile in the merchant database. Once boarding is complete for a merchant the relationship between a merchant and any associated store/branch/subsidiary location may be supported and exploited by functions of the marketing system, including in reports generated by the present invention.

Training Materials

In one embodiment of the present invention, training materials may be provided to the merchant representative or specific employee to assist with the merchant registration process or to assist the specific employee to understand the marketing system. Training materials may be of various forms, and may include content for teaching the users about the functions and features of the present invention, as well as content to assist users with specific uses of the present invention, as described herein. Training materials may be provided so that high level information or more detailed information can be accessed. In one embodiment it may be mandatory that merchant training materials be reviewed before a merchant profile may be activated.

For example, training materials may be provided to a user to offer instructions regarding the nature of incentives as well as how incentives can be configured and applied. The training materials may also provide information regarding the nature of surveys, including post-transaction surveys. Training materials may include general information, and may also include tips for efficient and effective use of the system. As an example, the training materials may provide tips for creating a survey directed to collect information relevant to a particular issue. A skilled reader will recognize the variety of information and means of providing training materials that may be incorporated in the present invention.

Pre-set Incentives

In another embodiment of the present invention it pre-set incentives may be generated by the marketing system and provided to the specific employee. The pre-set incentives may be provided during the boarding process, or may be provided after the boarding process is completed.

The pre-set incentives may be applicable to all of the associated stores of a merchant profile or to one or more of the associated stores, in accordance with parameters and rules of the marketing system. For example, the parameters and/or rules may be that pre-set incentives may be applied in accordance with the location of an associated store (e.g., different pre-set incentives may be applied to stores in Quebec than stores in Ontario, etc.), or the pre-set incentives may be applied in accordance with other associated store details, such as the number of employees, times of operation or size of a store.

The specific employee may be provided with the option of accepting the pre-set incentives, rejecting pre-set incentives, editing the pre-set incentives, or adding pre-set incentives. The specific employee may approve the pre-set incentives once all accepting, rejecting, editing or adding is completed. Upon approval the pre-set incentives will be saved as corresponding to the associated store locations in the data storage area. The pre-set incentives will thereby be recorded by the marketing system for use in transactions.

Activations

As a final step in the merchant registration process the merchant may be activated by the specific employee, as described herein. Upon activation the merchant profile will be relied upon by the marketing system, so that the details may be used by the marketing system in its functions and reporting.

The information regarding the location of one or more bricks and mortar locations of the merchant may be utilized to determine relationships between one or more community programs and the merchant, in particular any merchant location in the vicinity of the community program. The data mining tool, and in some instances the analytic mode, of the present invention may be utilized to provide a list of community programs occurring in the same location as one or more of the merchant's locations. A merchant may request a more general list as well, showing all community programs in a city, province, country, or other information.

A merchant may also request a list of members, based on a variety of criteria, including proximity of the location of a member to one or more locations of a merchant, member preferences, member age, or other member information. A skilled reader will recognize the variety of criteria that may be applied to a member search undertaken by a merchant, such as, for example, demographic or preference information as reflected in the marketing system data stored in the data storage area. This information may be utilized to determine the members that an incentive will be communicated to. The information may also be used to create new incentives.

In some embodiments of the present invention, a fee may be charged for any request for information or search submitted to the marketing system and/or administrator by a merchant. A skilled reader will recognize the variety of types of fees that could be charged, such as, for example a fee for each request, a fee per lines on a report, and other types of fees.

In one embodiment of the present invention, the data mining tool, and in some instances the analytic mode, may be utilized to provide suggestions of possible new incentives to merchants. The transaction linking facility may be utilized to provide analysis or evaluations that may also be applied by the data mining tool or analytic mode to generate new incentives and suggestions of new incentives for merchants. This feature of the present invention may utilize any of the data and/or information in the data storage area, it may also: recognize incentives utilized by merchants in the past; recognize the success of some past incentives; evaluate the success of an incentive and the community program that the incentive is to be used with; and further incorporate other information and criteria. The result may be one or more suggestions of incentives that a merchant may utilize at a particular point in time. It may be at the discretion of the merchant to adopt and utilize one or more of the suggested incentives, or not to adopt or utilize any of the suggested incentives. For example, a merchant may allow automatic approval of system generated incentives, and whereby the marketing system undertakes the approval of system generated incentives. A skilled reader will recognize that a variety of criteria and information may be utilized by such a feature of the present invention.

In one embodiment of the present invention, the analytic mode may generate one or more suggestions for incentives specific to a particular merchant. The analytic mode may utilize any of the information in the merchant profile for this generation process. Generated suggestions for incentives may be presented to a merchant and the merchant may review the suggested incentives and approve, modify or delete the suggested incentives.

The present invention may in a likewise manner generate suggestions for community donations, cross-selling and survey questions and present these to a merchant. The types of suggestions that the present invention may generate and present to a merchant may be set by an administrator, or further selected by a merchant, so that a merchant may opt to have particular features of the present invention available for use.

Other members, intermediaries, etc., of the present invention may also tailor features of the present invention to be utilizable by that member, intermediary, etc. For example, a member may tailor the system so that the post-transaction survey options available are offered in a specific format, or provide a set number of fields. An intermediary may tailor the system so that the programs that may be suggested between an intermediary and a member may be focused within specific boundaries. An administrator may also undertake steps to tailor features of the present invention so that particular functions may not be utilizable by users of the present invention in some instances. Tailoring may be undertaken generally for the purpose of limiting functions available to particular participants of the system, streamlining processes of the present invention, or for any other reasons relating to utilizing the system.

The present invention may further suggest particular triggers that must be satisfied for a suggested merchant incentive to be made available to one or more members, and timing for a suggested merchant incentive to be made available to one or more members. A suggested incentive may be developed to address particular needs of the merchant and/or one or more members, for example, such as in response to a bad transaction experience of a member, to reward frequent transactions by a member, to attract one or more members to a particular merchant or a specific merchant store/branch/subsidiary location, to encourage transactions at times when transactions are generally at a low volume. A trigger for a suggested merchant incentive may be of any type, for example, such as notification of a transaction by a member; completion of a survey by a member; entry into a specific geographical location by a member; the member performing specified actions within the system of the present invention or the system of an intermediary; other trigger events, or a combination of events defined to create a trigger. Trigger events may be required to occur within a set time period.

The analytic mode may undertake a variety of activities in its processes to generate merchant incentive suggestions, for example such as an analysis of the successes and failures of incentives offered by the merchant or merchants similar to the merchant, and analysis of the incentives utilized by members for particular similar products as the products of the merchant in a vicinity close to the merchant.

The present invention may further undertake an analysis of search terms utilized in an Internet search engine to arrive at a merchant's website. Specifically, the analytic mode may be able to query a search provider's data store to find a listing of search terms that have the outcome of the merchant being returned as a result of the search. From the listing, the analytic mode may be able to determine what specific services, products, family of products or products from specific manufacturers are sold by the registering merchant. Based upon this determination the analytic mode may utilize the search terms to suggest incentives relating to specific products, services, product families, or manufacturers offered by the merchant. For example, if the merchant that sells consumer electronics and the search terms included "Nikon™ D3100 camera", "Nikon Coolpix™ S8100 camera", and/or "Nikon Coolpix™ I22", the analytic mode may generate a suggestion of a merchant incentive that is a discount for cameras generally, or to Nikon™ cameras, the Nikon Coolpix™ family of cameras, or specifically a Nikon™ D3100 camera.

If the search listing also includes "HP computers", the analytic mode may provide suggestions for incentives not only related to HP branded computers, but Compaq computers as well since they are manufactured by the same organization. The system may utilize reference tables, or databases where information regarding relationships between companies and/or products is available. The reference tables and databases utilized for this purpose may include tables and databases incorporated in the system, or other tables and databases accessible by the system, for example, such as third party tables and databases, and online tables and databases.

The present invention may also undertake an analysis of the data store of one or more social networks that may or may not be intermediaries of the marketing system, to identify use of terms related to the wares or services of a merchant or to the merchant specifically. The analysis may produce a list of wares or services and related comments relating to the merchant or particular wares and services. For example, the analysis may identify particular users who bought wares or services from the merchant, and may gather information regarding that user (e.g. Bikeguy 123: "bought a new helmet from Bob's Bikes", and the system identifies the age, location and other details of Bikeguy as are available from the social network). The analysis may also identify comments relating to specific wares or services that are wares or services that the merchant sells, such as discounts on these wares and services by other merchants. This collected data may be utilized by the analysis mode to generate suggestions for merchant incentives, including possible target audiences for the incentives, timing for the incentive, trigger events for the incentives (such as the incentive is offered if three or more items are purchased by a member), or other details relating to a suggestion for a merchant incentive.

Suggestions for effective scheduling or the suggested merchant incentives may be generated by the present invention based on a variety of data and analyzes. For example, the timing of incentives may be sequential, so that a set of multiple incentive suggestions (suggestions A, B, etc.) are offered so that incentive A is active and usable by members for two weeks, incentive B may be scheduled to become active at the end of the two weeks, and so on. This pattern could then continue until each incentive has been active and the pattern could then repeat. Each of suggested incentives A, B, etc. could be different in content (e.g., different discount, for different items, etc.). Sequential incentives may limit the chance that a member's interest in the merchant will become stagnant. Scheduling of an incentive may also be determined in accordance with attracting customers when it is most beneficial to the merchant, for example, such as during low volume periods. As an example, for a merchant that is a golf course that has unused capacity on weekdays, but is busy on weekends, the present invention may suggest an incentive that offers a higher discount rate during the week and a lower discount rate during weekends. Suggestions for merchant incentives could be developed by the present invention to address other low volume periods, such as seasons, months, weeks, etc. As a skilled reader will recognize the success of the generation of suggestions for merchant incentives will depend on the amount of data regarding a merchant's wares/services, low volume periods, transactions generally, competitors and/or member demographic and transaction history that is accessible by the data mining tool.

For example, the present invention may determine a merchant's low volume periods by analyzing the merchant's store transaction history and transactional data of similar merchants. Based on the category of the merchant, the analytic mode may make an adjustment of low volume periods to compensate for an approximate time between a customer arriving at the store and the transaction being performed. The present invention may include a means of encouraging merchants or members that provide minimal information to update and expand their information to aid the present invention to undertake more accurate and effective analyzes. The means of encouragement may be of several forms, including specific incentives.

Suggestions for merchant incentives may be generated and presented to the merchant representative for review prior to the merchant being fully boarded or active in the marketing system. The merchant representative may accept, modify, or reject the suggested incentives. Merchants may also create or otherwise introduce incentives that are not based on suggested incentive to the present invention prior to the merchant boarding being completed. Incentives may be introduced to the present invention in a variety of manners, for example, such as through the manual input by the merchant representative in the merchant boarding interface of the marketing system or by uploading an electronic file that represents the incentive to the present invention, or by other means. After a suggested incentive is approved, or an incentive is otherwise created or introduced to the system, the incentives may be stored in the merchant database in a manner so that the incentive is associated with the merchant profile. An incentive may be specifically accepted for application to a specific merchant store/branch/subsidiary location.

The present invention may be operable to assess an approximate value of an incentive or suggested incentive. To determine the approximate value, the analytic mode may determine the approximate monetary value of an incentive, for example, such as the monetary value of any discount offered by an incentive. This assessment may utilize median or average values of transactions for a merchant, and these may be the median or average values during a specific time period, or other parameters may be set for the calculation of the approximate monetary value of the incentive or suggested incentive. When an incentive is offering a donation to a community program, the analytic mode of the present invention may determine the approximate value as a percentage of the anticipated donation since members may not regard the donation as equal to a discount of the same amount. For a sweepstakes the analytic mode may determine an approximate value for a single entry.

The incentive may provide an inducement for the member, or other customers, to visit the merchant's store locations (or online website) where the incentive is offered and redeemable. The merchant may thereby increase the number of customers, the notoriety of the merchant's store, sales, goodwill, etc. The incentive may also produce a benefit for the community program if it is linked to a community program by, increasing awareness of the community program, increasing attendance at a community program, increasing donations to the community program, etc. Specific benefits accruing to any of a community program, merchant, member and/or any intermediary may be recognized by a report, review, results, list, etc., provided by the data mining tool, or the transaction linking utility in some instances.

Incentives may be created to be redeemed upon a variety of events and/or activities. For example, an incentive may be provided to a member and/or an intermediary based upon a transaction. In this example, the incentive may be provided upon a transaction occurring, or may be provided to attempt to cause a transaction to occur. Such an incentive may be a discount on a purchase price of a product or service to a member, a give-away to a member, a sweepstakes entry and/or a donation to a community program.

In one embodiment of the present invention, it may be possible for the incentive that is provided to a participant based upon a transaction to be different depending on various circumstances. For example, the incentive may be different for a participant who has had frequent transactions and/or recent transactions (e.g. frequent and/or recent transactions with a merchant, or group of merchants, or frequent transactions as a marketing program participant), than the incentive provided to a participant who is making a first transaction, makes infrequent transactions, or has not made a recent transaction. It may also be possible for a different incentive to be provided to participants based upon the total amount of the transaction (e.g. the money spent in the course of the transaction). Yet another possibility may be that a different incentive may be provided to a participant based upon the time of day when a participant makes a transaction. Basing an incentive on the time of day may help a merchant with products or services near the end of the business day to encourage the purchase of those products or services by participants. A different, augmented incentive may also be offered based upon other criteria, such as, for example volunteer hours with a community program, etc. A skilled reader will recognize that a variety of other events or activities may cause different incentives to be communicated to a participant.

As another example, incentives may also be provided based upon the completion of a survey by a participant. Such an incentive may be: a coupon that is electronically, or otherwise, provided to a participant after a survey is completed; a donation that is made to a community program upon the completion of a survey; and/or entry in a sweepstakes. It may be possible that more than one incentive may be provided to one or more participants upon the completion of a survey. It may also be possible for particular post-transaction surveys to even result in different incentives being provided to one or more participants in accordance with the answers provided in the survey. For example, the response to an experience rating question (e.g. a request to rate an experience as excellent, satisfactory or poor) indicating that a participant's experience was poor, may cause the participant providing the response to receive a different incentive than a participant responding that his or her experience was excellent. In particular, a participant who has ranked his or her experience as poor on several post-transaction surveys (as may be recognized by use of the data mining tool of the present invention searching for data in historical surveys) may receive a different, augmented incentive. A skilled reader will recognize that a variety of other incentives may be provided to participants upon the completion of a survey.

As yet another example, incentives may be provided based upon a member entering a specific geographical location and/or zone. Such an incentive may be provided to one or more participants upon a member entering the parking lot of a shopping centre, or any other geographical location and/or zone. The incentive may be related to the geographical location and/or zone, such as, for example a coupon for a merchant near to the zone, or a donation to a community program near the location. A skilled reader will recognize that a variety of other incentives may be provided upon a member entering a specific geographical location and/or zone. A skilled reader will further recognize that incentives may be provided to one or more participants based upon other events or activities as well.

The marketing system of the present invention may be operable by the merchant to generate incentives, to track transactions, and to provide other information relating to participants and community programs. The marketing system of the present invention may further be operable by the merchant to generate analytic information providing an evaluation of the success of past incentives and other activities of the merchant.

Example of Automated Merchant Boarding Means

A skilled reader will recognize that a variety of embodiments of the present invention operating types of automated merchant boarding means may be possible. The following provides examples of some embodiments of the present invention operating an automated merchant boarding means. These embodiments are presented merely as examples of the forms of automated merchant boarding means. A skilled reader will recognize that other embodiments of the present invention are also possible.

System Hardware & Environment

One embodiment of a system of the present invention that provides for automated merchant boarding may include one or more server computers that are physical, virtual, or a combination of physical and virtual. A series of servers may be configured with one or more components, sets of executable commands, and/or data storage arrays. The series of servers may include one or more hard discs or solid state drives, and the discs or drives may be physical or logical. The server computers may be linked via any wired and/or wireless data communication device, or a combination of wired and wireless data communication devices. For example, such devices may include switches and routers over a network.

Either physical or virtual servers, or a combination of both, may be used as a platform for the software and data storage. Physical servers incorporated in the present invention may have dedicated utilization of all aspects of the computing circuitry, CPU, onboard data storage, and peripherals. Virtual computing systems incorporated in the present invention, for example, such as virtual machines that may include Microsoft's Hyper-V or VMWare, may be software based implementations of physical servers that reside upon a physical host computing system. The virtual computing systems may share the resources with other virtual machines. The present invention may utilize one or more physical and/or virtual machines, or may utilize a combination of physical and virtual machines.

The executable code of the physical and/or virtual servers of the present invention may provide a software environment capable of supporting the functions of one or more of the following: operating system; database; application server; web server; mail server; data aggregation tool; data mining utility; data modeling utility; content management system; and/or other functions. The present invention may incorporate a variety of proprietary and/or open source software, for example, such as Microsoft Windows™ operating system, a Unix™ operating system, Apache Tomcat™, IBM Websphere™, Apache HTTP Server™, Microsoft Internet Information Services (IIS)™, Java™, PHP™, Microsoft .NET Framework™, MySg1™, Microsoft SQL Server™, IBM DB2™, RapidMiner™, Microsoft Exchange™, SendMail™, PHP-Fusion™, Joomla!™, Microsoft SharePoint Server™, or other types of software.

The physical or virtual servers may further provide an environment capable of supporting the functions of software developed specifically for the operation, deployment and/or maintenance of the marketing system of the present invention. Data and executable instructions may be stored in a centralized means, for example, as a centralized data storage means such as a database, or in a distributed manner, for example, such as distributed across two or more data storage means that may be located locally or remotely from one another. A variety of storage media may be utilized the present invention, for example, such as magnetic discs, magnetic tape, optical drives (CD-ROMs, DVDs), flash memory, ROM, RAM, cache, or other volatile and non-volatile storage devices.

The present invention may be operable to transmit and otherwise transfer instructions and data between servers and across computer networks. Such computer networks may include wired and/or wireless connections or links between elements included in the computer networks.

Software Components, Interfaces, and Utilities

A system of the present invention that operates an automated merchant boarding process may incorporate a series of software interfaces, protocols and utilities. The initial software interface or gateway software that a merchant and/or merchant representative may interact with is a merchant boarding interface. The merchant boarding interface may be operable to conduct initial boarding, or after a merchant is boarded the merchant boarding interface may be utilized to make changes or additions to the merchant profile.

Upon the merchant boarding process having a completed or pending status, an authentication protocol may be initiated to generate unique credentials or identifying data for a merchant. The credentials or identifying data may be utilized by specified merchant representatives to access the marketing system and merchant profile information stored within the marketing system database. As an example, the credentials may be generated by the marketing system so that the contact's email address is the account identifier and a password is generated based on a randomly generated alphanumeric code. A skilled reader will recognize that the credentials may be generated based on other types of information relating to the merchant, or randomly generated to be assigned to the merchant for credential purposes, for example, such as through the use of an algorithm or other calculation. The authentication protocol may store the generated credentials or identifying data in a secured data storage means, for example, such as in a merchant database within the data storage means of the marketing system, or any other data storage means.

The protocol may control access to the marketing system by the merchant representatives and may require that data or other information provided by a merchant representative be validated against stored data to authenticate the merchant representative.

The present invention may include a training utility to educate the merchant or merchant representative about the functions, features and/or purpose of the marketing system. Merchant education may be provided in a series of screens, menus, help topics or other means that may be displayed to a merchant and/or merchant representative and which the may permit interaction therewith.

The present invention may include a search utility as an element of the data mining utility. The search utility may be operable to receive data or other information, for example, such as parameters, and to utilize these to undertake a search for specific information accessible by the data mining utility, and to provide results of the search to a user. The search utility may access information stored in the data storage means, data sources of members, merchants, intermediaries, or participants of the marketing system, or third party data sources or tools for example, such as Internet search tools, or other third party data sources that are publicly or privately available.

The present invention may include an enrolment transaction identification sub-system (ETIS) as an element of the transaction linking utility. ETIS may be utilized to identify enrolment transactions. The enrolment transactions may certify that transactions originating at a specific merchant, store, or POS terminal are available to the marketing system. This sub-system may be operable to identify details of a transaction, for example, such as the currency utilized a specific enrolment transaction.

Two examples of possible embodiments of the present invention that involve automated merchant boarding processes are provided herein. A skilled reader will recognize that other methods are also possible in the present invention, and that these two methods are provided merely as examples of possible embodiments of the present invention.

EXAMPLE 1

One embodiment of the present invention that incorporates a method automated merchant boarding, may display a merchant boarding interface to a merchant. The interface may include data fields, for example, such as data fields wherein information pertaining to a merchant may be entered by a merchant and/or a merchant representative. The data fields may require specific information that is necessary to identify and authenticate a merchant. Such data fields may be identified as required data fields, whereas other data fields that do not represent specific information required to identify and authenticate a merchant may be identified as non-required fields.

As an example, required data fields may include: merchant name; head office address; head office phone and/or fax numbers; legal business name of merchant; business description; business type (e.g., sole proprietor, corporation, partnership, etc.); store type (e.g., retail store front, internet site, business office, residence, mobile business, bank, etc.); franchise/chain name and/or location number; business DBA; business federal tax ID; IRS employer identification number; merchant contact information; merchant administrator contact information; or any combination of these data fields.

As an example, non-required data field may include billing information, for example, such as payment card details; billing address; automated clearing house details; contact information for one or more employees of the merchant to be granted access to the merchant's profile; or other information.

The merchant boarding process may provide the merchant representative with access to assistance resources and/or suggestions pertaining to some of the data fields. For example, an assistance resource and/or suggestion may be presented to the user as a link. Clicking upon the link, or otherwise engaging the link, may operate the training utility tool to generate assistance specific to the link, such as an explanation of the data field related to the link. Other forms of assistance resources and/or suggestions may also be offered to a merchant representative.

Once information or other data is entered into at least one of the data fields the merchant boarding interface may operate a data validation mechanism. The data validation mechanism may utilize one or more specified rule sets to validate data. For example, a rule set may include rules pertaining to: amount of data acceptable in a data field; data type; data size; data format restrictions; and/or mechanisms to enforce mandatory data requirements for a data field. If the merchant boarding interface detects that information entered into a data field does not conform to the rule set specific to the data field, the information may be rejected by the system. The system may initiate the training utility tool applicable to the data field to provide information to the user as to why the information was rejected, or the system may display an error notification or warning to the user.

Other predetermined rules and/or parameters may be set pertaining to the minimum set of merchant information that must be entered by a user. The rules and/or parameters may reference the amount of information and the type of data fields that must be entered by a user. If the minimum rules and/or parameters regarding information are not met when a user stops entering information the present invention may display a warning to the user that insufficient information has been entered. The warning may specify as to why the information is insufficient, for example, such as describing types of data fields that were not entered by the user. The present invention may further offer suggestions regarding sources where information that is required but has not been entered by the user may be located. Other forms of assistance may also be provided to a user, such as a set of "Frequently Asked Questions", access to the training utility, or other assistance means to aid the user in completing the required data fields. Without sufficient information being entered prior to termination of a session the present invention may not store the entered information. If information is provided by a user that meets the rules and parameters regarding the minimum set of merchant information that must be entered by a user, then present invention may store the entered data fields information in a data storage means.

The present invention may also generate a search by the search utility for additional merchant details after a set amount of information is provided by a merchant representative. The search utility may utilize parameters that are information entered by the user, for example, such as merchant name, merchant address, or other information. The search may be performed on the data in the data storage area, and/or one or more external data sources. For example, the external data sources may include sources accessible by the marketing system, such as payment card data, bank data, card issuer data, merchant acquirer data, merchant data, payment data, other search provider, social network data, telephone directory data, or business directory data.

If information or data that is potentially relevant to the merchant being boarded is identified by the search, such information may be displayed to the user in the corresponding one or more appropriate data fields. Should more than one option for possible matching information for a data field be identified by the search, the data field information options may also be presented to the user. The user may select appropriate data from the options and/or confirm or reject information displayed in data fields as possible merchant profile information. A skilled reader will recognize that variety of means that may be utilized to display potential merchant information and/or options to a user, and the variety of means whereby a user may select, confirm or reject information. A skilled reader will also recognize that a user may have the option to select, confirm or reject a single field or multiple fields simultaneously. A merchant representative may also be offered the opportunity to select an entire merchant profile.

Upon selecting and/or confirming merchant profile information the information may be included in the merchant profile, and may be saved if the rules and parameters from saving merchant profile information as described herein are met. Subsequent searches may be conducted as additional data fields are entered by a user, so that the marketing system may locate and generate the most merchant information possible, thereby limiting the amount of information that a user is required to enter during the merchant boarding process.

The merchant boarding interface provide the merchant representative entering information in the boarding process the option to utilize the training utility to contact one or more authorized persons, such as, for example through telephone or email support, as may be required to provide information for the boarding process and/or may be required to authorize the information entered by the merchant representative prior to completing the boarding process. For example, the training facility may contact one or more authorized persons through a case management facility or support forum. A merchant representative may be required to enter a minimum amount and/or type of information before an authorized person may be accessed by the present invention, for example, such as the minimum information required to save a merchant profile in a pending state, as described herein.

Information entered by a user into any of the data fields may be stored in a data storage means, for example, such as a merchant database. Information stored in the merchant database may be accessible by the present invention. The information may be accessed for a variety of functions of the present invention, as described herein, for example, such as search purposes, or to obtain contact details for a merchant. As an example, the contact details may be utilized by the marketing system to send a notification to the merchant, as described herein.

Certain users, such as merchant representatives, may be identified to be granted access to the stored data for a variety of purposes described herein. For example, a merchant representative may access the stored merchant profile data to edit, update, delete or add merchant profile information. A notification may be sent by the present invention after merchant profile data is updated in some embodiments of the present invention. For security purposes, an authentication process may be required for authorized access of stored data by users. For example, upon a user attempting to access to the merchant data the system may initiate an authentication protocol whereby the user may be required to provide a valid username and password combination prior to accessing specific stored data.

Should training utility assistance be provided to and/or accessed by a user, the assistance presented by the training utility may be tailored to the type of information that is requested by, or required by, the user. The training utility may also operate to provide assistance relevant to the context in which the assistance is to be presented. For example, the present invention may include a standard suggestion that provides details of the source where information required for a data field may be located by a user, such as a suggestion that account information for an account name data field may be provided by an accountant. The present invention may identify the required information specific to a data field as being of a particular category, such as accounting related information. The present invention may include a mechanism operable to determine the category of the required information and to trigger the provision of one or more suggestions in accordance with the category of required information to provide contextualized assistance. A list of categories may be established and indexed within the merchant database. Should insufficient information be provided by a user to generate a suggestion, the marketing system may be operable to request additional information to be entered into specific data fields prior to a suggestion being generated. The additional information may increase the relevance of the suggestions provided and the likelihood that accurate contextualized assistance may be provided by the present invention. For example, if the required information is banking information, and the information source varies from bank to bank, then the merchant boarding interface may request that the user enter the bank name before the training utility may be triggered to provide contextual help regarding where to retrieve the banking information.

The merchant representative may choose to postpone the authentication and activation process for a merchant that would complete the merchant boarding process. This postponement may be due to the merchant representative wanting to retrieve and enter additional information before completing the boarding process. A merchant representative may postpone the completion of the boarding process in one of two ways: (i) the merchant representative may abandon the process and start over at a later time and may end the merchant boarding interface session without saving any data entered; or (ii) the merchant boarding interface may save the information entered by the user in a pending state in a data storage means, such as the merchant database. Information may be saved in a pending state if the requisite minimum information is entered by the merchant representative, as described herein, and the merchant representative explicitly requests that the information be saved. The merchant may be required to accept terms and conditions, for example, such as legal requirements regarding information privacy or other requirements of the marketing system, before any portion of the information is saved as a merchant profile in a pending state.

A merchant profile saved in a pending state may be accessed at a later point in time by the authorized merchant representatives. Such authorized merchant representatives may have been identified in the merchant profile, as described herein. Information may be added to, or edited within, the merchant profile while it is in a pending state. A time limit may be set for completing the merchant boarding process and/or for resuming a pending boarding process. Should the boarding process not be completed and/or resumed within the set time limit the pending merchant profile may be deleted. Prior to reaching the end of the set time limit, the present invention may generate and transmit a notification regarding the time limit to the merchant representative, and/or other contact included in the merchant profile. A notification may also be generated and sent upon expiration of the time limit so that the merchant representative and/or other contact may be made aware that the merchant profile has been deleted. The time limit may be set by the administrator of the marketing system.

Upon the basic data fields of a merchant profile being completed, confirmed and/or saved by a merchant representative, the search utility may generate a search designed to locate associated merchant store/branch/subsidiary locations relevant to the merchant profile. The search may be generated automatically and run without any user input, or the search may be initiated and the user may be provided the opportunity to input search criteria or parameters to be included as part of the search parameters. Such search criteria or parameters inputted by a user may narrow the scope of the search, or add details necessary to generate relevant results, or may be of other types of information beneficial to generating useful search results. A skilled reader will recognize that variety of types of inputted parameters that may be included and the variety of ways that search parameters may be inputted or presented to a user for selection. The search may utilize a variety of data sources, as described herein, and the data sources may be the same or may differ from the data source(s) used to acquire the merchant profile information or for other types of searches of the present invention. A list of potential associated stores and the related details may be the results of the search. These results may be presented to the merchant representative in a variety of forms. A user may also decline to have a search for store locations run at this time.

Options for store/branch/subsidiary locations may be selected or rejected by the user. Selected information may be added to the merchant profile as associated data. The merchant representative may also enter information for one or more associated stores/branches/subsidiary locations and related details thereof. In a manner similar to the merchant profile, the present invention may include rules and parameters setting a minimum of information required regarding a store/branch/subsidiary location before such information may be stored by the merchant boarding interface as related to the merchant profile. Store/branch/subsidiary location information may include: name; address; phone numbers; hours of operation; merchant payment processing identifiers; past transactions; summary of transaction history; average transaction; number of transactions; typical volumes by day of week and hour of day of transactions; summary of customer information; customer spending by payment card bin range; and/or a detailed listing of transactions occurring within a specific time frame; and any other information. A skilled reader will recognize that the information stored relating to a store/branch/subsidiary may be set to be relevant to the operation and purpose of the store/branch/subsidiary. Associated stores/branches/subsidiary locations may include both brick-and-mortar locations as well as online sites.

Certain details of a store/branch/subsidiary location may be identified as tracking details. For example, one or more merchant payment processing identifiers (MID) may be included in the details for one or more stores associated to a merchant profile. An MID is used in the payment industry to associate a transaction to a specific merchant or merchant account. The marketing system may utilize the MIDs for transaction mapping and tracking purposes, and to receive transaction details on an ongoing basis. A skilled reader will recognize that other information may also be identified as tracking details. The present invention may undertake validation procedures to validate and/or authenticate a tracking detail to ensure it is entered into and stored in the present invention in a correct form. The validation process may involve locating the tracking details in transactions or other activities of the store/branch/subsidiary location within a recent time frame. For example, such as searching for a MID within transaction histories for a store location within a set time period. If the tracking detail is not validated by the present invention a notification may be generated and sent by the present invention and a merchant representative may be required to manually validate the tracking detail(s). The present invention may refuse to complete the boarding process until all identified tracking details are validated.

EXAMPLE 2

In another embodiment of the present invention that involves automated merchant boarding, the merchant boarding interface may display a registration screen to a merchant or merchant representative. The screen may include data fields wherein the merchant may enter basic information pertaining to the merchant, for example, such as merchant name, number of the stores/branches/subsidiary locations to be boarded, the number of point-of-sale (POS) terminals in each store/branch/subsidiary location, billing information (e.g., payment card details, billing address, automated clearing house details, etc.), contact information for one or more specific employees of the merchant to be granted access to the merchant's profile, and/or other basic merchant details. The information entered by the merchant may be collected by the merchant boarding interface and stored in a merchant database. The stored information may represent a partial merchant profile wherein some data fields are not completed or otherwise populated, or a completed merchant profile wherein all of the data fields are completed or otherwise populated. The merchant representative may be required to accept particular terms and conditions, or other legal requirements, of the marketing system before any portion of the merchant profile may be saved by the merchant boarding interface. If the terms and conditions are not accepted by the merchant representative then the present invention may not save the merchant profile information.

Once basic merchant information is collected by the merchant boarding interface from the data field entries by the merchant or merchant representative, the system may request that the merchant representative perform one or more explicit enrolment activities. This explicit enrolment activities requested may be in accordance with an enrolment transaction identifier sub-system (ETIS) which may be linked to a transaction linking utility. The request may be provided to the merchant by the merchant boarding interface. The information entered by the merchant representative may be accessible by the ETIS, and the ETIS may utilize such information to formulate the enrolment transaction request.

As an example, the merchant representative boarding one or more stores as being linked to the merchant profile may receive a request to complete a specific enrolment transaction at each terminal in each store. Each enrolment transaction request may specify a financial card to be utilized as well as a transaction amount. For example, a merchant boarding a single store with 2 terminals may be requested to perform enrolment transactions using a particular card number for specific amounts, for example, such as the amounts of $0.10 on one terminal and $0.20 on the other terminal. The combination of amount and card number may be tailored such that the resulting transaction data can uniquely identify the merchant, store and terminal where the transaction occurred once details of the transaction are received by the ETIS. The specifics of the enrolment transaction requests that have been presented to merchant representatives may be stored in the merchant database and may be accessible by the ETIS.

The ETIS may generate a unique financial card number to be utilized for one or more enrolment transactions by a merchant. Card numbers may be generated according to an algorithm or other calculation that may utilize data entered by the merchant representative or data populated to a merchant profile, for example, such as a specific BIN range, and other inputs, for example, such as a check digit.

The card number to be utilized in an enrolment transaction request may be selected from a pool of one or more predefined card numbers stored in the merchant database. The card number that is generated or selected for an enrolment transaction request may be utilized exclusively by a single POS terminal, a specific store, or a specific merchant. It is also possible that the card number may be utilized for a set of merchants, for example, such as a set of 10 merchants who register with the system in a row. In this example, there does not need to be any relationship between the merchants other than the order wherein the merchants registered with the system.

A skilled reader will recognize how other enrolment activities may be the basis of the enrolment activity request in order to confirm: (i) the tracking details provided for a store/branch/subsidiary location; and (ii) that the marketing system is operable to receive details of transactions performed at the specific store/branch/subsidiary location or terminal.

After a merchant representative is provided with an enrolment activity request, the merchant boarding interface may deem the merchant profile entries by the merchant representative to have a status of "pending" until the enrolment activity is successfully completed. The merchant representative, and possibly also any contact detailed in the merchant profile, may be notified that the merchant profile and the boarding process generally has been placed in a pending state. Such a notification may occur in a variety of forms, such as by email or other forms of notification as described herein. The merchant profile may remain in a pending state until the merchant boarding interface receives confirmation that the enrolment activity has been successfully completed, for example, such as evidence from the ETIS that all of the enrolment transaction requests have been performed. The pending state may be maintained over a period of time, to allow the merchant representative to perform the enrolment transactions at a time convenient to him. The pending state may only last for a period of time, and the merchant representative, and possibly a contact detailed in the merchant profile information, may be notified as to the length of this period of time by one or more notifications, including warnings as the pending period draws near its end.

Should the enrolment activity and/or the boarding process not be completed within any time limits set for these actions, the present invention may cancel the registration or delete the merchant profile when the time limit is reached. The time limit may be set or amended by an administrator, and may be stored in a configuration file or in the data storage area.

The ETIS may have direct access to details of ongoing financial transactions, for example, such as through the transaction linking utility. The ETIS may have direct access, which may be in real time, virtually real time or after a delay (e.g., a daily batch, a weekly batch, or some other delayed process), to data relating to enrolment activities that involve financial transactions. The merchant boarding interface may collect data relating to executed enrolment activities through a link or other connection to third party data sources or data sources of an intermediary. Enrolment activity data may be accessed and otherwise collected by the present invention on an activity by activity basis, for example, such as a transaction-by-transaction basis, or in batches for multiple activities, for example, such as multiple transactions. Batched activity data may be accessed randomly, or in accordance with a schedule, for example, such as a schedule that is activated in accordance with specific time periods (e.g., hourly, daily, weekly, etc.).

The enrolment data accessible by the present invention may be restricted to specific available information in accordance with specific activities of the data generation. For example, if the enrolment activity involves financial transactions the data available to the ETIS may be restricted such that only certain transaction data is available. The ETIS may only be able to access enrolment transaction data for the specific transactions requested by pending merchants. For example, if a merchant is requested to perform an enrolment transaction of $0.10 and $0.20 using card number 1111 2222 3333 4444, and transactions of $0.11 and $0.20 are performed with the specified card, the ETIS may not receive details of the $0.11 transaction since it was not explicitly requested. Alternatively, the ETIS may be able to access all transaction data relating to one or more specific financial card numbers; in the above example, the $0.11 transaction would be available to the ETIS merchant boarding interface if the 1111 2222 3333 4444 card number was one of the specific financial card numbers. It may be possible for the ETIS to also have access to all enrolment transaction data specific to any transaction occurring for an entire BIN range of card numbers. The skilled reader will recognize that additional rules of enrolment activity data accessibility or restrictions are possible, and that such rules may be in accordance with the source of the generated data, or the present invention.

The present invention may undertake to match information from an enrolment activity to information entered into the merchant profile and/or associated store/branch/subsidiary location details. If an exact match is not found the present invention may search for similarities in a request and enrolment activity results to determine if an inadvertent error occurred that affected the enrolment activity results. For example, the present invention may undertake to match a transaction that is generated as an aspect of an enrolment activity to the transaction request details. A correlation between the card number and amounts for the transactions may be reviewed to identify any errors, for example, such as a typographical error, that may have occurred. As an example, details of a $1.23 transaction performed with card number 1111 2222 3333 4444 may be made available to the ETIS and the ETIS may review the pending merchant profiles for which an enrolment request has been issued, but not completed, to identify a request for a transaction of an amount similar to $1.23 from a card number similar to 1111 2222 3333 4444. Requests that are similar to the transaction may identify a typographical error in the transaction undertaken as compared to the request details. If an inadvertent error has affected an enrolment activity result then the ETIS may automatically accept the enrolment activity if a high probability of correlation between the transaction and the enrolment activity is determined by the system. As another alternative, the merchant representative may be allowed to manually accept the enrolment activity request to be completed, or may be required to receive another enrolment activity request that must be fulfilled.

The merchant boarding interface may undertake a series of actions after a performed enrolment activity result is matched to an enrolment activity request. The enrolment activity request may be flagged as 'fulfilled' and the data from the performed enrolment activity may be stored in the merchant database, or may otherwise be linked to the enrolment activity request. The enrolment activity results may also be mined to identify information that may be utilized to populate data fields of the merchant profile and the associated stores/branches/subsidiary locations for which no information has been entered. For example, the terminal identifier and MID may be entered in the merchant profile as associated with the terminal utilized in the enrolment transaction, details may be populated about the store where a specific terminal resides, or merchant details may be populated.

The present invention may also undertake to identify if information in the enrolment activity results represents data fields that are already populated in the merchant profile, but the information entered in the merchant profile differs from the information for the same fields that is included in the enrolment activity results. For example, for some merchants, the matched enrolment transaction may not be the first transaction request to be fulfilled for the merchant. Some merchant profile information may have been previously populated to reflect prior transaction information. The data of the matched transaction may differ from the information that has already been populated in the merchant profile. As an example, this may occur if the merchant operates with multiple merchant acquirers. If the present invention identifies the instance of a data conflict the merchant boarding interface may request confirmation from the merchant as to which data to store in the merchant profile, or the system may automatically undertake a process to determine which transaction information to store in the merchant profile. For example, the merchant boarding interface may automatically utilize the data from the newly matched transaction, or may continue to use the data existing in the merchant profile. If the existing profile information has been previously modified or approved by a merchant representative, the merchant boarding interface will typically disregard the newly received data from the matched transaction.

Once the merchant boarding interface has completed its extraction of unpopulated, or replacement, merchant profile information from enrolment activity results data, the merchant boarding interface may determine the number of enrolment activity requests that remain unfulfilled for each of the stores/branches/subsidiary locations that correspond to a merchant. A notification of any outstanding enrolment activity requests corresponding to a merchant may be sent to a merchant representative, and/or a contact detailed in the merchant profile. A skilled reader will recognize that a variety of contents may be included in the notification and that such notifications may be triggered by a variety of events, or by a set notification schedules.

Once the present invention identifies that all required merchant profile information is entered, or otherwise populated, and all enrolment activity requests for any stores/branches/subsidiary locations corresponding to the merchant profile are successfully completed, the merchant boarding process is identified as complete by the present invention. A confirmation of the completion of the boarding process may be sent by a notification to the merchant representative and/or a contact detailed in the merchant profile, in a manner described herein. Following completion of the boarding process the merchant profile may be amended, edited, or added to by an authorized user for that merchant. In the instance that additional stores/branches/subsidiary locations are added to correspond to a merchant profile in the present invention, an enrolment activity request may be sent for the added store/branch/subsidiary location and the status of the merchant profile may be altered from completed to pending until the enrolment activity is completed, as described herein.

Prior to completion of a merchant profile, a merchant representative may be required to review and/or approve the merchant profile, including the corresponding store/branch/subsidiary location information that is considered to be part of the merchant profile by the present invention. Review may require a merchant representative to access the merchant profile information and for the information to be displayed to a user, whereas approval may require specific entry by a merchant representative confirming approval. A skilled reader will recognize the variety of requirements that the present invention may impose for review and approval processes. Review and/or approval may be required each time a merchant profile status is to be altered from pending to completed.

The marketing system may deem a merchant profile complete after the enrolment activity request is fulfilled for a single store/branch/subsidiary location corresponding to a merchant is completed. The marketing system may also only require that review and/or approval of a merchant profile occur on one occasion, so that the addition of other stores/branches/subsidiary locations corresponding to the merchant will not alter the status of the merchant profile from complete. A skilled reader will recognize the variety of pending, completion, review and approval processes that may be applied by the present invention. A skilled reader will recognize that the present invention may apply the same processes to all merchants, or may require different processes for particular merchants, for example, such as in accordance with the type of merchant and the stores/branches/subsidiary locations that may correspond to a merchant.

Post-boarding Activities & Content Generation

After a merchant profile is completed, the present invention may provide a user with access to training materials through the training utility. The training materials may provide content to a user including information about the features, functions and/or possible utilizations of the marketing system. The training materials may be in the form of video, animation, pictures, graphics, text, multi-page wizard style content, or other content or combinations of content. Training materials may be provided a user on the screen of a computer or any other electronic device utilized to access the marketing system. The present invention may require that a user reviews at least a portion of the training materials before utilizing the present invention, for example, such as prior to completing automated merchant boarding.

After registration and/or automated merchant boarding is completed, the present invention may require that a merchant be activated before the present invention will undertake to engage the merchant in the functions and/or features of the present invention, for example, such as incentive generation for the merchant. The activation process may require that the merchant explicitly accept terms, conditions, or other legal requirements, in accordance with the merchant boarding interface. Such terms, conditions or other legal requirements may be in accordance with legislation and/or policies governing transactions.

The merchant activation may cause the merchant profile, including all associated merchant information that is part of the merchant profile, to be identified by the present invention as having the status of "active". A merchant marked as having an "active" status may be engaged by the present invention in the functions and/or features of the present invention, including marketing functions and/or features. For example, after activation the transaction linking utility may receive and store transactional data relating to purchases between members and the activated merchant, and such transactional data may be utilized by the present invention generally as described herein. Once activated, the merchant may interact with the merchant management interface. Interaction with the merchant management interface is only permitted by the present invention when the merchant is activated in the marketing system.

In one embodiment of the present invention, the merchant boarding interface may generate and send a notification to one or more members of recently activated merchants, or may otherwise make information regarding recently activated merchants to members in other manners. For example, such a notification may be sent to members identified by the present invention to be likely to engage in transactions with the activated merchant, in accordance with the merchant profile and member profile information. Such a notification may include an incentive from the merchant, and possibly a cross-sell incentive of another merchant. The present invention may also, or alternatively, inform members about recently activated merchants through a webpage display or other means.

The data mining tool and analytic mode of the present invention may generate a report for the merchant including details of the recently activated merchant, possible target members who may be likely to be customers of the merchant, and suggestions for merchant incentives. A merchant may request a report with similar content at any point while the merchant participates in the marketing system as an active merchant.

Intermediary Registration, Interface and Functionalities

In one embodiment of the present invention, one or more intermediaries may register with the marketing system and thereby become participants. In one embodiment of the present invention, a participant, and particularly an intermediary, may be a search provider, financial card provider, one or more advertising associates, one or more charities, one or more public or private interest groups, marketing specialists, one or more community programs, or other groups or individuals.

Particular participants may offer unique and specific means of communicating an incentive to participants and/or third parties. Intermediaries may either work with such participants, or may provide unique and specific means of communicating an incentive to participants and/or third parties themselves.

In one embodiment of the present invention, particular marketing program access may be configured to benefit one or more intermediaries. The access provided to intermediaries, or groups of intermediaries, may differ. For example, an advertising associate may be granted access to parts of the marketing program that are necessary for the advertising associate to work with a merchant to produce an incentive. As another example, a marketing program interface may be configured to provide access to a charity to part of the marketing program. That interface may enable a member, or other participant, to select one or more charities and allocate contributions or donations to a charity, for example, such as in percentages or contribution tiers (where the first X dollars benefit supported organization A, the next Y dollars benefit supported organization Y, etc.), or a combination thereof, to one or more charities. A skilled reader will recognize that the present invention may involve a variety of other contribution priority schemes and/or a variety of marketing program interfaces to provide specific access to particular intermediaries.

In an embodiment of the present invention, one or more intermediaries may also disseminate intermediary affiliate information to the marketing program, or information regarding the marketing program and/or any merchant incentive to its affiliates. For example, an intermediary may send direct mail to its affiliates, which may represent its existing contributor base if the intermediary is a charity, or financial card holders if the intermediary is a financial card provider. A skilled reader will recognize that the affiliates of an intermediary may be different groups in accordance with the type of intermediary. The direct mail may contain a website address and a participant identifier which may be generated for and associated with the intermediary by the marketing program when the intermediary registers with the marketing program. Upon receipt of the direct mail, an affiliate may navigate to the website address, which may be a portal to the marketing program. The affiliate may thereby be granted temporary, and possibly limited access to the marketing system for a specific purpose.

The direct mailing from the intermediary may also provide the affiliate with the opportunity to register as a member of the marketing system. During the registration process, the affiliate may enter the participant identifier. The act of entering the participant identifier may cause the marketing program to automatically configure the new member's preferences in accordance with rules created to cause specific operations upon the entry of the participant identifier. For example, entry of the participant identifier may cause the member's preferences to include information to provide for specific interaction between the intermediary and the new member, the new member and a merchant, the new member and a community program, or any other interaction. The interaction may include a contribution by the member of certain benefits to the intermediary, or to another participant, at a specific period in time, or upon a specific event. The entry of the participant identifier may further have the result that it signals to the marketing program that new member's personal information may be transferred via an electronic link to information regarding the new member available from another data source. The transferred information may be stored as part of the new member's profile in the data storage area.

In one embodiment of the present invention, at the point of registration with the marketing program, a member may identify a relationship to the intermediary. In another embodiment of the present invention, the intermediary may post a list of validated people affiliated with its organization and the marketing system may match any registering member to an intermediary list.

Members Registration, Interface and Functionalities

Individuals may register with the marketing program to become members. Registration could be facilitated by one or more registration means. For example, the individual may already be associated with a pre-registered program, such as, for example a financial program or a program of an intermediary whereby the individual is an affiliate of the intermediary. The pre-registered program may have one or more pieces of personal (identification) or demographic information associated with the individual available in a data source. A registration interface may be provided, this may include a page, for example, such as a web page, a page sent to an individual's mobile device (e.g., such as a smart phone, etc.), etc., whereby the individual approves joining the marketing program of the present invention. The registration interface may include a means for importing all personal or demographic information and preferences from the pre-registered program to the marketing program of the present invention.

In one embodiment of the present invention, if the pre-registered program involves one or more identifications the one or more identifications may also be transferred to the marketing program. For example, if the pre-registered program is a financial program one or more forms of payment linked to the pre-registered financial program could also be linked with the marketing program of the present invention to enable the marketing program to track transactions made with those forms of payment. In this manner the one or more forms of payment, or other identifications, may provide one or more participant identifiers linked to the new member for use by the marketing program. All registration data, including the one or more participant identifiers, may be stored in the data storage area, and may be accessible by the data mining tool.

As shown in FIG. 3, in another embodiment of the present invention, an individual 30 may register with the marketing program of the present invention by providing, through an interface 32, for example, such as a web page, a page provided on an individual's mobile device (e.g., such as a smart phone, etc.), or other interface, the individual's personal or demographic information. This information may include the individual's gender, the individual's age, the individual's location (e.g., home, workplace, or other location), as well as other demographic or personal information. The information may be stored in the data storage area and may be stored as a member profile. The marketing program may generate a participant identifier number for the new member. All registration data, including the participant identifier, may be stored in the data storage area 38 of the present invention, and may be accessible by the data mining tool.

In one embodiment of the present invention, a participant identifier card may be sent to the new member bearing the participant identifier number. A skilled reader will recognize that the participant identifier card need not be a physical card, but could be any form of payment device, including for example an RFID chip, a mobile phone, etc. depending on, for example, the supporting infrastructure of merchants.

The marketing program of the present invention may be operable to receive information from the member, at the point of registration, as well as at any other point while the member is a member of the marketing program of the present invention. Profile data may be collected by way of a variety of means, for example, such as a web page, a mobile device, a survey, transactions between members and merchants, or any other means. Said profile data may include a set of rich data including information that is additional information to that which is gathered at the point of initial registration. Said rich data may include a variety of information, for example, such as a list of the social networks the member is linked to, authentication information for those social networks (e.g. member names, passwords, etc.), preferred supported organizations and merchants (as described more fully below), transaction details for transactions undertaken by the member, survey data, any reviews generated by the member (e.g., merchant reviews, product reviews, or other reviews), updated location data, search query data of searches undertaken by the member, or other information. The information may be relevant to enabling optimal usage of the marketing program.

In one embodiment of the present invention, the data mining tool may be operable to identify members who may be inclined to utilize incentives defined by merchants. This identification process may occur in accordance with the rules of the marketing program and/or the analytic mode, and may be based on administrative criteria, for example, such as demographic targeting of incentives.

The loyalty engine of the present invention may be operable to communicate the merchant incentive to the identified members.

A skilled reader will recognize that the architecture of the marketing program may enable shielding of the personal information of all members from individual merchants. Shielding may be the result of the application of a security system linked to or otherwise integrated with the architecture of the marketing program and in particular with the transaction linking facility, the data mining tool and the data storage area. The marketing program administrator may be in control of the personal information and may be the sole party having direct access to such personal information. The personal information of a member may be accessed by the data mining tool, but any review, report, list, results or other data generated by the transaction linking facility, data mining tool or analytic mode, may be devoid of identifiable personal information, for example, any results of the data mining tool may be anonymized.

The marketing system of the present invention may be operable to provide member with access to the Internet and access to one or more search engines. Said search engines may be operable to support searching by the member. The member may search for merchants or products. The search engines may be available through the marketing system, or outside of the marketing system. Search engines outside of the marketing system may be linked or otherwise connected to the marketing system. Any searches undertaken by the member utilizing a search engine may be tracked by the marketing program so that details of the search are collected by the marketing system, or if the search engine is outside the marketing program details of the search may be transferred to the marketing program due to the link or other connection between the search engine and the marketing program. Details of the search may be stored in the data storage area. The search information may be utilized by the transaction linking facility to identify transactions based on searches and/or transaction based on incentives, as described in this application.

The loyalty engine of the present invention may be operable to permit a member to create a review of a merchant or product. The loyalty engine may further be operable to permit other participants to create reviews as well. The reviews may be created based upon a template, or in response to rules of the loyalty engine, so that the member views a template, or a set of questions and merely responds to the template or questions. The template or questions may be accompanied by an option for free-form creation of a review, such as a space where the member may type a review, or portion of a review. Reviews may be available through the marketing program so that other participants may access the reviews. For example, reviews may be available on an electronic bulletin-board, via specific webpages, via a search, or through any other means. In some embodiments of the present invention a member may be provided with an incentive or other reward by the marketing system upon the creation of a review.

In one embodiment of the present invention, one or more questions on a survey may be dynamic and may be generated to be specific to a member. For example, one or more survey questions to be included on a survey to be provided to a specific member may be generated based on data relating to that specific member stored in, or accessible by, the marketing program. As an another example, one or more survey questions to be included on a survey to be provided to a group, class or category of members (for example, such as a group of boarded members, or other groups, classes or categories of member) may be generated based on data relating to the specific group, class or category of member stored in, or accessible by, the marketing program. Still another example, one or more survey questions may be generated to gather information regarding behaviour of users or members and may be used as a source of information that provides a richer underpinning to consumer behaviour analytics of the marketing program, in particular behaviour relating to a transaction that may facilitate the analysis of the likelihood of a link between behaviour of a member or a user, such as a search activity, and a transaction. A skilled reader will recognize the other uses of survey questions directed to extract information that may be analyzed to produce behavioural data relating to a member or a user.

Yet another example of specifically generated survey questions may include questions relating to a search undertaken by a member or user that the marketing program matches to the transaction with a low, moderate, high or other level of certainty, as described above. As another example of specifically generated survey questions these may include questions generated after a member provides negative review regarding a merchant. A survey generated upon a subsequent transaction involving the member and the merchant may include questions that are devised to indicate whether the experience of the member during the transaction with the merchant improved during the subsequent transaction as compared to the transaction for which the member provided a negative review.

The analytic mode of the present invention may be operable to generate suggestions for survey questions to be included in surveys. The suggestions may be generated based upon parameters set for the purpose of the survey, and the suggestions may reflect information relating to the merchant and/or the members accessible by the data mining tool. The analytic mode may also generate or select the suggested survey question from a list of predefined questions related to the merchant's category, questions being utilized by similar merchants, or by determining trends in merchant reviews and formulating questions relating to those reviews. Merchant reviews may be accessed from third party data sources, for example, such as data sources of search providers, social networks, and merchant review sites, such as Yelp™, Urban Spoon™, etc. A skilled reader will recognize that other data sources may be accessed and utilized by the analytic mode. The suggestions may be accepted, modified or declined by the merchant. Suggestions may be generated before a merchant boarding process is completed, or after a merchant boarding process is completed. A merchant may create survey questions and include these in surveys. Surveys, and individual survey questions, may be stored in the merchant database, and may be associated with a merchant profile.

In embodiments of the present invention, the marketing program may be operable to support contribution priority schemes. The following represent examples of possible contribution priority schemes that may provided in embodiments of the present invention. As one example, the marketing program interface may be operable to allow a member to modify his or her contribution preferences either at any time, or after particular periods of time. Another example is that the marketing program interface may be operable so that a community program, a foundation or other disseminating entity may register as an intermediary of the present invention. A member may provide a benefit (e.g., a donation or other benefit) to one or more intermediaries (e.g., the community program, the foundation or other disseminating entity), either directly, or through a merchant.

Figure 4:
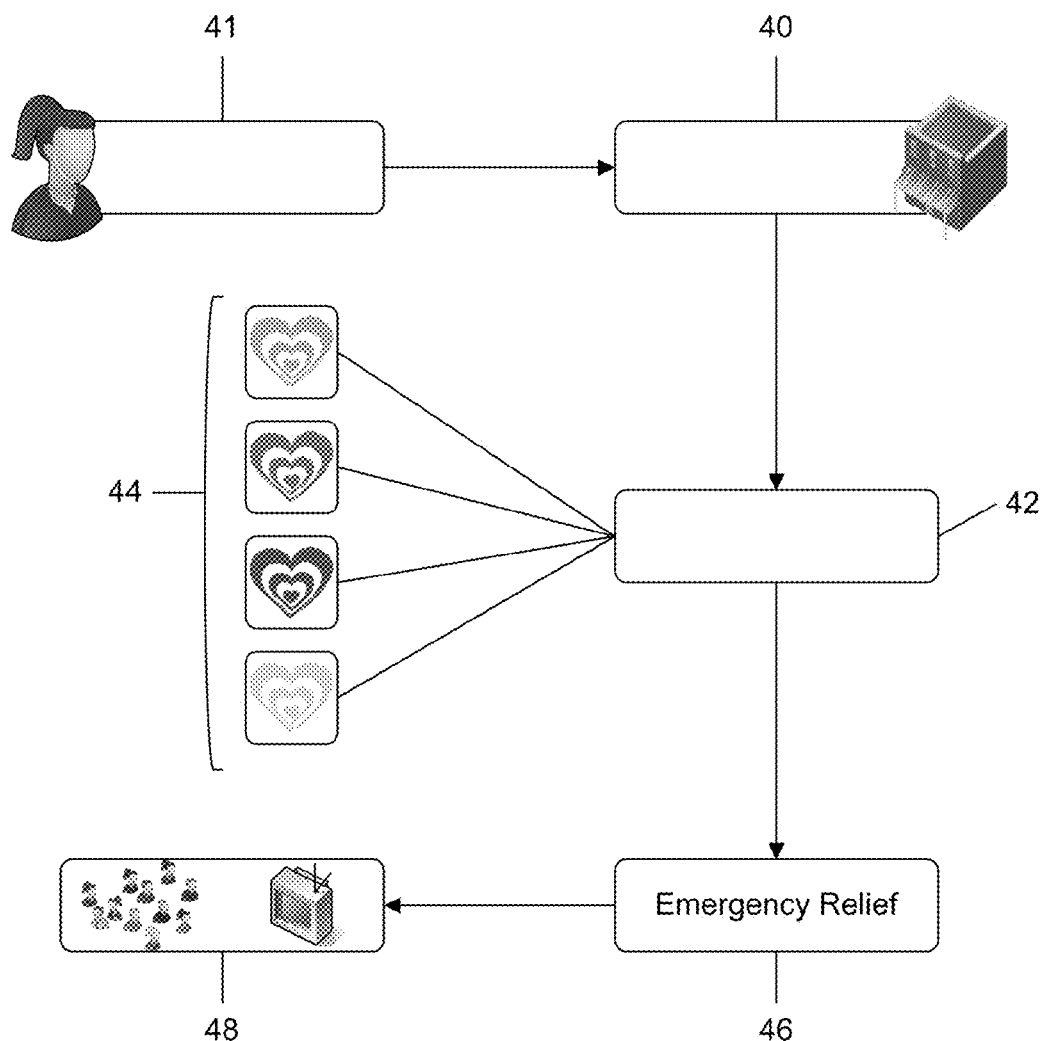
FIG. 4 is a systems view of a transfer of donations by the marketing system.

For example, as shown in FIG. 4, the benefit may be generated based upon a transaction between a member 41 and a merchant 40 in accordance with a merchant incentive, such as an incentive that provides a donation to an intermediary based upon a transaction. Once the benefit is received by the intermediary 42 (e.g., the community program, the foundation or other disseminating entity) the intermediary may either accept the benefit, for example if the intermediary is a community program. Or, if the intermediary is not a community program or other group that is to receive any benefit, then the intermediary may disseminate portions of, or the whole of, the benefit to one or more organizations 44, for example, such as charities, community programs, etc. The intermediary may also determine in some instances to redirect portions of, or the whole of, the benefit to an organization such as an emergency relief organization. The decision to redirect the benefit, or portions thereof, in this manner may be due to an emergency (e.g., such as the Haiti earthquake). Information outlets 48, for example, such as the media and social networks, etc., may disseminate information about the support for the organization 46 and build goodwill for the merchant.

In another embodiment of the present invention, a member may choose to match one or more donations that are generated based upon transactions with merchant stores. For example, the member may indicate to the marketing program that: all donations based upon transactions involving the member should be automatically matched by the member through the operation of the marketing program; that donations based upon transactions involving the member pertaining to one or more specific community programs, to one or more specific merchants, or to all community programs and/or merchants, during a specific period of time (such as during a period of emergency, during a particular campaign of a community program, or during any other period of time) should be matched automatically by the member through the operation of the marketing program; or that donations based on transactions between the member and one or more specific merchants should be automatically matched by the member through the operation of the marketing program. A skilled reader will recognize that other options for a member provide a matching donation through the operation of the marketing program may also be possible.

In yet another embodiment of the present invention, an intermediary may choose to match donations generated in one or more regions. For example, the intermediary may indicate to the marketing program that: all donations based upon transactions involving all merchants should be automatically matched by the intermediary through the operation of the marketing program; that donations based upon transactions pertaining to one or more specific community programs, to one or more specific merchants, or to all community programs and/or merchants, during a specific period of time (such as during a period of emergency, during a particular campaign of a community program, or during any other period of time) should be matched automatically by the intermediary through the operation of the marketing program; or that donations based on transactions involving one or more specific merchants should be automatically matched by the intermediary through the operation of the marketing program. A skilled reader will recognize that other options for an intermediary to provide a matching donation through the operation of the marketing program may also be possible.

As yet another example, the marketing program interface may provide to the member one or more intermediary codes that, when entered by the member into the interface, could automatically configure particular dissemination rules whereby one or more specific benefits may accrue to one or more intermediaries, charities, community programs, etc. The dissemination rules may be recognized by the loyalty engine.

A skilled reader will recognize that these examples are not exhaustive, and other possible contribution priority schemes and specific interfaces for particular intermediaries may be provided. The contribution priority schemes of the present invention may be operable to produce a transparent, accountable transfer of donations or other benefits.

Survey, Review, List, Report, Etc. Generator

To aid in the collection of data stored in the data storage area, and the generation of reviews, reports, lists, results and other data generated by the transaction linking utility, data mining tool or analytic mode, the loyalty engine may generate surveys to be completed by members or other participants of the marketing program of the present invention. Such surveys may provide questions specifically created to derive information directed to the function of the marketing system, to particular transactions or transactions generally, to any merchant, intermediary or community programs, or to any other information relevant to the marketing system. Such surveys may be provided when a participant registers with the marketing system, or at any other point in time, such as after a transaction, following a merchant incentive offering, etc. Surveys may be provided to participants by a variety of means, including through web-pages, upon logging into the marketing program, via a mobile device, as a printed survey at the merchant location, or via any other means.

In one embodiment of the present invention, a post-transaction survey may be provided to a member involved in a transaction. The post-transaction survey may include a variety of questions, but may particularly include questions regarding the influences that led to the transactions. For example, was the transaction influenced by any incentive offered by the merchant. A skilled reader will recognize the variety of questions that may be included in a post-transaction survey.

Reviews, reports, lists, results, etc., based on the surveys can be generated for merchants. For example, survey results that indicate particularly good or bad service by a specific merchant, or particularly good or bad quality of a product, or any other information, may be identified by the data mining tool and the information may be summarized, or consolidated into a review of the merchant, product, or other element to be reviewed. In this manner reviews may be automatically generated by the marketing system, alternatively reviews may be generated upon request by a participant or third party. Reviews may also be created by participants, based upon a template or in a free-form manner. Another example of a use of such information is that when other members are searching for a merchant these members may access or be provided with a copy of a review regarding a particular merchant. A skilled reader will recognize that the use of reviews, reports, lists, results, and other documents may be wide and varied.

Local, Regional and/or National Applications

In some embodiments of the present invention, the marketing programs may operate to produce local benefits, regional benefits and/or national benefits to the participants. For example, the present invention may be operable to permit a member to participate the marketing program in one location, region, nation, etc. Yet the present invention may further permit a member who is travelling, relocating, or is otherwise interested in another location, to participate, automatically, or upon request, in the marketing program in another location, region, nation, etc. Merchants that have an international, national, multi-regional, or multi-locational presence may be associated with the marketing program. Specific store locations associated with a merchant may be recognized as existing within a specific location, so that in the locational, or regional operation of the marketing program the stores locations may be associated with the corresponding community programs of the marketing program.

For example, an incentive may be applicable to one or more store locations of the merchant. An international incentive may be applicable to a community program that is international, such as Right to Play™, and said international incentive may be honoured by all of the merchant's store locations in the world. A national incentive may be applicable to a national community program, such as the Canadian Olympic Torch Relay™, and said national incentive may be honoured at all of the merchant's store locations within a particular nation (e.g., all Canadian store locations of The Bay™). A regional incentive may be applicable to a regional community program, such as the Vancouver Olympic Games™, and said regional incentive may be honoured at all of the merchant's store locations within a particular region (e.g., all store locations of The Bay™ in the City of Vancouver, British Columbia, etc.). Smaller locational incentives may also be provided that are applicable to a more localized location, such as a festival held in a park, and said localized incentives may be honoured at all of the merchant's store locations within the specified location (e.g., store locations bordering the park where the festival is held, store locations on a street where a street festival is held, etc.).

A skilled reader will recognize that merchants of various sizes may participant in the marketing program of the present invention. The marketing program may be operable to permit a community program and/or specific merchant store(s) to associate with the marketing program and receive benefits. Neither the community program nor the merchant need have a national presence. Merchants and community programs that do not have a national presence may enjoy lower national public recognition. This lower public recognition may have resulted in reduced benefits to the community program and/or local merchant store(s), since neither may be recognized beyond a small location and therefore a small number of donators/contributors/attendees/consumers/etc. Participation in the marketing program of the present invention may provide participants with the benefit that members gain awareness of community programs and/or merchant store(s) occurring in their local area. This awareness may augment the notoriety of the community program and/or the merchant store(s). The awareness may further have other benefits, described herein, including increased attendance at a community program and/or increased sales at a merchant's store.

As described in this patent application, the present invention may have a variety of embodiments, one such embodiment may involve a merchant committing to donate a portion of its revenue from transactions at a one or more store locations involving members to a community program, said community program being local to the merchant store(s) where the transactions take place. The donation portion of the revenue amount may be based on various parameters. Said parameters may be tracked by the marketing program. The marketing program may operate so as to utilize the tracked transaction information to calculate the amount a merchant is to pay to a community program in accordance with the promised donation. The donation amounts may additionally be trackable and reportable in a clear manner upon request, so that the transfer of the donation amount is obvious and is possibly unencumbered by transfer fees. In this manner this embodiment of the present invention may enable community programs and merchants to participate in the marketing program in a manner that is cost effective to all parties of the marketing program.

In another embodiment of the present invention, the marketing program may be operable to permit a merchant to offer different contributions to designated community programs. This may involve a merchant providing multiple incentives at one or more store locations to members, and at least two of the multiple incentives being associated with different community programs. The marketing program may be operable to track the multiple incentives and/or the different contributions by merchants to designated community programs. The factors that may be tracked by the marketing program, said factors may determine the type of contribution to be made by the merchant to a community program and/or the merchant incentive to be applied to a transaction, may include one or more of the following: the time of day when a transaction occurs; the day of the week when the transaction occurs; any member demographics; any transaction history; any incentive details, for example, such as a coupon, provided at the time of the transaction; and the community program details. A skilled reader will recognize that other factors may be utilized by the marketing program to define and track contributions by merchants to community programs and/or merchant incentives.

Boarding Means

In one embodiment of the present invention, to facilitate batch customer acquisition a boarding means may be provided to operate to allow a third party and/or intermediary to associate itself with the marketing program. The intermediary may be, for example, an online retailer having a customer base with user accounts, an online payment provider also having a customer base with user accounts, an online advertiser and/or search provider, or any other online presence having a customer base with user accounts. The intermediary could also be a company and the members to be acquired by the marketing program could be the employees of the company. The marketing program may make the boarding means accessible to the intermediary by, for example, a user interface for creating the association. The intermediary may desire to associate with the marketing program for a plurality of purposes, including: increasing its own customer base to include the marketing program's members; altruistic purposes; to increase its own charitable giving for tax purposes; or to appeal to consumers and generate marketplace goodwill.

In one embodiment of the present invention, the boarding process may operate so that once the intermediary associates with the marketing program, the user accounts of the intermediary may automatically become associated with the marketing program. Once the user accounts are associated with the marketing program each of the users is recognized as a new member of the marketing program. The marketing program may then be operable to provide a user interface for these new members, whereby the new members may complete their profiles. The provision of this user interface may occur in any of the manners described above, for example, such as through the provision of a survey, through the provision of a particular web page, or other means. A skilled reader will recognize that It this boarding process, and the acceptance of new members generally into the marketing program, may increase the awareness of the marketing program and may significantly increase its member base. As described above, this may produce benefits for the merchants, community groups, and other intermediaries participating in the marketing program.

Participant Location Facilitator and Mapping Function

All members of the marketing program may be identified by the loyalty engine of the present invention as existing in a particular location. This location may be recognized as being in the vicinity of areas associated with particular community programs. In accordance with the scope of the community programs this area may have a perimeter that encompasses a wide or narrow territory. For example, the member may be recognized as existing in a location that is within an area that is a neighbourhood, or an area that is a country. In embodiments of the present invention, it may be possible for the marketing program to recognize a member as existing in a single location (e.g., a home address), or multiple locations (e.g., a home address, a work address and/or other addresses, such as a cottage address).

In one embodiment of the present invention, a mapping means may be operable to allow a member or other participant to request a map showing merchants that are participants of the marketing program located in, or near to, an area that encompasses a location of the member. The marketing program may utilize the data mining tool to identify a location of the member from the member profile (e.g., the home address of a member), the marketing program may ask the member to choose a location if multiple locations are in the member profile (e.g., choose a home address or a work address of the member), or the marketing program may accept a location inputted by the member as the location of the member. The area of the map may be adjustable to show various sized areas. The marketing program may also be operable to allow a member to specify categories or types of merchants to be shown on the map (e.g., restaurants, clothing stores, hardware stores, etc.). A skilled reader will recognize that other parameters may be included in the requested query.

The present invention may generate a map based upon the member map query. The data mining tool may be utilized to identify any merchants and/or community programs located within the area of the map.

Figure 5:
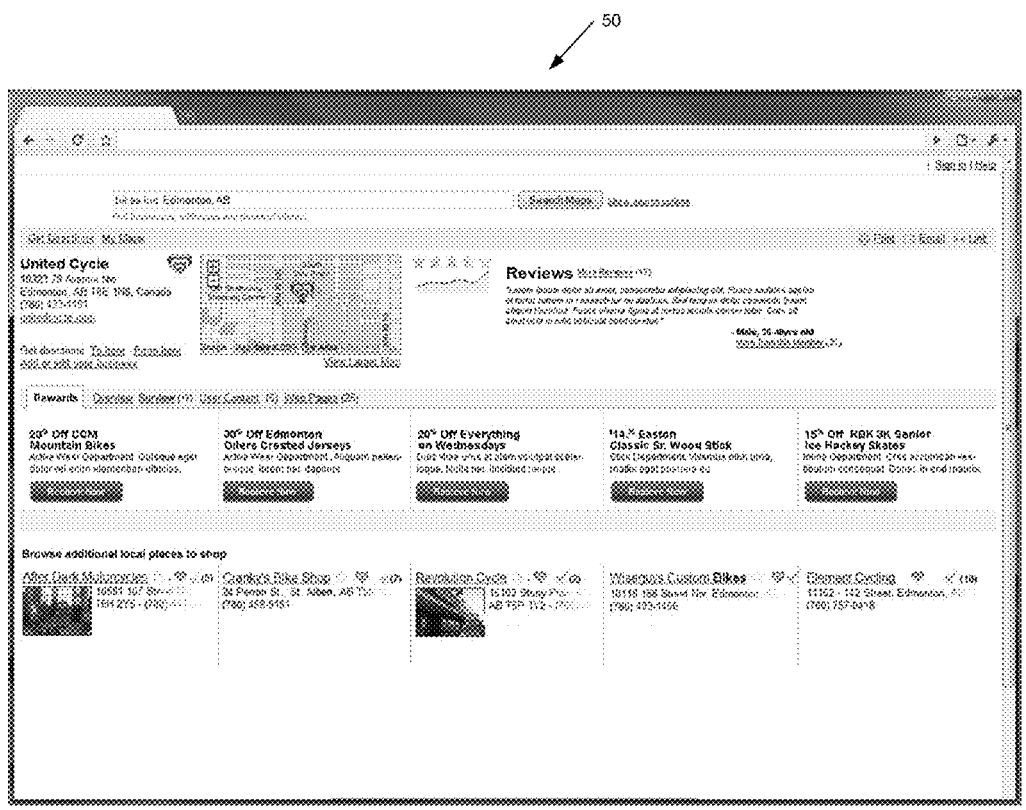
FIG. 5 is a screen view of a merchant information web page.

An example of a map 50 of the present invention showing merchant information is shown in FIG. 5. This is just one example of possible maps that may be generated by the present invention, and a skilled reader will recognize that other map displays or other map outputs may be possible.

Maps generated by the present invention may show the merchant store(s) existing in, or near to, a location or area. The map may additionally show the location of any community programs occurring at the time when the query is sent (e.g., such as a street festival in the area, or a clothing drop-off located on a street). The map may have other facilities as well. For example, the map may indicate, may be by way of a symbol or colour indicator, that particular merchants are offering merchant incentives.

The map may also permit information regarding merchants, community programs and/or merchant incentives to be accessed by a participant, for example, such as by a display that appears when a mouse is held over where the merchant and/or community program is shown on the map, or by a clickable access to information (e.g., clicking the merchant location accesses the merchant web page or a summary of merchant information, etc.), or other information access and/or display means. The displayed or accessed information may include the location of a merchant store and/or a community program, the dates when a community program is occurring, the date(s) for a merchant incentive, and any other information. The displayed or accessed information may be provided in accordance with rules of the marketing program. A skilled reader will recognize that the present invention may include other options of visually displaying or accessing information regarding merchants, community programs and merchant incentives in a specific location.

Still other embodiments of the present invention may be operable to recognize the location of a member at a point of time. For example, a GPS system on a mobile device in the possession of a member or other participant may send location information to the marketing program. In this embodiment the marketing program may provide a member with information regarding merchant incentives pertaining to the location of the member at a point in time. (For example, a member who travels on vacation to New York City may be recognized by the marketing program as existing in New York City because the marketing program can read the location of the member based on a GPS feature or application linked to the smart phone in the possession of the member. The member may then submit a query to the marketing program requesting information about merchant restaurants local to the location of the member in New York City at the time of submitting the request. The marketing program may generate a map showing merchant restaurants in the vicinity of the location of the member submitting the request in New York City. The function and capabilities of the map may be as are described above.)

Data Storage Area & Data Mining Tool

The data mining tool of the present invention may be utilized to generate a wide variety of reports, reviews, lists, results, search displays and other data from the data stored in the data storage area. In some embodiments of the present invention, in order to produce certain outputs, the data mining tool may also engage the transaction linking utility to generate some information to be provided as part of the output.

The data stored in the data storage area may include information pertaining to past, present and/or future community programs. This information may be gathered by the administrator, as described above. The community program information may link a community program to a specific area or location, and may include details of the community program (e.g., dates, times, location(s), events, summary of community program, etc.).

The data may also include information regarding participants in the marketing program (e.g., merchants, members and intermediaries). This participant information may include information generated at the point of registration, as well as information collected at later points in time, for example, such as through surveys, tracked searches, etc.

The data may further include details of transactions between members and merchants. Such transaction details may include any merchant incentive that was applied to the transaction. If an incentive was applied the community program that the incentive was applicable to may also be included in the data.

In one embodiment of the present invention, a link may be produced between the transaction data and the community program information already existing in the data storage area. The data mining tool may be operable to limit information appearing on any report, review, list, results, etc., so that such information cannot include any personal information pertaining to any participant of the marketing program. Alternatively, the data mining tool may generate reports, reviews, lists, results, search displays, etc., in accordance with rules whereby the data mining tool anonymizes any personal information utilized to generate the reports, reviews, lists, results, etc. A skilled reader will recognize that other methods and means may be utilized to ensure that personal information is not disseminated in any report, review, list, results, etc. Additionally, a skilled reader will recognize that the rules for limiting the dissemination of personal information may be in accordance with privacy legislation pertaining to a particular jurisdiction, may provide limitations representing several levels of security, or may be set to a standard that is stricter than privacy legislation. The standard of privacy imposed on the information may be chosen and applied at the discretion of the administrator.

A skilled reader will recognize that other information regarding the transactions, participants, merchant incentives, donations, and community programs relating to the merchant program may be collected by the loyalty engine and stored in the data storage area.

In one embodiment of the present invention, a data access management utility may be utilized to organize the collection of data, the storage of data in the data storage area and the access of data in the data storage area. The data access management utility may be operable to restrict direct access to the data to the administrator, for the purpose of protecting data integrity and privacy of personal information. The data access management utility may further restrict access to particular by the data mining tool for particular types of information generation and/or for specific participants. In particular, the data access management utility may recognize that intermediaries have limited participation in the marketing program and therefore that any query or request for information instigated by an intermediary may not access, even for reporting purposes, particular data stored in the data storage area.

In one embodiment of the present invention all of the information existing in the data storage area may be accessible by the data mining tool for the purpose of generating reports, reviews, lists, results, summaries, overviews, and any other information. The reports, reviews, lists, results, search displays, summaries, overviews, and other information may be generated in accordance with rules of the loyalty system. For example, rules may be created whereby a merchant transaction report is generated at a regular interval (e.g., monthly, etc.) for each merchant showing the transactions between merchants and members during a specified period of time.

Rules may also be created to be used for the generation of reports, reviews, lists, results, summaries, overviews, and other information upon request. For example, rules may be created whereby a merchant may request a list of members existing in the vicinity of a merchant's store location.

In some embodiments of the present invention, free-form queries may also be undertaken by the data mining tool, whereby specific information may be gathered for a particular purpose or application. For example, after a merchant incentive is completed a free-form query may be created to generate information pertaining to the merchant incentive. This information may be reviewed to glean important understanding of the success of the merchant incentive. A report, review, result, etc. may be further utilized to develop new merchant incentives.

In other embodiments of the present invention, a search requested by a specific participant may be moulded by information specific to that participant. For example, if a search is requested and/or otherwise generated by a member, the data mining tool may mine the member's information, including the member's profile data, and determine the location of the member, or other preferences of the member, and may use this information as search parameters. The resulting report, review, list, summary, overview, and any other form of information collected during the search, may be limited to data for the location of the member and/or other preferences of the member.

In still another embodiment of the present invention, a web page or other display may be provided to a market program participant, whereby a request for information or other data query may be generated and conveyed to the data mining tool. The request for information or other data query may be generated through a request or search interface. For example, the request or search interface may be a web page or other display and it may provide entry spaces where specific information may be entered by a participant, such as a data range, a location, etc. Such a web page or other display requiring specific data entry may support a request for information or other data query that is governed by one or more rules of the marketing program. A web page or other display may further allow a participant to choose, or otherwise specify, specific types of information to be accessed by the data mining tool. Such choices or specifications may not be limited by any rules of the marketing program. A skilled reader will recognize that a variety of means may be utilized to provide a market program participant a means of requesting information or generating any other data query.

The data mining tool may be applied to utilize the request for information or other data query information provided by the participant, the marketing program rules, or other inputs to search the data storage area for data relevant to the request for information or other data query submitted by the participant to the marketing program. The data mining tool will be utilized to conduct the request for information or other data query search. Consequently, all of the information stored in the data storage area may be accessed by the data mining tool for the purpose of the request for information or other data query search. This information may include member profiles, transaction data, survey information, merchant incentive information, merchant information, intermediary information, etc.

Figure 6:
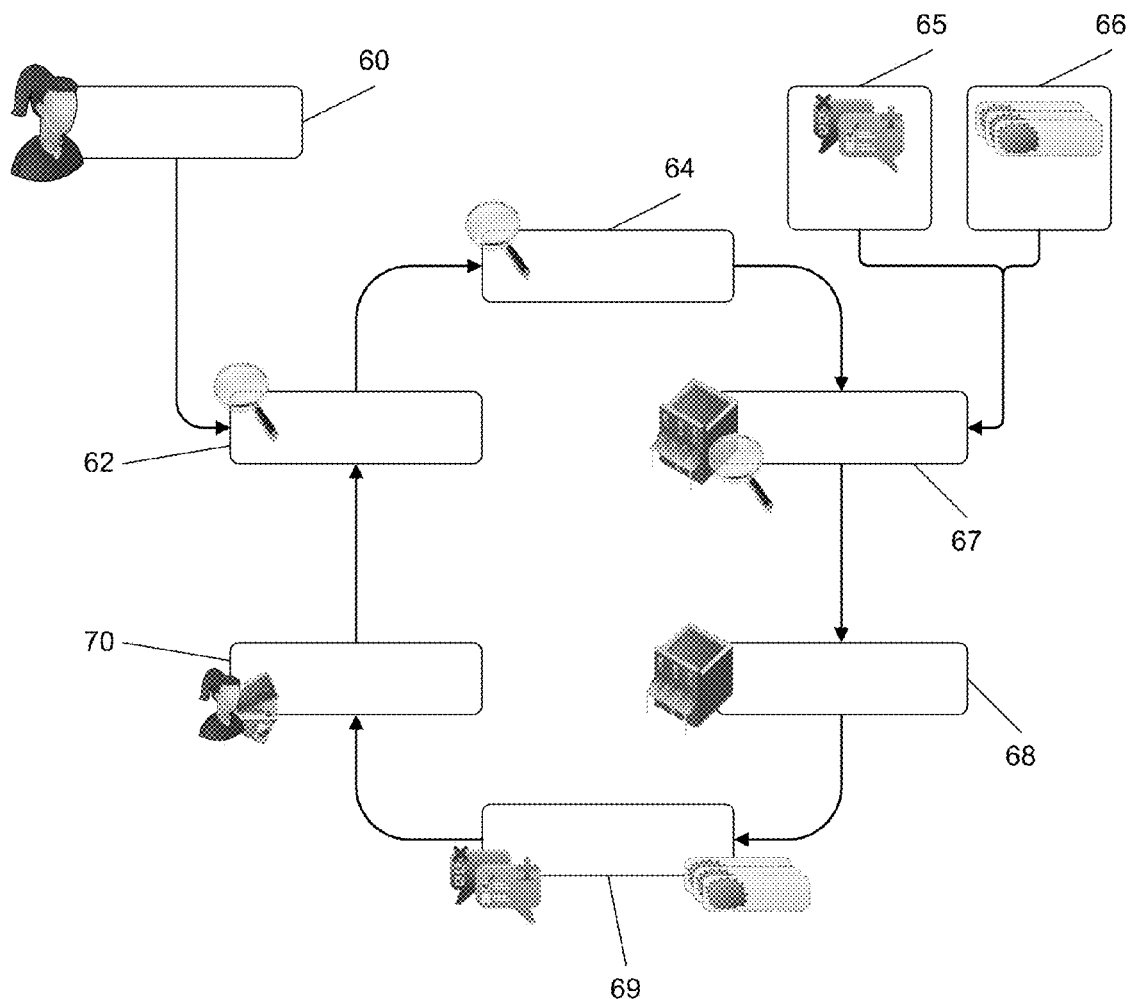
FIG. 6 is a systems view of a search request process.

For example, as shown in FIG. 6, a request for information may be generated by a participant 60, who utilizes a request or search interface 62. When the participant submits the request for information to the marketing system the data mining tool may engage in a search process 64. As an example, if the request for information is a search for merchants in a particular vicinity, the data mining tool may access data in the data storage area, including merchant profile information, survey feedback regarding merchants 65 and merchant incentive information 66. The data mining tool will generate results 67 that may be displayed to the participant or otherwise communicated to the participant. In one embodiment of the present invention a cost may be levied for access to the results, and or further searches based upon the results.

The results may display more than one merchant. The participant may be provided with the opportunity to select one or more of the merchants 68 to narrow the scope of the results. For example, the participant may have the opportunity to click upon a merchant included in the results provided as part of an online display. The activity of clicking upon a merchant may cause the participant to access the merchant's web page, or to cause the data mining tool to generate and display more details regarding the merchant. For example, a web page 69 showing reviews relating to the selected merchant and merchant incentives may be displayed when a participant clicks upon a merchant. It may be possible for a participant to conduct a transaction 70 with the merchant, such as a transaction whereby a participant purchases an item from a merchant, and said transaction may involve a merchant incentive. A skilled reader will recognize that this is just one example of how the request for information or data query may function and that other functions are possible.

Analytic Mode

In one embodiment the data mining tool may include an analytic mode. The analytic mode may be operable to cause the data mining tool to perform an analysis based upon the data that the data mining tool accesses. The analytic mode may incorporate rules of the marketing system, or may be distinct from rules of the marketing system.

The analytics may cause the data mining tool to produce information that provides more than a display of a subset of the data stored in the data storage area. The analytic mode may access and incorporate any of the information collected and gathered by the marketing program and stored in the data storage area. The analytic mode may therefore utilized to reflect information: in response to a particular advertisement, merchant incentive or other aspect of the marketing program; providing behavioural data relating to member transactions; and/or pointing to member interests which may be the basis for directing particular advertisements or merchant incentives to individual members or member groups. The analytic mode may be utilized to provide information to be used to develop new merchant incentives, marketing and philanthropic strategies for the marketing program participants and/or the wider community. Analytic mode results may reflect results for a particular area, which may be a city block, a neighbourhood, a city, a street, a region, a county, a province or state, a nation, etc., to reflect results for widening ranges of participants and locations.

For example, the data mining tool may produce a list of members existing in a particular location based upon a query, said query being a either a free-form query or a rule(s)-based query, if the analytic mode is not engaged for the data mining tool. If the analytic mode is engaged the data mining tool may analyze or otherwise filter, re-represent, consolidate or manipulate prior to presenting the generated data in a report, review, list, overview, summary, result, etc. A skilled reader will recognize that the analytic mode can undertake a variety of data analysis techniques, including algorithms, calculations, reviews, filters, consolidation, manipulation, re-representations. The analytic mode may further involve one or more rules of the marketing program. Additionally the analytic mode may be utilized to produce reports, reviews, lists, overviews, summaries, results, etc. on a regular basis, or upon demand, as described for the data mining tool generally above.

The benefit of the analytic mode may be to generate particular data, provided in a specific format, that may be utilized for a precise purpose. For example, the analytic mode may generate information that provides customer demographics for a particular merchant incentive. The customer demographics may be utilized to develop new types of targeted merchant incentives. A skilled reader will recognize that variety of types of information may be generated by an analytic mode and that a variety of uses may be made of such generated information in the context of the marketing program.

The data mining tool, with or without the analytic mode engaged, may be utilized to provide information to participants of the present invention that may aid in creating links between merchants, customer programs and/or specific customer demographics. For example, the data mining tool may be utilized to generate a list of members who may make use of a particular merchant incentive offered in one or more specific merchant store locations. Such a list may be utilized to provide instructions to the loyalty engine to disseminate a communication (e.g., via email, to a smart phone, etc.) to the members included in the list regarding a merchant incentive. As another example, the data mining tool may be utilized to generate a list of members and/or merchants existing in a particular location who may be interested in attending a specific community program event. Such a list may be utilized by a community event to produce a guest list to whom invites may be disseminated (e.g., via email, to a smart phone, via the regular post, etc.) to the member invitees. As yet another example, the data mining tool may generate a display of a set of reviews of a particular merchant to a third party considering becoming a member of the marketing program. Such a list may be utilized by the third party to decide whether to become a member of the marketing program or not, or whether to visit a particular merchant or not.

A skilled reader will recognize that a variety of information may be generated by the data mining tool, with or without the analytic mode engaged, and that the breadth of the information generated may be directly affected by the depth of information stored in the data storage area. Storing a wide variety of information in the storage data area, which may be portioned for storage purposes, but wholly accessible by the data mining tool, provides data having significant depth for the data mining tool to utilize. The present invention is therefore operable to provide not only a wide variety of information, but also detailed information and specific targeted information to be utilized for many purposes.

Transaction Linking Utility

A transaction linking utility may be operable to determine links between member or user behaviour or attributes and a transaction. The determination of links may be qualified, to indicate a level of likelihood or certainty of a match between the member or user behaviour or attributes and a transaction. For example, the transaction linking utility may be operable to determine that a search for a product undertaken by a member may have resulted in a particular transaction occurring. In this manner the transaction linking utility identifies a link or a match between the search and the transaction by the member. The match may not be wholly certain in each case and therefore the transaction linking utility may further be operable to indicate a level of certainty or likelihood that the match or link between the search and the transaction is accurate. Many factors can be utilized to determine the level of certainty or likelihood. A skilled reader will recognize that a variety of member or user behaviours or attributes may further be factors in the determination of the transaction linking utility.

The transaction linking utility may be operable in some embodiments of the present invention to generate behavioural data regarding activities or behaviours of members or users in relation to transactions. The transaction linking utility may be utilized in conjunction with the data mining tool and in some cases the analytic mode to generate specific data for a variety of purposes relating to transactions.

Method

A skilled reader will recognize that a variety of methods may be applied in the present invention. The description below provides some possible examples of methods of the present invention.

Registration of Participants and Data/Information Collection

The method of the present invention may involve an administrator collecting information regarding community programs. The administrator may utilize automated search means and/or manual search means to locate community programs. Information regarding the community programs, for example, such as the dates, times, events, purpose of the community program, may be stored in the data storage area. The information collected regarding each community program may include details necessary for an individual to attend a community program, as well as details regarding the purpose, history or aims of the community program. All community program information may be stored in the data storage area. The information collected and stored for each community program may include details regarding the location where the community program operates or events relating to the community program are held.

The community program information may be displayed in a variety of means, such as in a list of community programs, a calendar showing the dates of community program events, or in any other means.

Members and merchants may register with the marketing program of the present invention. The process of registration may involve the members and/or merchants providing certain information to the marketing program. This information may be saved in a profile for each member and/or merchant. The profile information may include a variety of types of details, but may also include a participant identifier. The participant identifier may be retrieved from organizations or programs the merchant and/or member is previously involved in, for example, such as a BIN number, a financial card number, or a transaction number. Alternatively the participant identifier may be randomly generated and applied to the profile by the marketing program. Additional information may be collected regarding participants due to activities (e.g., transactions, searches, queries, reviews, etc.) and/or the provision of additional information by participants (e.g., by direct input, survey responses, etc.).

Some members may be boarded into the system, so that such members are not required to individually enter initial profile information. Profiles information may be transferred to the marketing program for members that have previously been involved with other organizations or programs form said organizations or programs. If boarding occurs the individual member will be required to activate the profile in order to register with the marketing program.

Figure 7:
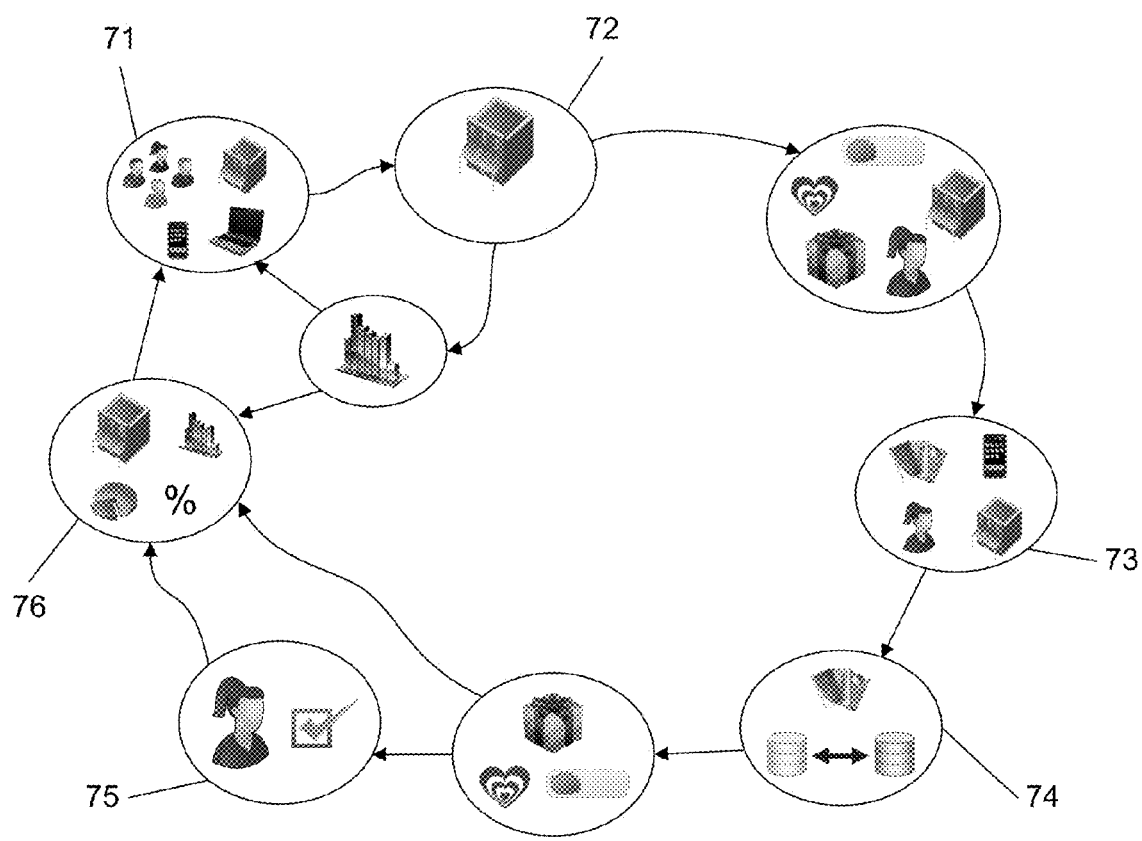
FIG. 7 is a view of the flow of one embodiment of the marketing program generating members through a boarding process.

A boarding process, such as is shown in FIG. 7, may be utilized for example for employees of a company or a financial card provider. In this example, the company or financial card provider may decide to join the marketing program, for example, the company or financial card provider may join as an intermediary and thereby have partial participation in the marketing program. The company or financial card provider may make available information regarding all of its employees or financial card holders for boarding purposes. The employees or financial card holders may be provided with a registration activation code. Once the employee or financial card holder provides the registration activation code to the marketing program the member registration is complete for the employee or financial card holder who then becomes a member 71 of the marketing program. In this example, the participant identifier for the members could be an employee number or a financial card number. This information would be transferred in the boarding process. Alternatively, an employee or financial card holder may be required to watch an informational video regarding the marketing program, or view other information prior to becoming registered as a member. A skilled reader will recognize the variety of means of registration that may be utilized to register a boarded member with the marketing program.

After registration members may access merchant information 72 regarding one or more merchants through the marketing program, as described in this specification. The member may request and access specific information regarding a merchant, for example, such as information regarding merchant products, services and/or incentives. The member may also review information pertaining to the member, such as any amount of rewards (such as reward points) accumulated by the member, member profile information, etc. The member may engage in transactions with the merchant 73, as a result of accessing information regarding a merchant or for other reasons, and the transactions may occur online or offline. Information regarding the transaction may be transferred to the marketing program 74, and the transaction linking utility may be utilized to confirm that a member is eligible for a merchant incentive. The matching may utilize details of the transaction or other member details stored in the data storage area in conjunction with the transaction details, for example, such as merchant incentive information, the identification of a member, financial card information, or other information, to identify when a member is eligible for a merchant incentive.

The transfer of information from a merchant to the marketing program for an online transaction may occur in a variety of ways. For example, the information may be transferred via an information link existing between the marketing program and the online site where the transaction occurred. If the online site where the transaction occurred is accessed through the marketing program website, or through a search engine linked to the marketing program, an information link may automatically transfer the information regarding the transaction to the marketing program. In other instances, the marketing system may be capable of searching the merchant online transaction information stored in the merchant's server to identify transactions involving members of the marketing program or any merchant incentive. In one embodiment, upon a merchant transaction a notification may be sent to the marketing system to search the merchant's transaction information, or the search may occur at any interval or time after the transaction. It may also be possible for the merchant site to transfer information to marketing system at regular intervals when there is relevant transaction information reflecting transactions involving either members or merchant incentives. Any transfer of transaction information or search of transaction information may occur either in real-time in relation to the transaction, or at any time after the transaction occurs. A skilled reader will recognize that a variety of other means and/or methods of transferring transaction details to the marketing program during or after an online transaction occurs may be applied in the present invention.

The transfer of information from a merchant to the marketing program for an offline transaction may occur in a variety of ways. The point of sale device of the merchant may be operable to transfer transaction details to the marketing program, either during a sale, for example in real time, or after one or more sales as an upload. Alternatively, the merchant may have a system whereby an electronic report of the transactions is generated and transferred to the marketing program either automatically or upon a specific activity of the merchant. As yet another option, the marketing system may provide a screen whereby a merchant may fill-in transaction details and thereby provide the transaction details to the marketing system. A skilled reader will recognize that a variety of other means and/or methods of transferring transaction details to the marketing program during or after an offline transaction occurs may be applied in the present invention.

The present invention may involve other means of transferring online and/or offline transaction information to the marketing program. For example, a transfer means may be integrated with a point of sale device used in the transaction, whereby the information is captured by the point of sale device and transferred to the marketing program by the point of sale device. As another example, data feeds may be generated by one or more merchant acquirer or payment processor (for example, such as Moneris™) and the merchant acquirer or payment processor may transfer the data feeds to the marketing program. As yet another example, data feeds may be generated by one or more card issuers (for example, such as the Royal Bank of Canada™, Toronto Dominion Bank™, etc.) and the card issuer may transfer the data feeds to the marketing program. As still another example, data feeds may be generated by one or more card associations (for example, such as Visa™, MasterCard™, etc.) and the card association may transfer the data feeds to the marketing program. As yet another example, data feeds may be generated by one or more data aggregators and the data aggregator may transfer the data feeds to the marketing program. A skilled reader will recognize that other options may be available for transfer of information to the marketing program, including any combination of any of the examples provided above.

As the capture and storage of transaction details, for both online and offline transactions, may be critical to the effectiveness of the present invention, the marketing program may incorporate a means of obligating and/or otherwise requiring merchants to provide transaction details to the marketing program. For example, the provision of full and complete transaction details to the marketing program may be written as an obligation in any contract whereby the merchant becomes a participant of the marketing program. The administrator may check whether a merchant is meeting this obligation, for example by checking incentives against the transactions, or by any other checking means. A skilled reader will recognize that other means of requiring merchants to provide transaction details may also be applied.

Moreover, a merchant may consider itself to be obligated to provide transaction details due to a recognition that the marketing program is significantly more effective when robust transaction details are provided by all participating merchants, as the transaction details can be utilized to assist merchants to derive information regarding consumer behaviours, and other information. As is described herein, the information of the marketing program may be utilized for a number of purposes, including attracting a larger clientele, creating new incentive programs and other uses. These uses can create significant benefits for merchants, and for this reason, or to meet other obligations or requirements, the merchants may be inclined to assist by providing transaction details to the marketing program.

In one embodiment, a member may decide after accessing information regarding a merchant, a product, or receiving one or more incentives to undertake a transaction. As described in this application, the information may be accessed by way of a search (e.g., online or offline, and through a search engine or other data source linked to the marketing system or a search engine or other data source not linked to the marketing system). A search for information may be recognized by the marketing system, and a transaction occurring after the search may be assumed to have occurred as a result of the search, in accordance with criteria of the marketing system, such as the time-lapse between the search and the transaction. If the search causes an incentive to be communicated to the member that is redeemable based upon a transaction, the transaction may also be assumed by the marketing system to be based upon the incentive.

In another embodiment of the present invention, a member may not undertake a search, but may be assumed by the marketing system to have engaged in a transaction due to an incentive if: the incentive is advertised in the merchant location (e.g., a balloon is provided as an incentive with every purchase); the member acknowledges in a post-transaction survey that the transaction occurred due to the incentive; the member receives a communication about an incentive through electronic communication directed to a personal information area belonging to a member (e.g., a text, an email); the member accesses a webpage displaying the incentive; the member attends an event (e.g., a community program event, or other event) where the incentive is communicated and the attendance of the member at the event is made known to the marketing system and this information stored in the data storage area; and/or other communication means that is trackable by the marketing system so that the marketing system can evaluate the time between the communication of the incentive to the member and the transaction.

After the transaction is completed the transaction data may be processed. This may involve accruing a donation to a community program, if a donation was incorporated into a merchant incentive generated by the transaction.

In one embodiment of the present invention, a post-transaction survey 75 may be generated and disseminated to the member. The member may respond, and in particular may confirm whether the transaction occurred as a result of the member reviewing the merchant information through the marketing program.

At any point it may be possible for participants to request information from the marketing program 76, as a report, result, review, search display, etc. This request for information or other data query may engage the analytic mode in some circumstances. A skilled reader will recognize that the results of the request for information or other data query may be utilized for a variety of purposes, including for example, identifying transactions occurring in a manner that indicates the transaction occurred as a result of the member receiving information regarding the merchant through the marketing program.

Intermediaries may register with the marketing program of the present invention and thereby gain limited access to the program functions and the marketing program data. For example, an intermediary may be a community group interested in limited access for the purpose of looking at the merchant incentives offered pertaining to the community group event. Or the community group may be interested in limited access for the purpose of generating lists of merchants and/or members that may be invited to attend a community program event (such as a fund raising dinner). The list may include local merchants and/or members, or merchants and/or members who have characteristics in their profile that suggest they may be interested in supporting the community program. As another example, an intermediary may be a marketing associate who is working with one or merchants to create merchant incentives relating to community programs. The marketing associate may be granted limited access to some of the data and a certain activities of the data mining tool, to generate information to aid the marketing associate in creating a feasible merchant incentive relating to a community program. As yet another example, an intermediary may be an organization, such as a company or a financial card provider. The organization's participation in the marketing program as an intermediary may provide a link whereby the organizations its associates direct involvement in the marketing program as merchants and/or members.

After the point of registration additional information pertaining to participants in the marketing program may be gathered through a variety of means. For example, a survey may be provided to a participant and completing the survey may generate data that is transferred and stored in the data storage area. Other means of entering information into the marketing program may also be provided to a participant, such as a web page. Surveys and other data input means may be provided to a participant through a variety of means, for example, such as a mobile device, a web page, or other means.

Possible Data Mining

After registration a merchant may consider possible incentives to implement at a merchant location and/or online. This decision may involve considerations of relevant community programs, possible incentives, cross-loyalty and/or cross-selling groups.

The marketing program may provide query and/or searching assistance whereby a merchant may use a template search query, and the search query may include drop down menus showing search options, to derive information from the marketing system. The template may be utilized by the data mining tool and/or analytic mode to generate a particular result, such as a report, list, incentive suggestion, community program link suggestion, cross-selling suggestion, cross-loyalty suggestion, or other results. A skilled reader will recognize the variety of results that may be derived from the data and/or information in the data storage area, as well as the variety of search query templates that may be provided to a merchant by the marketing system. The results may be utilized by the merchant to make decisions, such as, for example choosing incentives to implement, choosing to form cross-selling groups, choosing to form cross-loyalty groups, choosing community programs to link with, etc.

Information and other data collected by the present invention may be stored in a manner whereby the information is easily mineable by a variety of participants and/or third parties, including local businesses. The data mining tool, and optionally the analytic mode, may be utilized to generate or otherwise derive results that may be utilized by merchants or other business owners to determine indicators of successful incentives and other business generators in a specific geographic area. For example, the results of the present invention may indicate why one merchant location may get more business than another merchant location or other business location, such as the type of incentive offered (e.g., balloons are offered as an incentive at one merchant location and since these appeal to kids the mothers shopping with their kids will frequent that merchant location which is significant because mothers represent the majority of shoppers in that geographical area; or people living in a particular area may be likely to leave on extended vacations to their cottages during the summer months and on weekends during the rest of the year and therefore may be unlikely to visit some types of merchants during these times; etc.). A skilled reader will recognize the many uses that may be made of the information and data collected by the present invention and the fact that such information is generally available for data mining and analytic uses.

In one embodiment of the present invention, the data mining tool may access information and/or data in the data storage area, and may also access information and/or data from other data sources, which may be outside the marketing system, such as data sources (e.g., databases, hard disks, etc.) controlled by intermediaries, other participants, or third parties. Access to these other data sources may be recognized by the template, by the analytic mode, or by other rules utilized by the marketing system.

A merchant may utilize the data mining tool to identify community programs occurring or to occur in the future, in the vicinity of one or more merchant store locations. The merchant may then devise and develop a merchant incentive for the one or more stores that are local to the community program, said merchant incentive being created to specifically relate to the community program. For example, the relation between the community program and the merchant incentive may function so that upon a transaction between a merchant and a member, a donation may be made to the community program. The transaction between a merchant and a member may be the point at which a merchant incentive is honoured, which may involve providing a tangible benefit to a member (such as a prize, sweepstakes entry, or a discount), transferring a benefit to a community program (such as a donation), or another activity. The transaction information may be transferred by the merchant, for example, such as by the merchant's point of sale interface, to the marketing program, and a transaction linking utility may be utilized to confirm that the merchant and member are participants of the marketing program, and that the member qualifies for one or more merchant incentives. A skilled reader will recognize that the merchant incentive may of various types, a coupon, a discount, entry in a sweepstakes, a prize, a donation to a community program, and that a variety of other merchant incentives are possible.

The merchant incentive may be tailored to reflect the specific relationship between a community program and a merchant, aspects of either the merchant or the community program, demographics of local members, etc. Information generated by the data mining tool may assist with the tailoring of a merchant incentive.

A variety of links may exist between participants of the marketing program and these links may be recognized in the data storage area. The links may also develop relationships between participants. Additionally the links and/or relationships may guide and direct the experience of participants of the marketing program. Links may further be created whereby a merchant may be linked to the marketing program brand. Another possibility is that links are created between the merchant program and social media (e.g., Facebook™, Twitter™, etc.), whereby social media may be utilized to promote merchants, merchant incentives, community programs and/or the marketing program.

In one embodiment of the present invention, to allow participants to access information regarding the marketing program, the marketing program functions, and to generate queries and/or requests for information, the marketing program may be presented as a website, having a main page and several pages attached thereto. The pages may reflect particular functions of the program, such as reward look-ups, maps of merchants and/or community programs, calendar pages showing community events and/or merchant incentives, links to merchants and/or community programs, access to merchant incentives available to a member, etc. The web pages may facilitate presentations viewable by participants and/or non-participants of the marketing program.

In one embodiment of the present invention, certain triggers may be set to initiate particular activities of the marketing program. For example, triggered activities may include: data mining in accordance with set rules; sweepstakes processing; donation distribution to community programs or other intermediaries (e.g., such as charities); post-sale feedback; and enhanced analytic mode of the data mining tool. Additionally, particular reports may be produced at regular, specified intervals. Any activity of the marketing program may be initiated upon request, whether a trigger or a specified interval is set for that activity or not.

Figure 9:
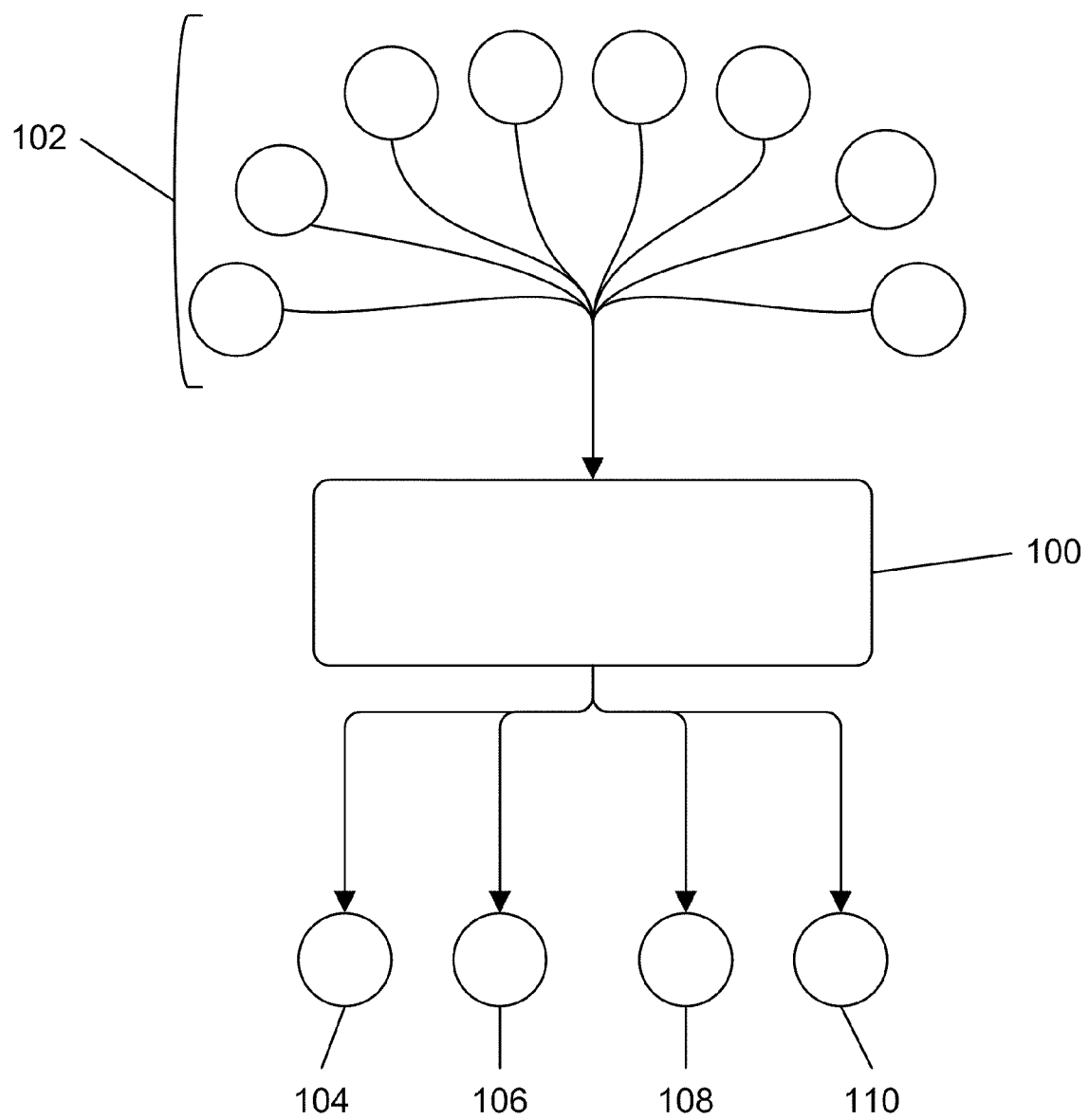
FIG. 9 is a system diagram showing the marketing system outputs that may be generated by the data mining tool, and sometimes the analytic mode, in embodiments of the present invention.

As shown in FIG. 9, in one embodiment of the present invention, a variety of inputs and outputs may be provided to and generated by the data mining tool. The inputs and outputs may also be affected by whether the data mining tool engages the analytic mode. For example, the data mining tool, and possibly the analytic mode, may access data or other information that is either stored in the data storage area of the marketing system 100, or may access information from other data sources 102, such as remote databases of intermediaries, merchants or other third parties that the marketing system is permitted to access. The data mining tool, and possibly the analytic mode as well, both of which are elements of the marketing system, may be operable to provide an output 104 that provides suggestions of incentives to a merchant, or group of merchants. The data mining tool, and possibly the analytic mode as well, may also provide other types of reports 106 or other documents as an output. The data mining tool, and possibly the analytic mode as well, may further be operable to generate one or more survey questions 108 as an output to be directed to members. Such survey questions may be dynamic questions. For example, a dynamic question could include the following or any other question: a question asking a member if an online query or search undertaken by the member prior to a transaction influenced the transaction if the marketing system identifies a suspected correlation between a query or search and a transaction; or a questions that are different depending on whether the transaction occurred on a weekend or a weekday.

A skilled reader will recognize that other results 110 may be generated by the data mining tool, and that these other results may be any of a wide-variety of results.

The data mining tool may access and utilize a variety of information in the course of it processing, such as any of the following, or any combinations of the following: transaction details; member demographics; searches data from searches providers or search engines that are linked to the marketing system; search data from search providers or search engines that are not linked to the marketing system, but that provide data to the marketing system; post-transaction survey responses; responses from any other survey provided by the marketing system, for example, such as market research surveys, etc.; merchant details, including any merchant preferences, merchant store geographical locations, merchant capacity, merchant inventory, merchant target markets, or any other merchant information; seasonal behaviours of any participants of the marketing program, or any other users that data is collected for and transferred to the marketing system; weather trends of forecast information provided to, or accessed by, the marketing system; and any other information or data. A skilled reader will recognize that a variety of other data or information may also be available from the marketing system data storage area and may be utilized by the data mining tool, and in some instances by the analytic mode as well.

The information and data may be processed by the marketing system, and in particular by the transaction linking utility, the data mining tool, and in some instances by the analytic mode as well, to provide specific outputs. For example, the outputs may be any of the following: feedback regarding any success and/or failures of incentives associated with a merchant; feedback regarding any success and/or failures of incentives associated with similar merchants in non-competing geographical areas, if sufficient information regarding similar merchants is provided to, or accessed by, the marketing system; comparisons of incentives associated with a merchant and incentives associated with similar merchants in non-competing geographical areas, if sufficient information regarding similar merchants is provided to, or accessed by, the marketing system; feedback regarding success rates and trends from associated platforms, such as search providers, web advertising, traditional media (e.g., print, radio, television, etc.), if sufficient information regarding such associated platforms are provided to, or accessed by, the marketing system; and feedback regarding consumer behaviour or members or users. A skilled reader will recognize that a data or information may also be provided to, or accessed by, the marketing system and utilized by the transaction linking utility, the data mining tool, and in some cases the analytic mode as well, to provide a variety of other outputs as well.

Analysis of data to product behavioural data relating to members or users may be a particular output of embodiments of the present invention. The behavioural data may indicate consumer behaviour of members or merchants specifically. Such behavioural data may be derived through a variety of analysis means undertaken by the transaction linking utility, the data mining too and in some cases the analytic mode. The analysis behavioural data output may be utilized in conjunction with specific rules to formulate determinations for a variety of purposes by the marketing program and the participants. For example, the behavioural data may be applied to rules or formula, such as rules based on a determinant outcome, for example, rules having the following structure: if x then y. For example, if a consumer exhibits x behaviour then y is the outcome. As a further example, one rule may be that if a member or user undertakes a search on a mobile communication device then that member or user is exhibiting interest in a transaction in the near future. Therefore the time lapse between the search and the transaction may be expected to be a shorter time period than is expected between other searches and transactions to indicate a likely relationship between the transaction and the search. The basis for this rule may be that a search on a mobile device may be more likely to occur while a member or user is already shopping.

This is an example of one rule that may be used to evaluate or analyze behavioural data. Rules may be further narrowed to factor in certain demographics or attributes of members, such as age groups, genders, parenting responsibilities, etc. which may affect transactions undertaken by members. A skilled reader will recognize that a variety of other rules and factors within rules may be utilized for other evaluations and analysis of behavioural data. A skilled reader will also recognize that extraction of behavioural data, and the analysis and evaluation of such data may expand the member demographic and attribute data of the present invention. This expanded data may be used for many purposes, including generating specific incentives to increase purchases made at merchant stores (either online or bricks and mortar stores) and the good will ascribed to merchants.

A skilled reader will recognize that a variety of reports or other documents may be generated by the data mining tool and in some instances the analytic mode as well. For example, such as incentives statistics or incentive trends, to provide details of incentives communicated, incentives redeemed, incentive effectiveness on a cost/return basis, and incentive effectiveness on a traction basis. As another example, success of associated platforms that may include search providers, web advertising, traditional media (e.g., print, radio or television) may be provided if information or data regarding associated platforms is provided to, or accessed by, the marketing system. Still another example is output that provides analysis and behavioural data relating to consumer activities of members or users. As yet another example, survey statistics, trends and conclusions may be generated, so that the marketing system may provide comprehensive reporting of survey data acquired and any correlations that can be made from external factors provided to, or accessed by, the marketing program. Such a correlation may be for example, that a golf course has fewer transactions on cold days. The marketing system may be operable to generate suggestions of activities that may address the correlations, generally in the form of incentive suggestions. For example, the marketing system may suggest that an incentive be offered on golfing costs when the weather is below a seasonal averages. A skilled reader will recognize that a variety of reports containing a variety of information, correlations and suggestions may be generated by the present invention.

Figure 10:
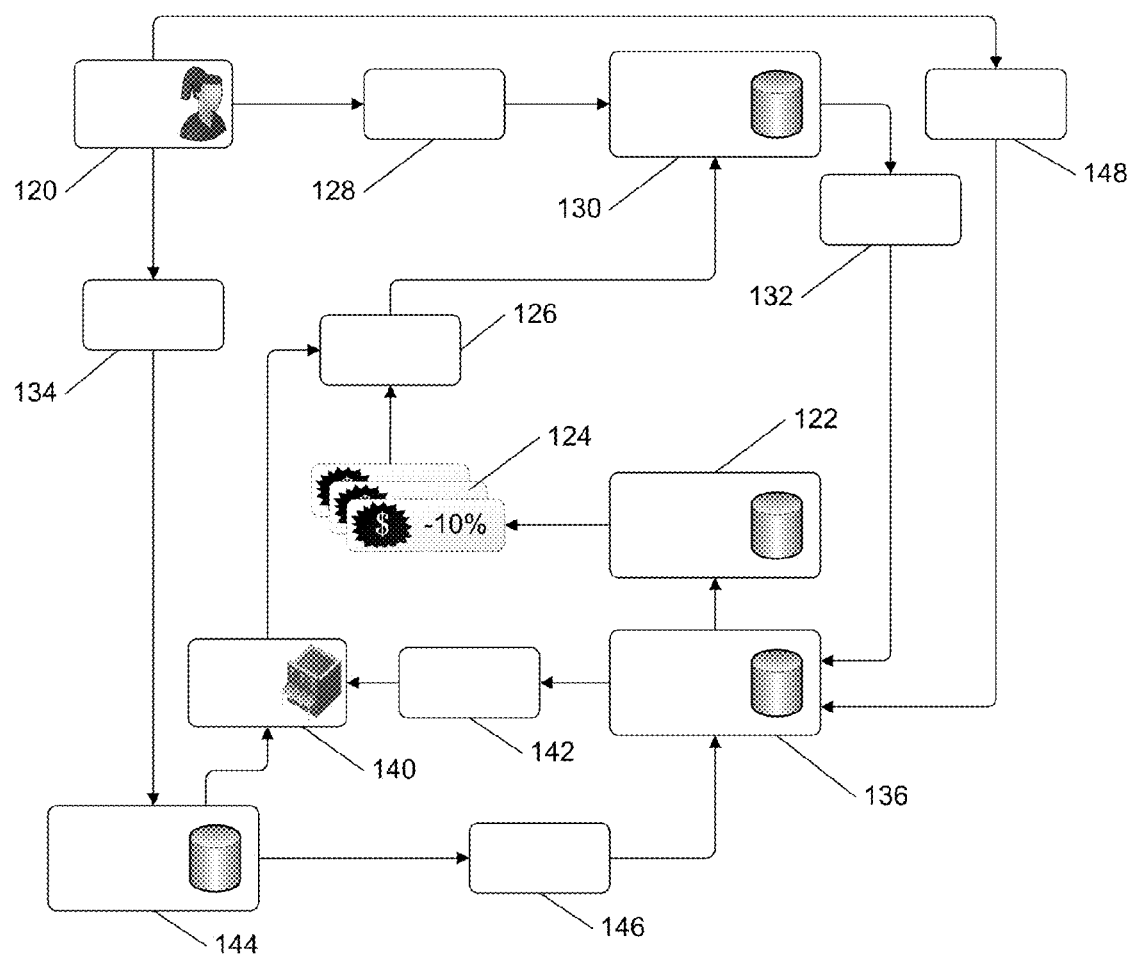
FIG. 10 is a flowchart showing the options for member interaction with the marketing program in one embodiment of the present invention.

As shown in FIG. 10, in one embodiment of the present invention, incentives may generated based on member activities and the data or other information provided to, or accessed by, the marketing system regarding these activities. A member 120 may generate a query or search 128 by utilizing a search engine that is either part of the marketing system or linked to the marketing system. The search engine 130, and possibly other media, may be utilized to generate search results and a search click history. The search history 132 may be provided to, or accessed by, the marketing system 136. The marketing system may use the search history, in conjunction with other information to generate one or more reports 142 which may be provided to one or more merchants 140. The search history may also be utilized with other information to generate incentive suggestions 122, which may lead to the generation of a merchant incentive 124, such as a discount, that may be approved 126 by a merchant. An approved incentive may be provided to a member as part of the search engine search results, or search click options.

A member 120 may further engage in one or more transactions 134 with a merchant. Details of each transaction may be provided to a transaction processing system 144, such as a point of sale device, or any other means. The transaction details may be provided by the transaction processing system to the merchant 140. The transaction processing system may generate transaction data record 146, which may be provided to the marketing system and utilized by the transaction linking facility in particular.

A member 120, may also complete a post-transaction survey 148. The survey itself, or the survey data may be provided to the marketing system. All of the data provided to the marketing system, including the survey details, the transaction details and the search history details, may be utilized by the marketing system to generate reports, or other information, or certain activities, such as sales reports, suggestions for incentives, or incentive generation activities, as just a few examples of possible outputs of the marketing system.

Some embodiments of the present invention may be operable to generate incentives on an automatic basis. The marketing system may utilize information and data stored in the data storage area to perform particular analysis, including analysis of the effectiveness of prior incentives, as well as market trends, such as periods when sales are higher or lower. The marketing system may utilize the analysis results and other data to generate one or more new incentives. These incentives may be automatically generated and may be communicated by the marketing system pending merchant approval. Merchant approval may be manual or automatic approval. Upon approval the incentive may be auto-loaded to various media including any of the following: search engines, newspapers, brochures, flyers, specialty advertising (e.g., Val Pak™, etc.) or any other media.

A variety of information or data may be utilized by the marketing system to automatically generate one or more incentives. For example, any of the following data or information may be utilized: merchant type (e.g. merchant category, services and/or products provided, service vs. product based merchant, etc.); location of merchant stores and geographical location; history of a merchant's experience with past and present incentives (customer acceptance, feedback about the incentives, contribution margin, etc.), for example incentives that generate the most interest, as indicated by the incentives being rated highest by users and members in post-transaction surveys, or as indicated by a comparison of incremental sales data following the incentive being posted; successful incentives in areas that are non-competing geographical areas; indications of identified member's interest in an incentive, such as data based on recorded search patterns in an online search environment (e.g., frequent searching of a product, service, or member by a user), electronic coupons downloaded by a user or member, or the comparison of search patterns and/or downloaded coupons with transaction details; and member demographics tied to transaction history and trends.

Automated incentive generation may be based on a variety of criteria, for example it may be based on specific customer segments. Such customer segments may include as an example: targeted local neighbourhoods; customer demographics (e.g., gender, age, etc.); financial card BIN range, as this may determine if the card is a regular card, gold card, platinum card, etc., and the type of card may provide details regarding the card holder and the likely transactions to be conducted by the card holder; buying history of users, members, or other customers; users visiting a search provider's online site; the search behaviour of particular users, such as frequent searches relating to a product or service, such as bikes or bike accessories, undertaken by a user or a member.

The incentives that are automatically generated may be related to several elements and/or factors. As an example, automatically generated incentives may be related to any of the following: a season; one or more days of the week, or of the month; special events, including holiday seasons (e.g., the Christmas season, etc.) and celebrations (e.g., parades, a community event such a run for a cause, etc.); or local events (e.g., little league finals, town street festivals, etc.). The success or effectiveness of an incentive may be determined based on any of the following: the statistics regarding whether an incentive is redeemed; post transaction feedback regarding the incentive, such as feedback derived from a post-transaction survey; and increased sales from a group of consumers targeted by an incentive, or during a period of time that is targeted by an incentive.

Transactions

Transactions between merchants and members may occur online or offline. A transaction will be recognized as occurring between a merchant and a member because the member will utilize at least one of the identifications recognized as belonging to the member by the marketing program. The merchant may also utilize at least one of the participant identifiers recognized as belonging to the merchant by the marketing program.

As an example of an online transaction, such a transaction may occur in a website environment, whereby a member purchases an item or service from a merchant through a series of clicks, or other online means of purchasing an item or service. The website will transfer the transaction information to the marketing program. In some instances the information may be transferred to the marketing program by a third party. The marketing program will recognize the transaction as occurring between a member and a merchant due to the use of the participant identifiers.

As an example of an offline transaction, a member may visit a merchant's store location and may undertake a transaction to purchase an item or service from the merchant. The transaction may involve a point of sale device that will transfer information regarding the transaction, including the participant identifiers to the marketing program. A transaction that does not involve a point of sale device may be recorded by another means and the transaction details, including the participant identifiers, may be transferred or manually entered into the marketing program. The transaction details may be transferred to the marketing system by a third party in some instances.

Depending upon the form of transaction, the transaction may be recognized by the marketing program in real-time, near-real time or after a time lapse. Transaction details may be matched to a member profile by the data mining tool or other element of the loyalty engine, and the transaction details may be stored to the member profile in the data storage area. Following a transaction a post-transaction survey may be communicated to a member, for example, via a web page, via email, via a mobile device, etc. The post-transaction survey may gather feedback from the member. In some embodiments of the present invention the post-transaction survey may be anonymous and the information collected from the survey may be stored in a manner linked to the merchant in the data storage area. This data may be utilized by the data mining tool and the analytics mode. Post-transaction survey results may be generated by the data mining tool and may be provided to participants of the marketing program.

A merchant may utilize information generated by the data mining tool and possibly the transaction linking utility, both of which utilize the data stored in the data storage area, to devise, define and develop a merchant incentive. In one embodiment of the present invention, an intermediary, such as a marketing associate, may be involved in developing or communicating a merchant incentive. Either or both of the merchant and the intermediary may access information generated by the data mining tool for the purpose of creating the marketing incentive, or analyzing the effectiveness of a marketing incentive once it is completed. A group of merchant incentives may further be analyzed for the purpose of creating more effective merchant incentives in the future.

Information may be collected pertaining to participants in the marketing program upon the event of transactions between a merchant and a member. Such information may be transaction details, and may further include details regarding any related merchant incentive. As described above a merchant incentive may be related to a community program and therefore may be available at one or more merchant stores that are within the vicinity of the community program. (The vicinity may be of various sizes, a community park area, a neighbourhood, a city, a county, a province or state, a country, etc.) The merchant incentive, or information about the merchant incentive, may be communicated to a member, or a group of identified members, in a variety of means, including via a web page, via a mobile device, via an email or text, etc. A merchant incentive, or information about the merchant incentive, may be communicated to a mixture of members and third parties by a variety of means, including print media, radio or television broadcasts, web pages, billboards, emails, text, mobile devices, etc.

The communication of the merchant incentive to third parties may introduce said third parties to the one or more merchant stores, the community program that the merchant incentive pertains to and/or the marketing program. In one embodiment of the present invention, transactions between third parties and merchants during a merchant incentive or a community program may be tracked and data regarding such transactions may be stored in the data storage area. Said data may be utilized by the data mining tool and the analytics mode to produce analysis of the transactions to aid in the participation of the merchant in the marketing program, for example, such as to create new effective merchant incentives.

In one embodiment of the present invention, transactions may include transactions that do not occur at a physical (bricks and mortar) store location, but may include transactions occurring in a digital environment, such as via a website.

Example Method

A skilled reader will recognize that the marketing system and method of the present invention may function in a variety of ways. As an example of one embodiment of the present invention, a system administrator may cause a local community program to be stored in the marketing system, for example, such as Caribana™, a festival celebrating Caribbean culture held in cities such as Toronto, Canada. One or more merchants registered with the marketing program may recognize that one or more Caribana events will occur near a store location. The one or more merchants may develop one or more merchant incentives related to Caribana. The one or more merchant incentives related to Caribana may be communicated to participants, for example, to members that are located near to one or more Caribana events, or to members that are located near to the one or more merchants offering Caribana related incentives. The one or more merchant incentives may also be communicated to third parties, and information regarding the marketing system may also be communicated to third parties so that third parties can know how to become a participant of the marketing system.

Transaction details regarding transactions with the one or more merchants whereby the one or more merchant incentives are redeemed may be transferred to the marketing system and stored in the marketing system. A skilled reader will recognize that the means of transferring transaction details to the marketing system may be varied and that the options may differ for online and offline transactions. Some of the possible means of transferring transaction details for online and offline transactions are discussed above, although a skilled reader will recognize that the discussion does not provide a complete list of all of the possible transfer options it merely provides some examples of transfer options.

A post-transaction survey may also be provided to participants and/or third parties redeeming merchant incentives to gather information relevant to the transaction and the participants and/or third parties undertaking the transaction.

The transactions may involve registered members of the marketing program. A member may be identified as a member during the transaction by using one or more participant identifiers and/or other identifications recognized by the marketing program as associated with the member. For example, the member may use a participant identifier or other identification that is a financial card, a number generated by the marketing system, or any other identification.

The data mining tool, and in some instances the analytic mode, may be utilized to search the transaction details and other marketing system data to provide results. The results may indicate success measurements for promotions and the results may also indicate information that may be applied to the creation of other incentives in the future. For example, the results may indicate demographic information regarding the persons redeeming incentives, including participants and third parties. In the case of an incentive created by a merchant in relation to a Caribana event, the results may indicate that participants and/or third parties wanting to redeem an incentive may not be local to the merchant location, but may have travelled from a specific area, for example, such as a specific town in the province, or a specific neighbourhood in the city that is distant from the merchant location. In this manner the present invention may be utilized to draw assumptions regarding the relationships between transactions at a merchant location and a particular incentive offered at that merchant location. A skilled reader will recognize the variety of results that may be provided by the present invention and the ways that such results may be utilized by participants and/or third parties.

The data mining tool, and in some instances the analytic mode and/or the transaction linking utility, may also recognize that the activities of a participant may cause that participant to be eligible for specific incentives. For example, the frequency of transactions with a merchant, the time of day of a transaction with a merchant, the creation of a review, or other activities may cause a participant to be eligible for an incentive. The data mining tool may automatically apply the incentive, such as a donation to a community group, may automatically communicate the incentive to the participant, such as a coupon for a future purchase, or may apply or communicate the incentive based upon instructions by the administrator or merchant.

Cross-Sell

In another embodiment of the present invention, cross-selling relationships and programs may be created. A cross-sell involves at least two merchants, or at least two merchant stores, that are generally non-competing. A cross-sell occurs when a member completes transactions at each of the two (or more) merchants involved in a cross-sell relationship. A cross-sell may be required to include the transactions with the merchants involved in a cross-sell relationship occurring within a specified period of time. Events of cross-selling may be validated by a query sent to the transaction linking utility in accordance with particular rules that cause the transaction linking utility to identify valid cross-sells by members. For example, a transaction with one of two cross-sell merchants followed within the specified period of time with a transaction with the other cross-sell merchant may be recognized as a cross-sell. As another example, if the transactions are online, a click to complete a transaction with one of two cross-sell merchants followed by a click to complete a transaction with the other cross-sell merchant may be recognized as a cross-sell.

As yet another example, a cross-sell may be refined based on the terms of the cross-sell incentive. Such terms may include specific times, specific day(s) of the week, minimum purchase restrictions, or other terms. So that if a transaction occurred at each of two cross-sell merchants and the transactions meet specific terms, for example, such as occurring on a Tuesday between 5 pm and 8 pm, then this may be recognized as a cross-sell. A skilled reader will recognize that other criteria may be utilized to define cross-sells.

Upon the completion of, or recognition of, a cross-sell a reward may be generated and communicated or distributed to the member. In one embodiment of the present invention, a member may be required to login to the marketing program to accept or otherwise obtain the reward. Specific steps may be required to accept the reward, or alternatively the reward may be transferred to the member's profile and be visible when the member accesses his or her profile information. Other means of accepting or obtaining the reward may be utilized with the present invention as well. The reward may be of a variety of types, such as a coupon, bonus offer, prize, sweepstakes entry, etc. A reward may therefore be redeemed in accordance with the nature of the reward.

A cross-sell relationship could be created amongst merchants, or merchant stores for a variety of reasons. For example, a merchant that includes two or more stores could create a cross-sell relationship whereby a member would have to visit all the merchant stores before receiving a prize (e.g., such as a treasure hunt). As another example, a merchant having a single store may provide a reward after multiple visits (e.g. after nine transactions a 50% discount will be applied to the next transaction).

As yet another example, a group of merchants could unite to provide a benefit to members that undertake transactions at all, or some, of the associated merchants. It may be possible for the benefit to increase as the member undertakes transactions with an increasing number of merchants. It may be possible the marketing program may define the group of merchants, for example, such as a group that includes merchants from the same category (e.g., sports stores) or from complimentary categories (e.g., clothing stores and shoe stores). It may be possible for the reward to involve a merchant outside the group of cross-sell merchants (e.g., transactions with a cross-sell group of three golf course merchants will generate a reward for a member that is a coupon for a free dinner at a restaurant merchant).

In one embodiment of the present invention chain cross-selling may occur between three or more merchants. Chain cross-selling may involve three or more merchants, generally non-competing merchants, deciding to create a chain cross-sell group. The chain cross-sell group may involve three or more merchants with related products and/or services that may offer incentives based upon a member frequenting three or more of the chain cross-sell group. A member in a chain cross-sell group may be outside of the marketing system. In a chain cross-sell group it may be possible for the incentive offered to a member or other participant to increase as more of the cross-sell group products and/or services are purchased. The member, or other participant, may be recognized by the provision of an identification that is stored in the marketing system, whereby the member is identified as a member of the marketing system, such as a participant identifier.

For example, a cross-sell group may include a hotel, golf course, restaurant, sports store and hiking guide in a particular location, such as Banff, Alberta, during a particular event, such as the summer golf months. A member, or other participant, who stays in the hotel and plays golf at the golf course in the cross-sell group may receive a 10% discount or other incentive. Whereas, if a member books a hotel room, a round of golf and dinner at the restaurant that are part of the cross-sell group a 20% discount may be applied. And as the member purchases products and/or services from even more of the cross-sell group the incentives continue to increase. A member staying at the hotel, who golfed at the golf course and ate dinner at the restaurant, and who also purchases a product at the sports store may receive 40% off the product purchased at the sports store. Should that member also book a hike with the hiking guide of the cross-sell group then the hike may be provided at a 50% discount and a donation may be given to the Banff National Park, or another community group. A skilled reader will recognize that a variety of cross-sell groups may be formed and that a variety of incentive options may be provided based upon the cross-sell groups.

Cross-selling incentives may be evaluated to determine the success of the cross-sell incentives. it may be possible for the cross-sell incentives to be evaluated as individual incentives, and as a group of cross-sell incentives. In this manner the marketing system may evaluate whether a particular incentive was successful on its own, and whether a group of incentives were popular. In this manner it may be possible to identify where cross-selling led to transactions frequently, including transactions that may not have otherwise occurred without the cross-sell incentive being offered. For example, did the offer of a hiking guide lead to more use of this service by members staying at a hotel, eating at restaurant and golfing at a golf club that are part of a cross-sell group than would have occurred if the hiking guide was not included in the cross-sell. A skilled reader will recognize the variety of evaluations that may be undertaken of the individual and collective incentives involved in a cross-sell.

Figure 11:
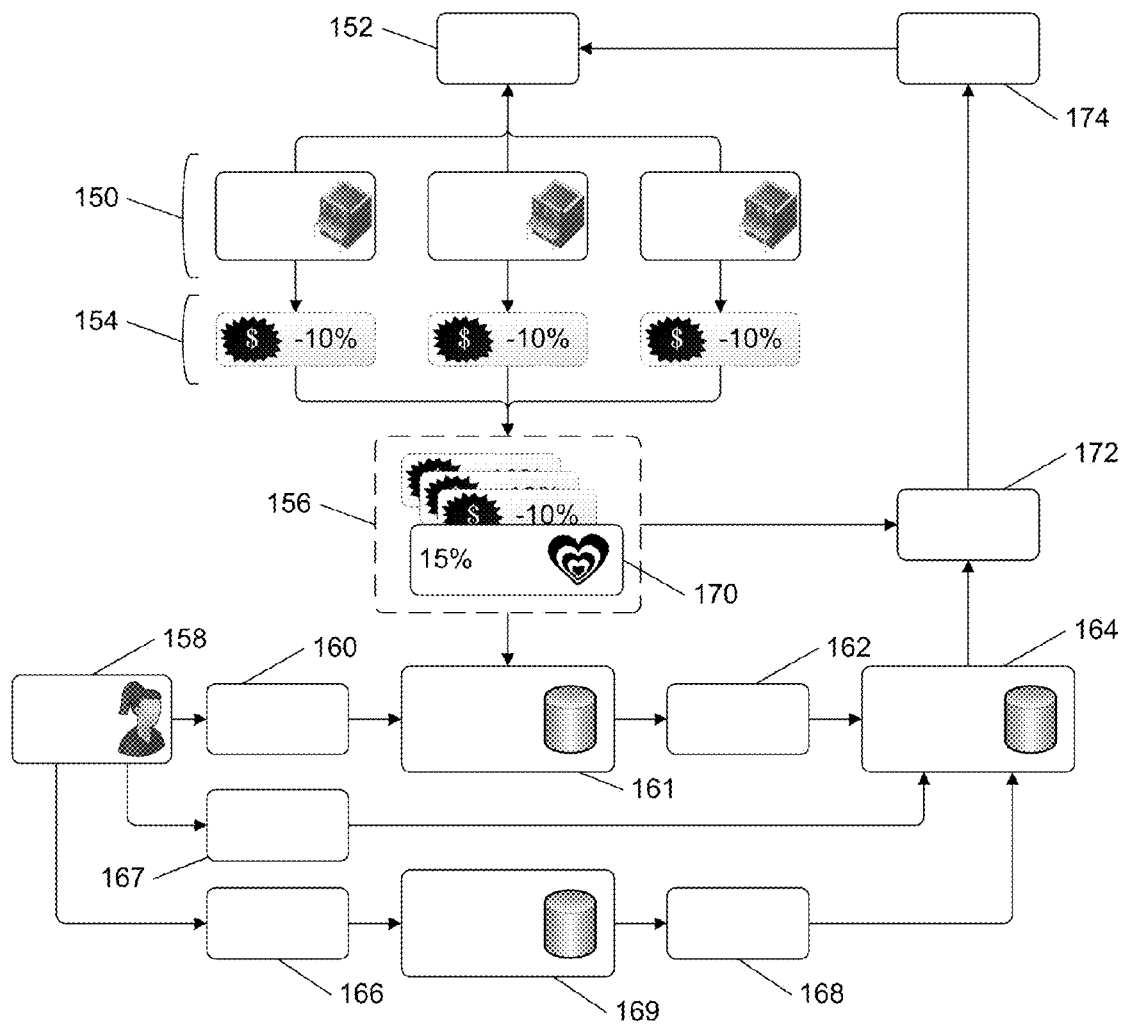
FIG. 11 is a flowchart showing the options for an embodiment of the present invention involving cross-selling.

In one embodiment of the present invention, as shown in FIG. 11, two or more merchants 150 may collaborate to produce one or more cross-sell collaborations 152. The collaboration may involve one or more incentives 154 provided by each merchant. The incentives of each merchant may be combined into a linked incentive 156. The linked incentive may include a further incentive 170, that is honoured when transactions with each of the collaborator merchants are undertaken by a single member. A member 158 may perform a query or search 160 utilizing a search engine or other means, and the linked incentive may be communicated to the member as a result of the chain of search links accessed by the member. For example, clicking a search link of one of the merchants involved in the collaboration may cause the linked incentive to be communicated to the member directly. The linked incentive may also be communicated and made available to users by search engines and other media 161 as well.

The search history 162 of the search and the chain of search links may be provided to the marketing system 164.

The member that undertook the search and had the linked incentive communicated to him or her, may undertake a transaction 166 at one or more of the collaborating merchants. Transaction details 168 for each of the transactions may be transferred a transaction processing system 169 that may generate transaction data 168, and the transaction data may be transferred to the marketing system 164. The marketing system may process the transaction details and any post-transaction survey 167 results provided by the member. The marketing system may generate a combined incentive report 172. For example, the generation of the combined incentive report may occur when a merchant undertakes transactions with all of the collaborative members and triggers the additional incentive, or at any other time. Results for sharing 174 may be generated from the combined incentive report so that results of each of the incentives in the linked incentive are shared with all collaborative merchants, so that each merchant receives results relating to its particular incentive and the additional incentive, results may be produced to share some of the results of two or more collaborative members, or results may be produced in any other configuration. Results may be compared to the collaboration, so that conditions of the collaboration, such as the additional incentive, may be evaluated. In particular the comparison may consider whether the conditions were fulfilled. In some embodiments of the present invention the marketing program may auto-generate suggestions for cross-sell incentives or auto-generate cross-sell incentives for approval by collaborating merchants.

Cross-Loyalty

The marketing program of the present invention may further involve cross-loyalty programs or cross-marketing programs. Such cross-marketing program may function in a manner as described in U.S. patent application Ser. No. 11/283,856. The cross-marketing programs of the present invention may further involve a variety of merchants and intermediaries, such as community programs. In this embodiment of the present invention the community program may work with the merchant to develop a cross-loyalty program. To aid a merchant in creating cross-loyalty and/or cross-sell relationships, the data mining tool may be utilized by the merchant to access information regarding other merchants and/or intermediaries (or groups of merchants and/or intermediaries) that are participants in the marketing program.

It will be appreciated by those skilled in the art that other variations of the embodiments described herein may also be practiced without departing from the scope of the invention. Other modifications are therefore possible.

We claim:

1. A method of automatically registering a merchant to a marketing program, the method comprising:

displaying, on a display using a webserver, a merchant registration interface having a plurality of data fields for receiving merchant profile data;

receiving, at at least one processor from the merchant registration interface, signals representing inputted merchant profile data associated with at least one of the plurality of data fields;

populating a merchant profile with the inputted merchant profile data;

identifying, at the at least one processor, at least one merchant identifier from the merchant profile, the at least one merchant identifier uniquely identifying the merchant;

generating signals to instruct an automated merchant boarding module configured by the at least one processor to search one or more data sources using the at least one merchant identifier and retrieve from the searched one or more data sources additional merchant profile data associated with at least one of the plurality of data fields which are not populated with the inputted merchant profile data;

generating signals for displaying the additional merchant profile data for verification, and upon receiving signals confirming the additional merchant profile data, automatically populating the merchant profile with the confirmed additional merchant profile data;

populating the merchant profile with at least one incentive for transactions with the merchant, wherein the at least one incentive is identified based on the confirmed additional merchant profile data; and determining, by the at least one processor, if a predetermined minimum set of unique merchant profile data is populated in the merchant profile to generate a merchant profile and based on the determination:
 i. storing the merchant profile as pending in a data storage device;
 ii. deleting the merchant profile from the data storage device; or
 iii. storing the merchant profile as registered in the data storage device.

2. The method of claim 1, comprising:
identifying one or more data fields not associated with the inputted merchant profile data;
identifying one or more suggestions relevant to the one or more data fields which are not populated with the inputted merchant profile data; and
generating signals for displaying the one or more suggestions on the display.

3. The method of claim 2, comprising receiving signals associated with the one or more suggestions for locating merchant data for the one or more data fields not populated with the inputted merchant profile data.

4. The method of claim 1, comprising generating signals for searching one or more data sources external to the marketing program.

5. The method of claim 1, wherein the plurality of data fields include data fields associated with one or more merchant store locations in the merchant profile.

6. The method of claim 5, comprising:
generating signals to cause searching of the one or more data sources to locate data pertaining to one or more of the one or more merchant store locations;
displaying, on the display, the data pertaining to the one or more merchant store locations;
receiving signals representing one or more inputs confirming the data pertaining to the one or more merchant store locations; and
populating the merchant profile with the one or more merchant store locations with the confirmed data.

7. The method of claim 1, comprising generating, at the at least one processor, signals for generating the merchant profile to include one or more data fields associated with data pertaining to the merchant; and storing the merchant profile in a searchable format.

8. The method of claim 1, comprising generating one or more reports pertaining to the merchant utilizing the merchant profile.

9. A method of automatically registering a merchant to a marketing program, the method comprising:
Receiving, at a merchant registration interface, data associated with one or more merchant transactions at at least one merchant location;

Identifying, using at least one processor, from data associated with at least one of the one or more merchant transactions, with at least one processor of an electronic device, merchant profile data including at least one merchant identifier uniquely identifying the merchant and at least one merchant location;

generating signals to instruct an automated merchant boarding module configured by the at least one processor to search one or more data sources using the at least one merchant identifier and the at least one merchant location to retrieve from the searched one or more data sources additional merchant profile data that was not received at the merchant registration interface;

populating a merchant profile with the at least one merchant identifier, the at least one merchant location, the additional merchant profile data, and at least one incentive for transactions with the merchant, wherein the at least one incentive is identified based on the additional merchant profile data;

determining, with the at least one processor, if the populated merchant profile is sufficient to generate a merchant profile based on whether a defined minimum set of unique merchant profile data has been identified, and based on the determination:
 i. storing the merchant profile as pending in a data storage device;
 ii. deleting the merchant profile from a data storage device; or
 iii. storing the merchant profile as registered in a data storage device.

10. The method of claim 9, comprising:
identifying a merchant payment processing identifier as related to one merchant location of the one or more merchant transactions;
identifying merchant location data as corresponding with the merchant location; and
storing the merchant location data as corresponding to the merchant location in the merchant profile.

11. The method of claim 10, comprising generating signals for testing the merchant payment processing identifier by an enrollment activity request.

12. The method of claim 9, comprising generating signals for undertaking the one or more merchant transactions as transactions without charge.

13. A method of automatically registering a merchant to a marketing program, the method comprising:
displaying, on a display using a webserver, a merchant registration interface having a plurality of data fields for receiving merchant profile data;
receiving, at at least one processor from the merchant registration interface, signals representing inputted merchant profile data associated with at least one of the plurality of data fields;
populating a merchant profile with the inputted merchant profile data;
creating, at the at least one processor, at least one merchant identifier from the merchant profile, the at least one merchant identifier uniquely identifying the merchant;
generating signals to instruct an automated merchant boarding module configured by the at least one processor to search one or more data sources using the at least one merchant identifier and retrieve from the searched one or more data sources additional merchant profile data associated with at least one of the plurality of data fields which are not populated with the inputted merchant profile data;

generating signals for displaying the additional merchant profile data for verification, and upon receiving signals confirming the additional merchant profile data, automatically populating the merchant profile with the confirmed additional merchant profile data;

receiving data associated with one or more merchant transactions at least one merchant location;

identifying from data associated with at least one of the one or more merchant transactions, with the automated merchant boarding module configured by the at least one processor of an electronic device, further additional merchant profile data including at least one of merchant data and merchant location data; and automatically populating the merchant profile with the further additional merchant profile data; and determining, with the at least one processor, if a predetermined minimum set of unique merchant profile data is populated in the merchant profile to generate a merchant profile and based on the determination:
i. storing the merchant profile as pending in a data storage device;
ii. deleting the merchant profile in a data storage device; or
iii. storing the merchant profile as registered in a data storage device.

14. The method of claim 13, comprising identifying one or more data fields as required fields that must be populated to store a merchant profile as registered.

15. The method of claim 13, comprising: receiving signals for creating administrator created rules including enrollment activity criteria required to store the merchant profile as registered; reviewing the merchant data and merchant store data to determine if the one or more enrollment activity criteria are met; and storing the merchant profile if the one or more enrollment activity criteria are determined to be met.

16. A marketing system operable to automatically register a merchant to a marketing program, the system comprising:
an electronic device operable to receive input data;
the electronic device including or linked to a display, the display operable to display a merchant registration interface having a plurality of data fields for inputting merchant profile data;
a data collection server communicably-linked to the electronic device, the data collection server including one or more computer processors configured to receive the merchant profile data from the electronic device;
an automated merchant boarding module operable to automatically populate a merchant profile by:
populating the merchant profile with the inputted merchant profile data;
identifying at least one merchant identifier from the merchant profile, the at least one merchant identifier uniquely identifying the merchant;
generating signals to search one or more data sources using the at least one merchant identifier, and retrieving from the searched one or more data sources, additional merchant profile data associated with at least one of the one or more data fields which are not populated with the inputted merchant profile data;
transfer to the electronic device signals for causing the display of the additional merchant profile data for verification, and upon receiving signals confirming the additional merchant profile data, automatically populating the merchant profile with the confirmed additional merchant profile data;
populating the merchant profile with at least one incentive for transactions with the merchant, wherein the at least one incentive is identified based on the confirmed additional merchant profile data; and
determining if a predetermined minimum set of unique merchant data is populated in the merchant profile and based on the determination: store the merchant profile as pending; delete the merchant profile; or store the merchant profile as registered.

17. The marketing system of claim 16, wherein the automated merchant boarding module is linked to one or more merchant transaction tools at one or more merchant locations, said one or more transaction tools generating one or more merchant transactions and transferring the one or more merchant transactions to the automated merchant boarding module to provide merchant data and merchant store data.

18. The marketing system of claim 17, wherein the automated merchant boarding module is operable to identify the merchant data and the merchant store data in the transferred one or more merchant transactions and to include the identified merchant data and merchant store data in the merchant profile.

19. The marketing system of claim 16, wherein the automated merchant boarding module is operable to retrieve and generate signals for displaying the merchant profile stored as pending based upon a received request.

20. The marketing system of claim 16, wherein a training materials module is linked to the automated merchant boarding module and the training materials module is operable to generate signals for displaying, on the display, training information relating to the automated merchant boarding module operation.

* * * * *